United States Patent [19]
Stansell, Jr.

[11] Patent Number: 5,963,582
[45] Date of Patent: Oct. 5, 1999

[54] MITIGATION OF MULTIPATH EFFECTS IN GLOBAL POSITIONING SYSTEM RECEIVERS

[75] Inventor: Thomas A. Stansell, Jr., Rancho Palos Verdes, Calif.

[73] Assignee: Leica Geosystems Inc., Norcross, Ga.

[21] Appl. No.: 08/999,555

[22] Filed: Nov. 21, 1997

Related U.S. Application Data

[62] Division of application No. PCT/US96/07774, May 24, 1996.
[51] Int. Cl.[6] .............................. H04B 15/00; H04K 1/00; H04L 27/30
[52] U.S. Cl. .......................... 375/200; 375/343; 375/208; 370/320
[58] Field of Search .................................. 375/200, 205, 375/206, 208, 316, 343, 340, 354; 370/335, 320

[56] References Cited

U.S. PATENT DOCUMENTS

| | | | |
|---|---|---|---|
| 4,754,465 | 6/1988 | Trimble ................................... | 375/200 |
| 4,807,256 | 2/1989 | Holmes et al. ......................... | 375/200 |
| 4,821,294 | 4/1989 | Thomas, Jr. ............................ | 375/340 |
| 4,894,842 | 1/1990 | Broekhoven et al. ................... | 375/200 |
| 5,101,416 | 3/1992 | Fenton et al. .......................... | 375/200 |
| 5,390,207 | 2/1995 | Fenton et al. .......................... | 375/200 |
| 5,450,448 | 9/1995 | Sheynblat ................................ | 375/346 |

*Primary Examiner*—Chi H. Pham
*Assistant Examiner*—Bryan Webster
*Attorney, Agent, or Firm*—Noel F. Heal

[57] ABSTRACT

A technique for minimizing or eliminating the effect of multipath signals in a receiver processing pseudorandom (PRN) code signals, such as in a global positioning system (GPS) receiver. The presence of multipath signals adversely affects both code measurements and carrier phase measurements of received PRN signals. One aspect of the invention provides for improved code tracking in the presence of multipath signals, by sampling the received code with a multipath mitigation window (MMW) (FIG. 25D) that results in a code error function (FIG. 25F) that reduces or eliminates the multipath effects. The MMW, which may be any of a number of preferred waveforms (FIGS. 35B–35E), provides a code error function that varies in opposite directions from zero at a desired tracking point (402), but assumes a nearly zero value when the MMW is advanced from the tracking or synchronization point by more than a small fraction of a code chip. Because of this nearly zero code error value on the early side of the desired tracking point, delayed multipath signals will have a corresponding code error function that is nearly zero (FIG. 25F) at the desired tracking point of the directly received signals, and the multipath signals will, therefore, have little or no effect on the desired tracking point and on code synchronization. The effects of multipath signals on carrier phase measurements are minimized by sampling the received signals, together with their possible multipath components, before and immediately after code transitions (vectors A and B, respectively). The vector relationship of the directly received (D) and multipath (M) signals is such that performing a vector average of the two types of samples (A and B) produces the directly received signal (D) and its correct phase, with many, if not all, of the multipath components (M) eliminated.

6 Claims, 33 Drawing Sheets

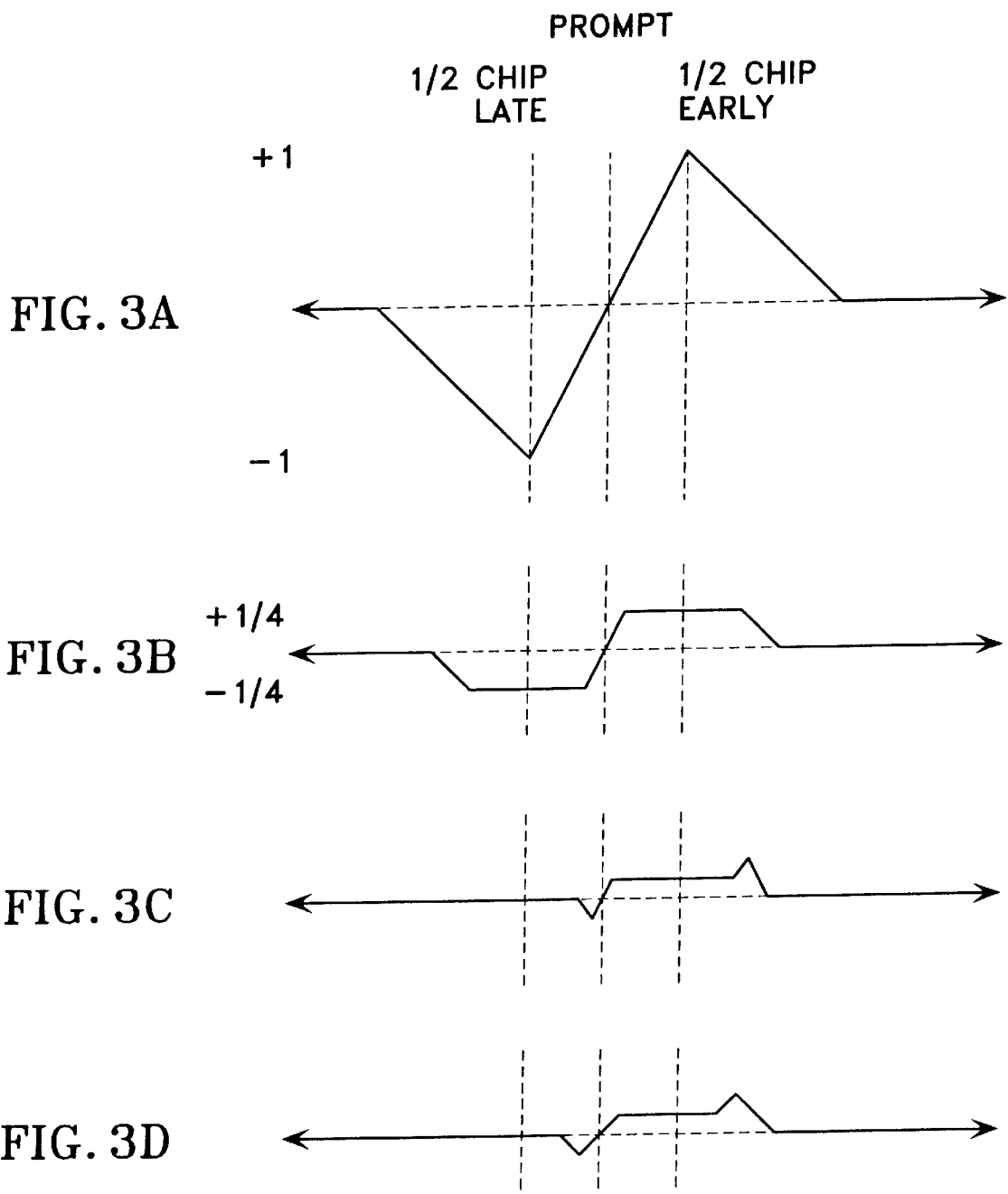

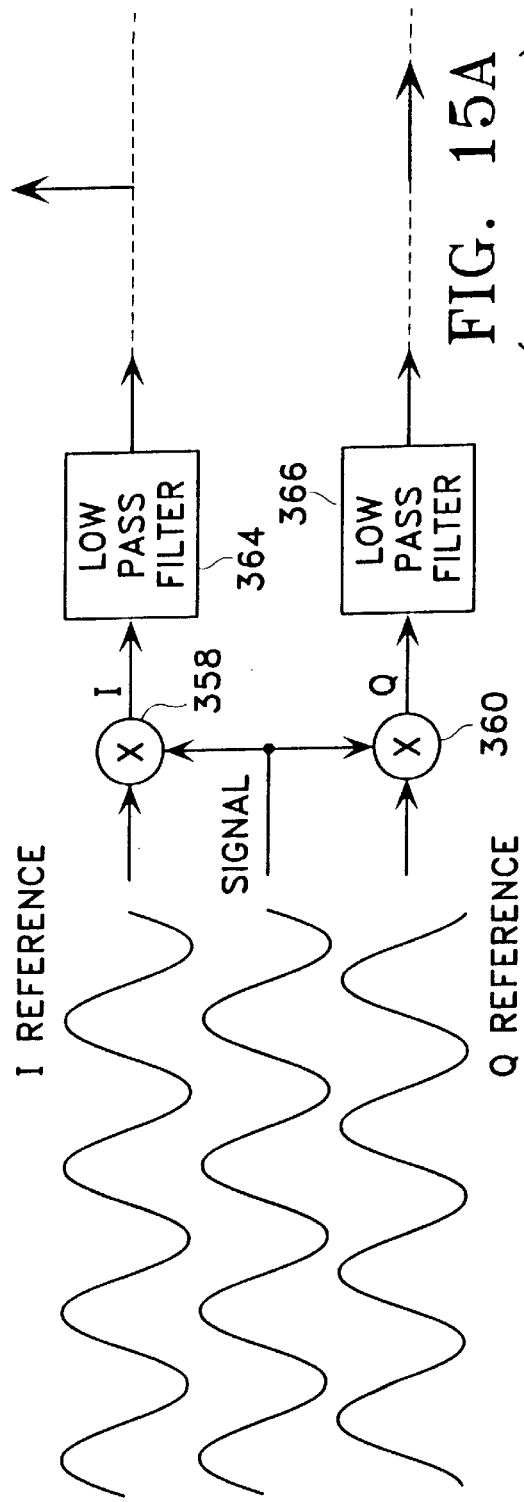
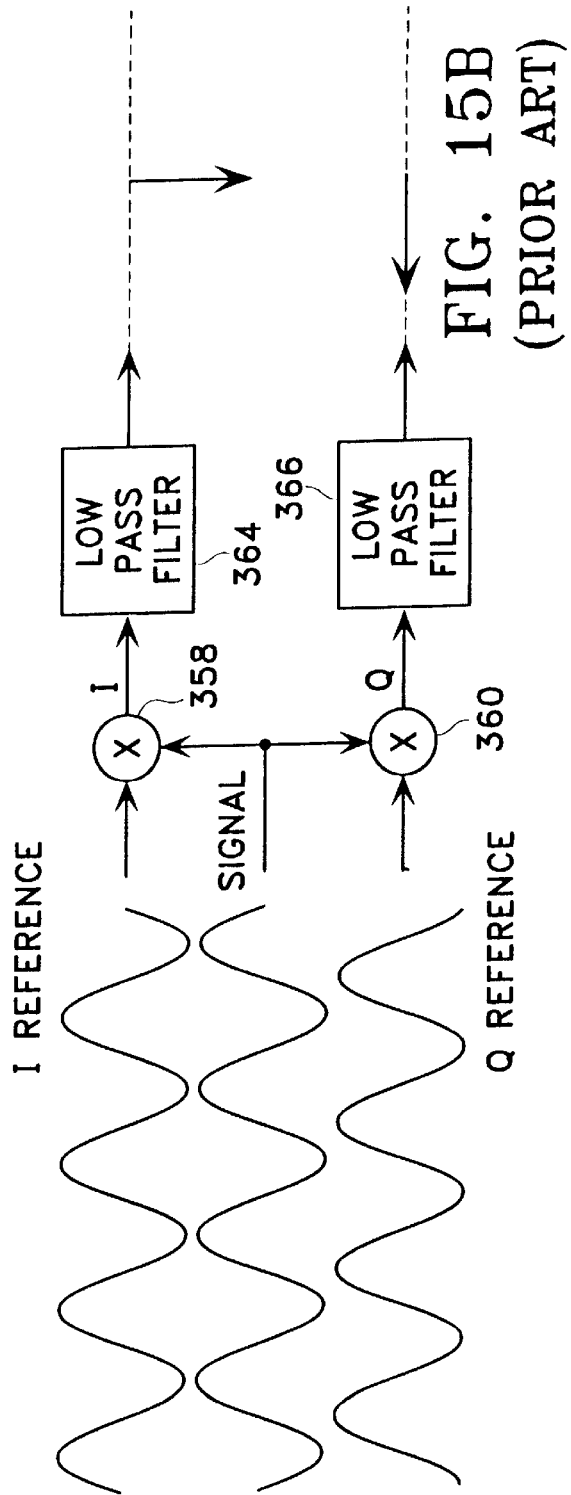
FIG. 15A (PRIOR ART)
FIG. 15B (PRIOR ART)

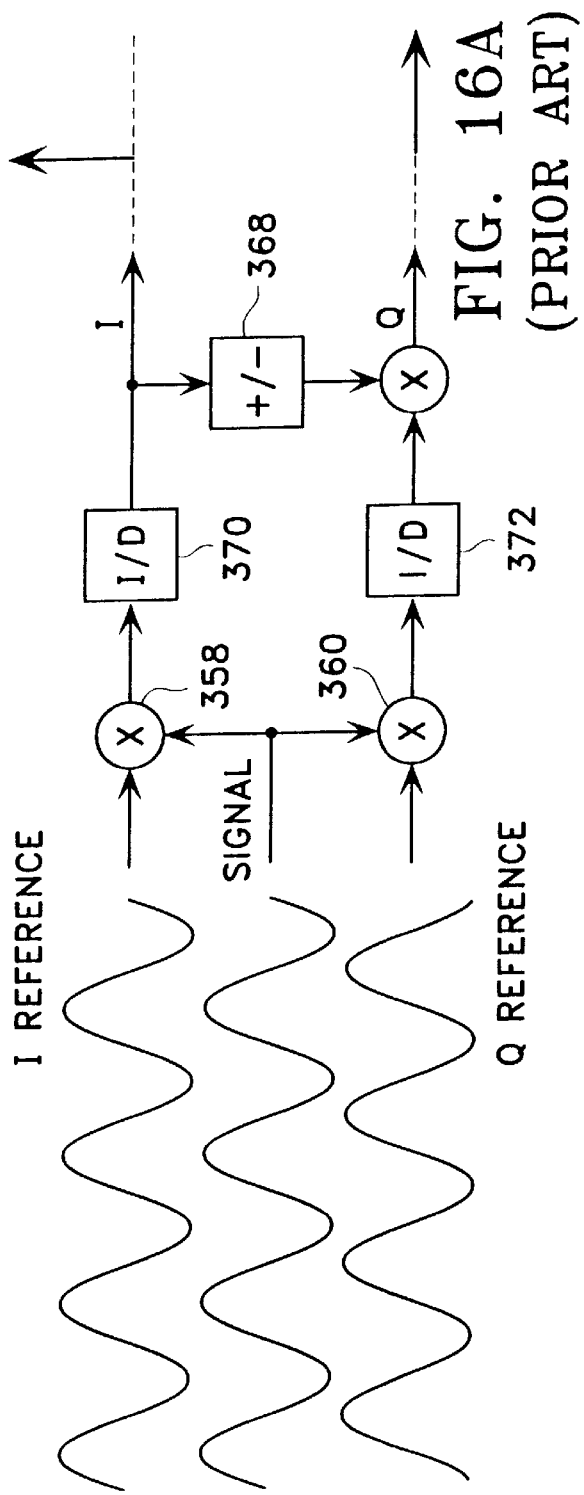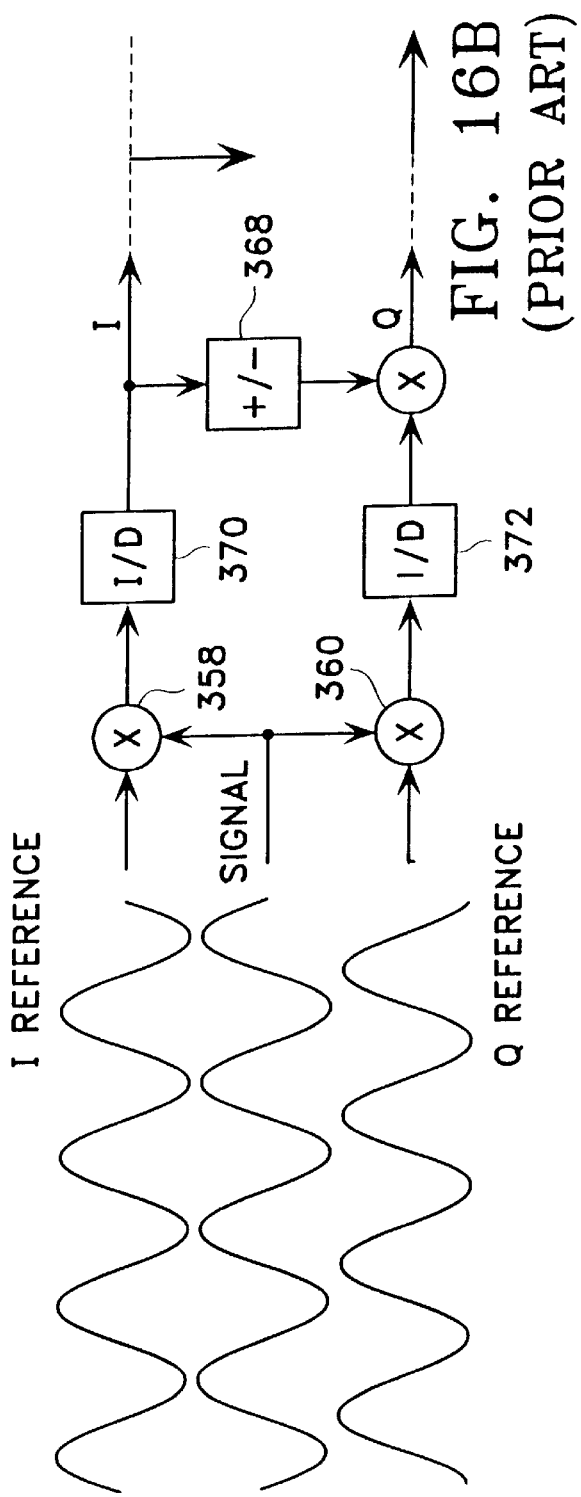
FIG. 16A (PRIOR ART)
FIG. 16B (PRIOR ART)

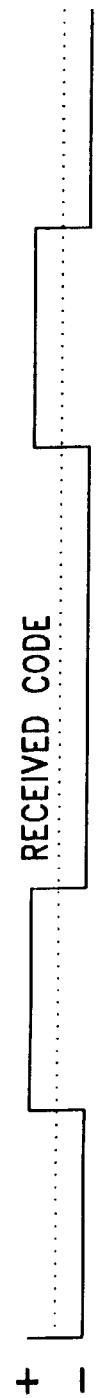
FIG. 17A (PRIOR ART) RECEIVED CODE
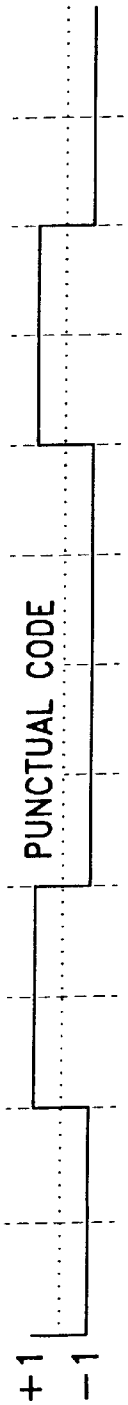
FIG. 17B (PRIOR ART) PUNCTUAL CODE
FIG. 17C (PRIOR ART) EARLY CODE
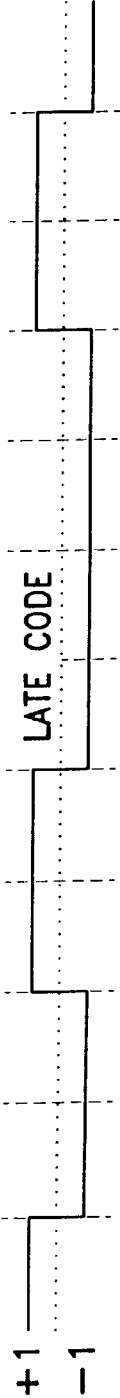
FIG. 17D (PRIOR ART) LATE CODE
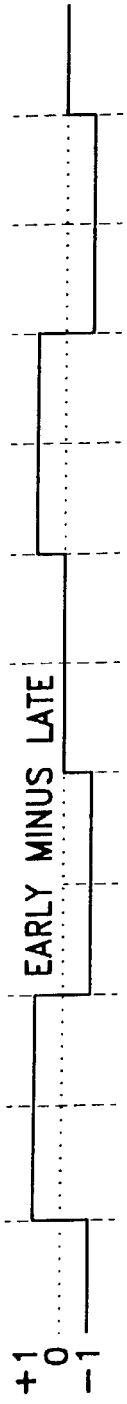
FIG. 17E (PRIOR ART) EARLY MINUS LATE
FIG. 17F (PRIOR ART) PUNCTUAL E-L PRODUCT
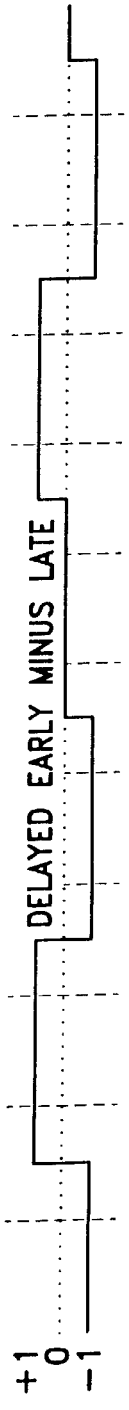
FIG. 17G (PRIOR ART) DELAYED EARLY MINUS LATE
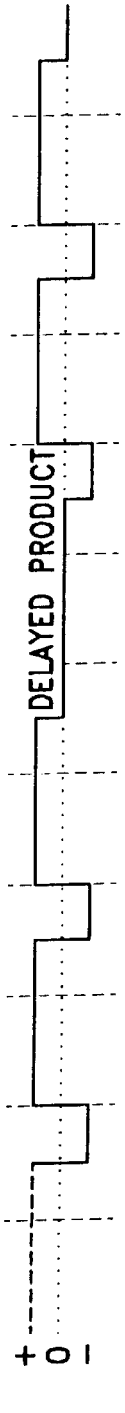
FIG. 17H (PRIOR ART) DELAYED PRODUCT

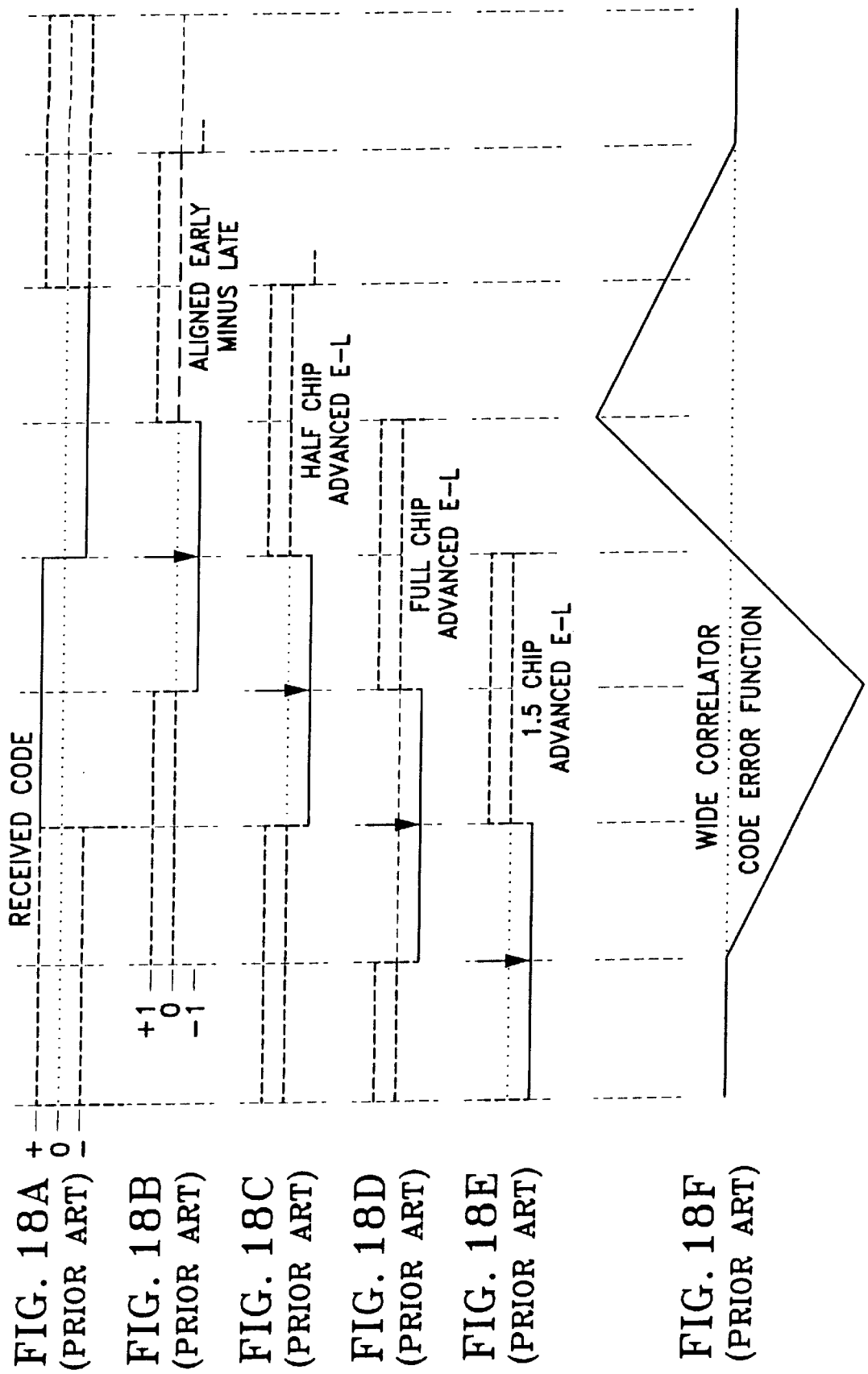

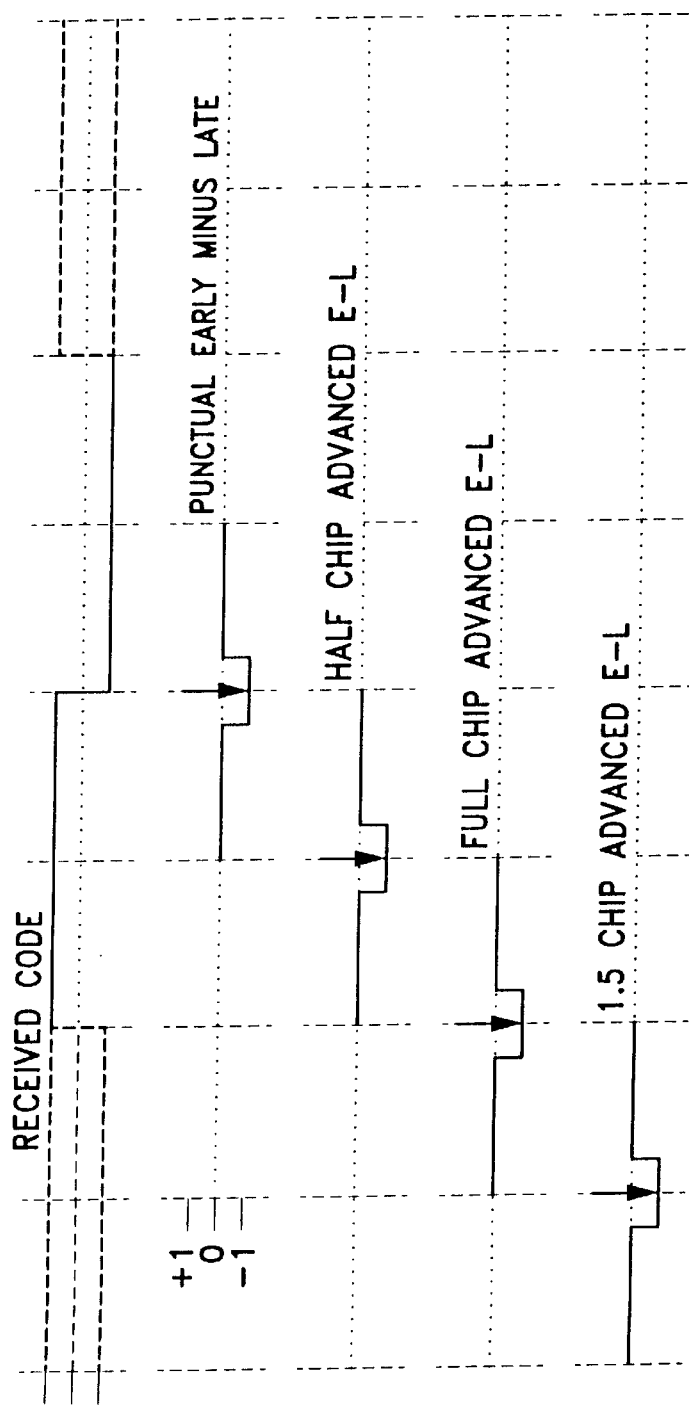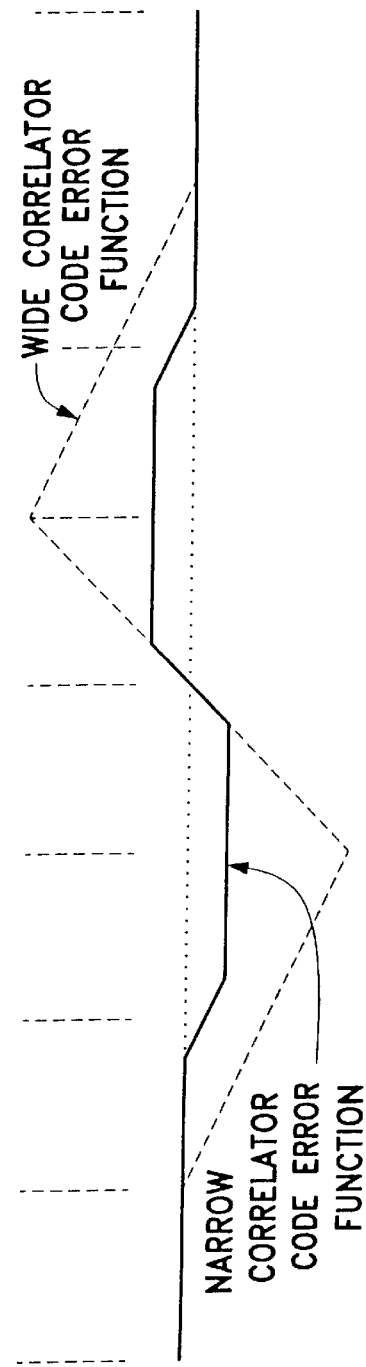
FIG. 21A (PRIOR ART)
FIG. 21B (PRIOR ART)
FIG. 21C (PRIOR ART)
FIG. 21D (PRIOR ART)
FIG. 21E (PRIOR ART)
FIG. 21F (PRIOR ART)

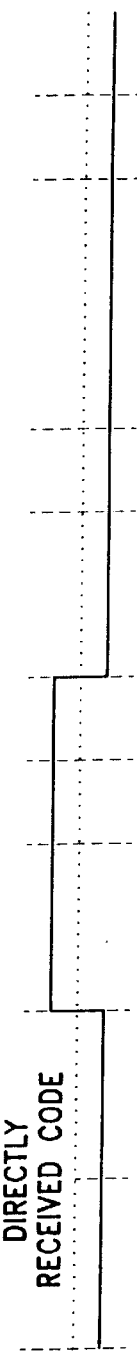
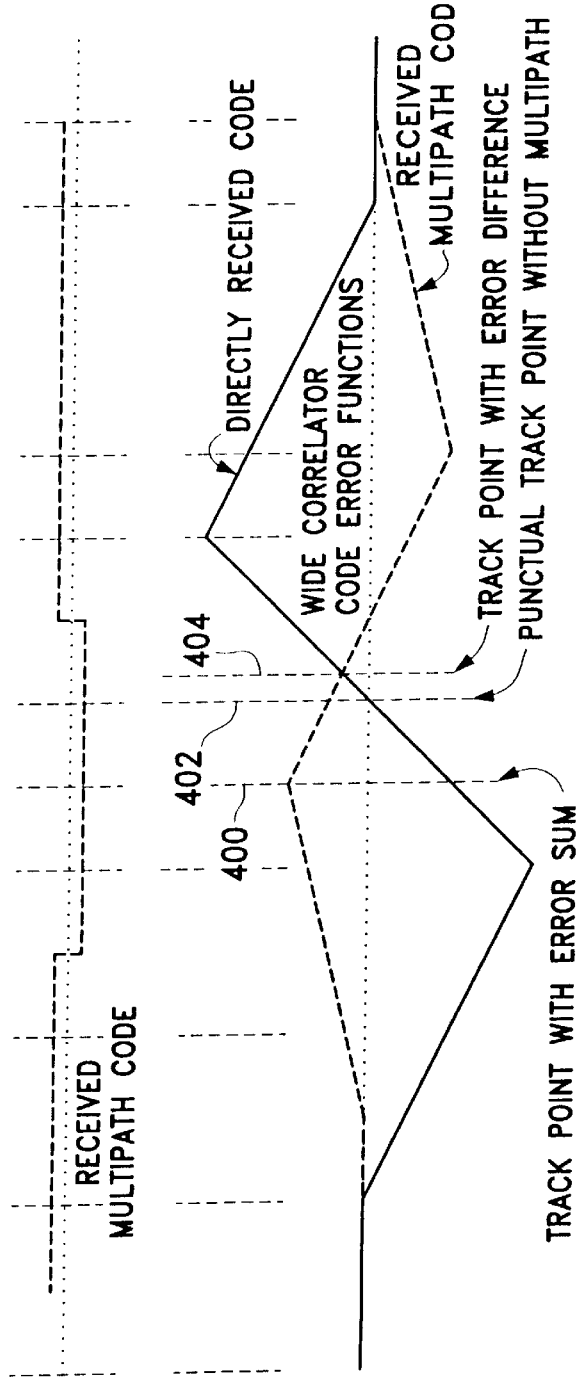
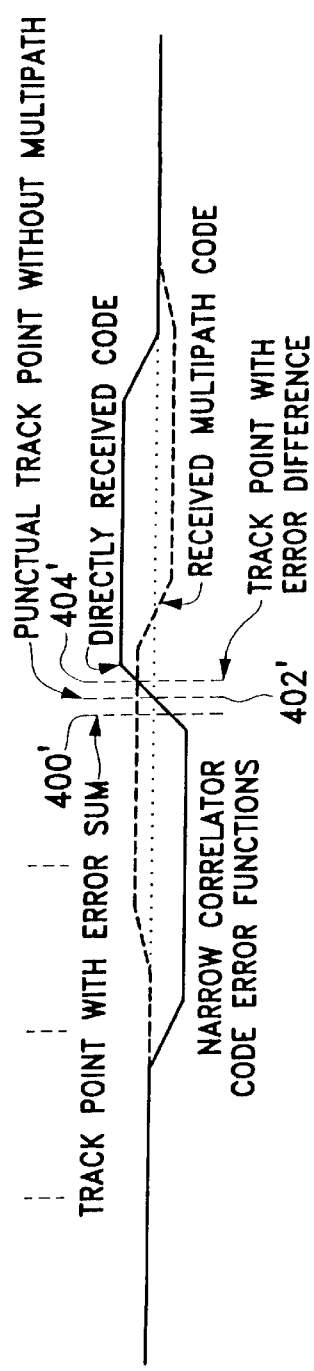
FIG. 22A (PRIOR ART)
FIG. 22B (PRIOR ART)
FIG. 22C (PRIOR ART)
FIG. 22D (PRIOR ART)

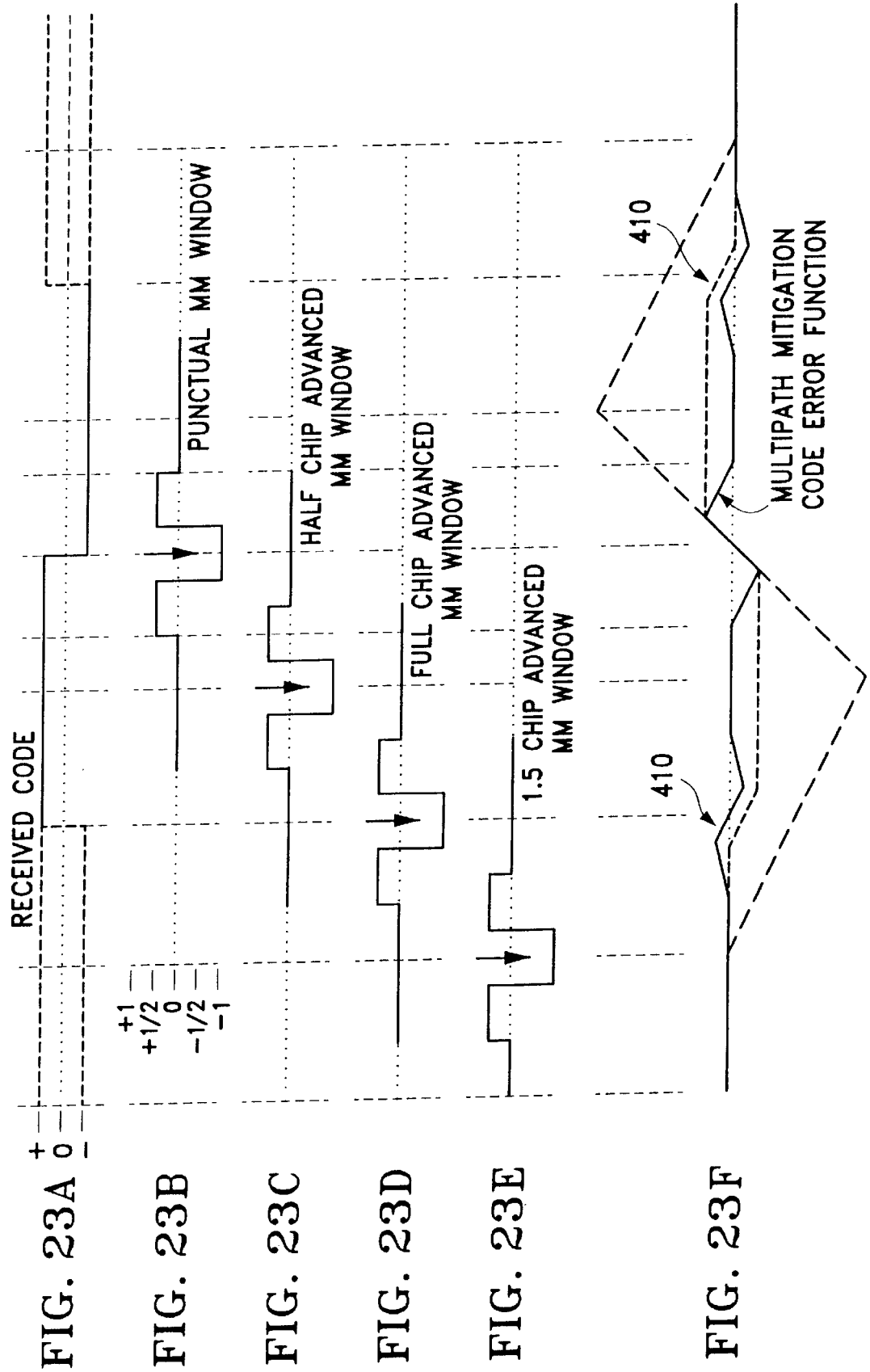

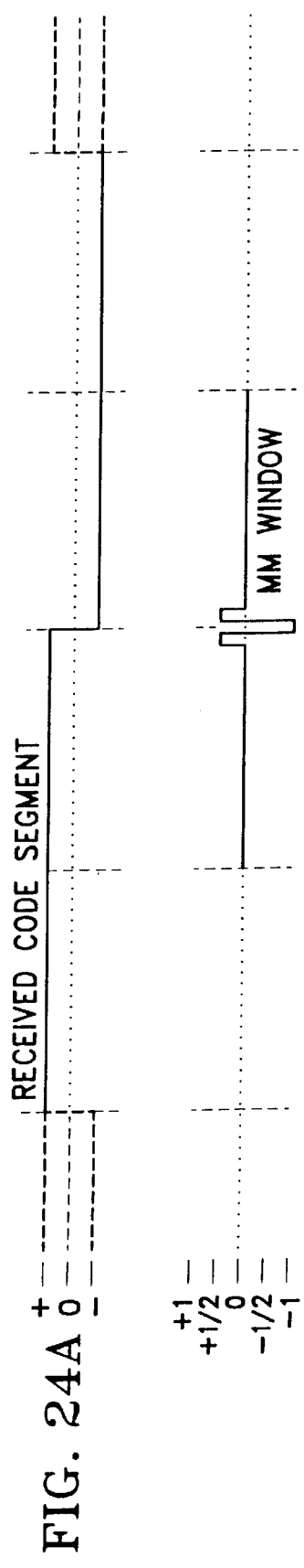
FIG. 24A
FIG. 24B
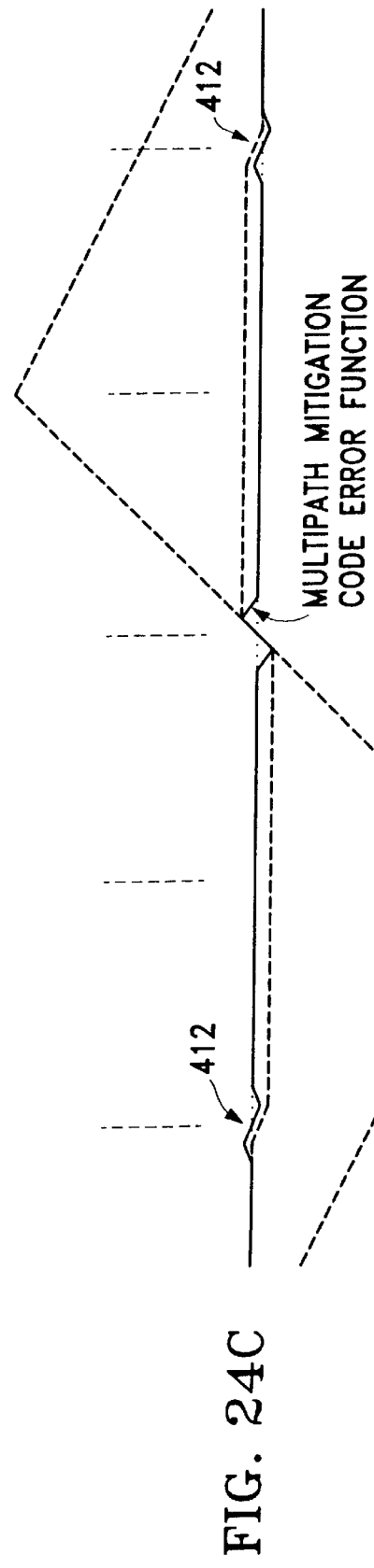
FIG. 24C

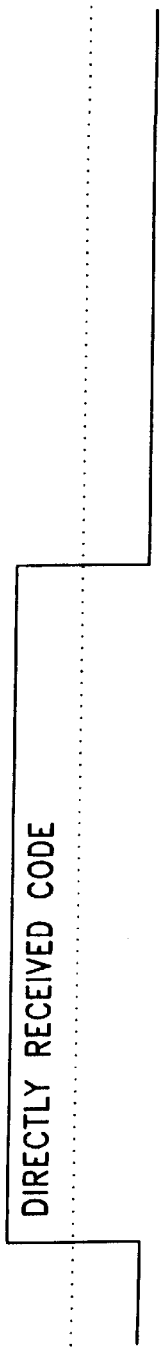
FIG. 25A  DIRECTLY RECEIVED CODE

FIG. 25B  RECEIVED MULTIPATH CODE

FIG. 25C  NARROW CORRELATOR WINDOW

FIG. 25D  MULTIPATH MITIGATION WINDOW

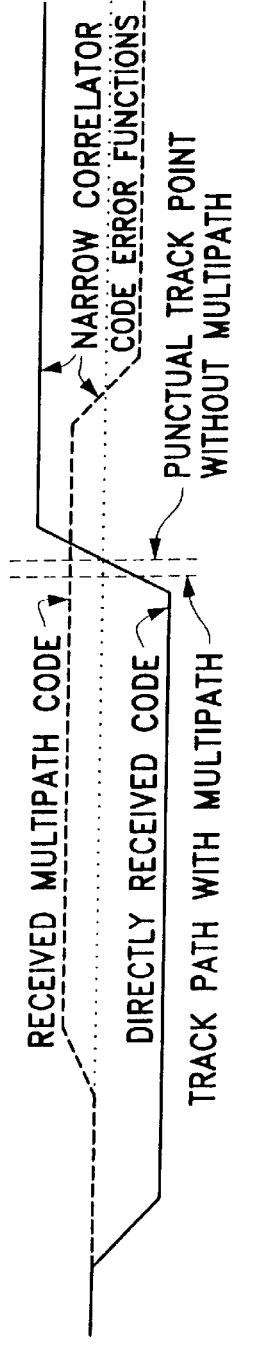
FIG. 25E  NARROW CORRELATOR CODE ERROR FUNCTIONS / PUNCTUAL TRACK POINT WITHOUT MULTIPATH / RECEIVED MULTIPATH CODE / DIRECTLY RECEIVED CODE / TRACK PATH WITH MULTIPATH

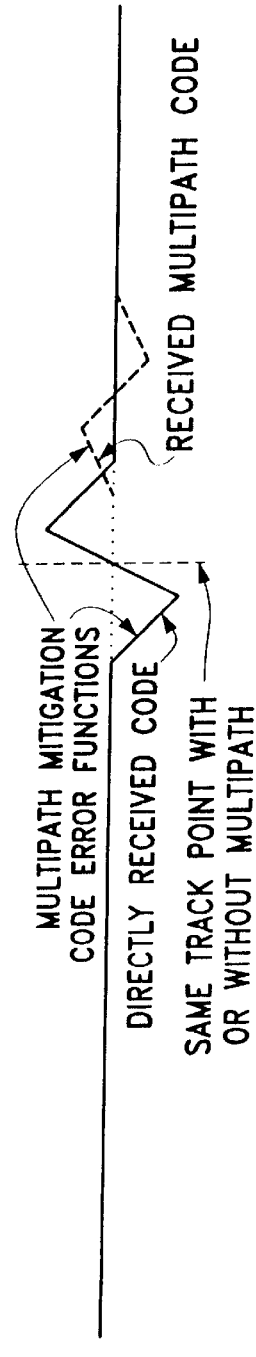
FIG. 25F  RECEIVED MULTIPATH CODE / MULTIPATH MITIGATION CODE ERROR FUNCTIONS / DIRECTLY RECEIVED CODE / SAME TRACK POINT WITH OR WITHOUT MULTIPATH

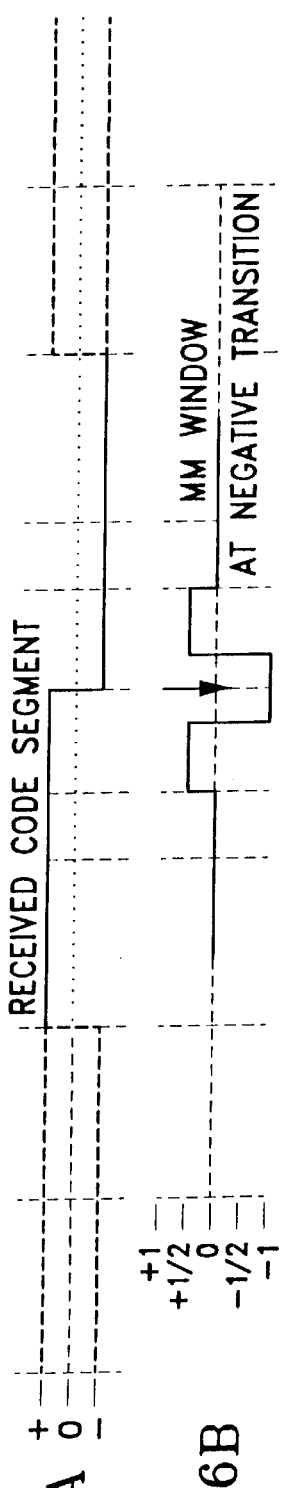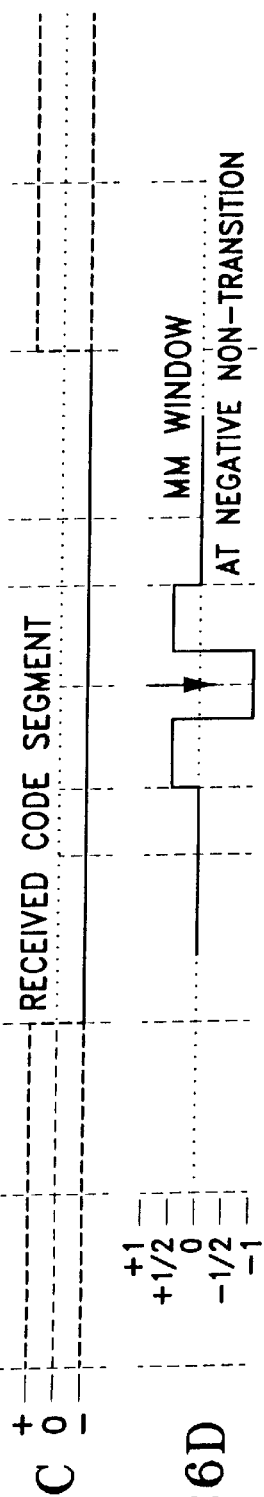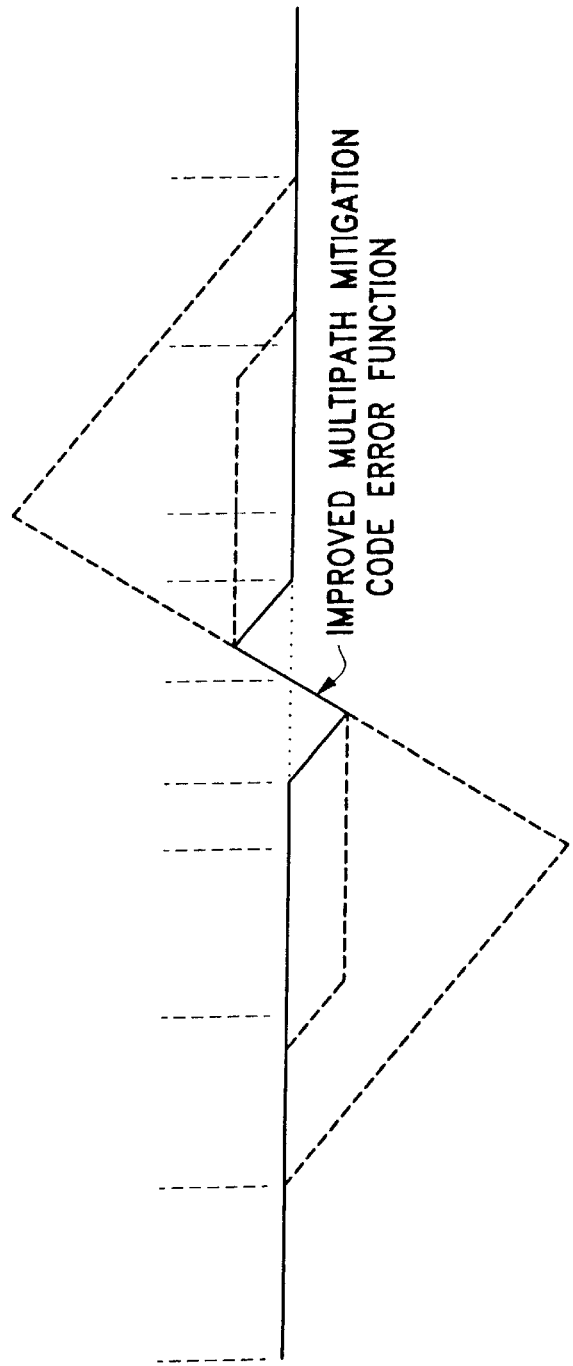

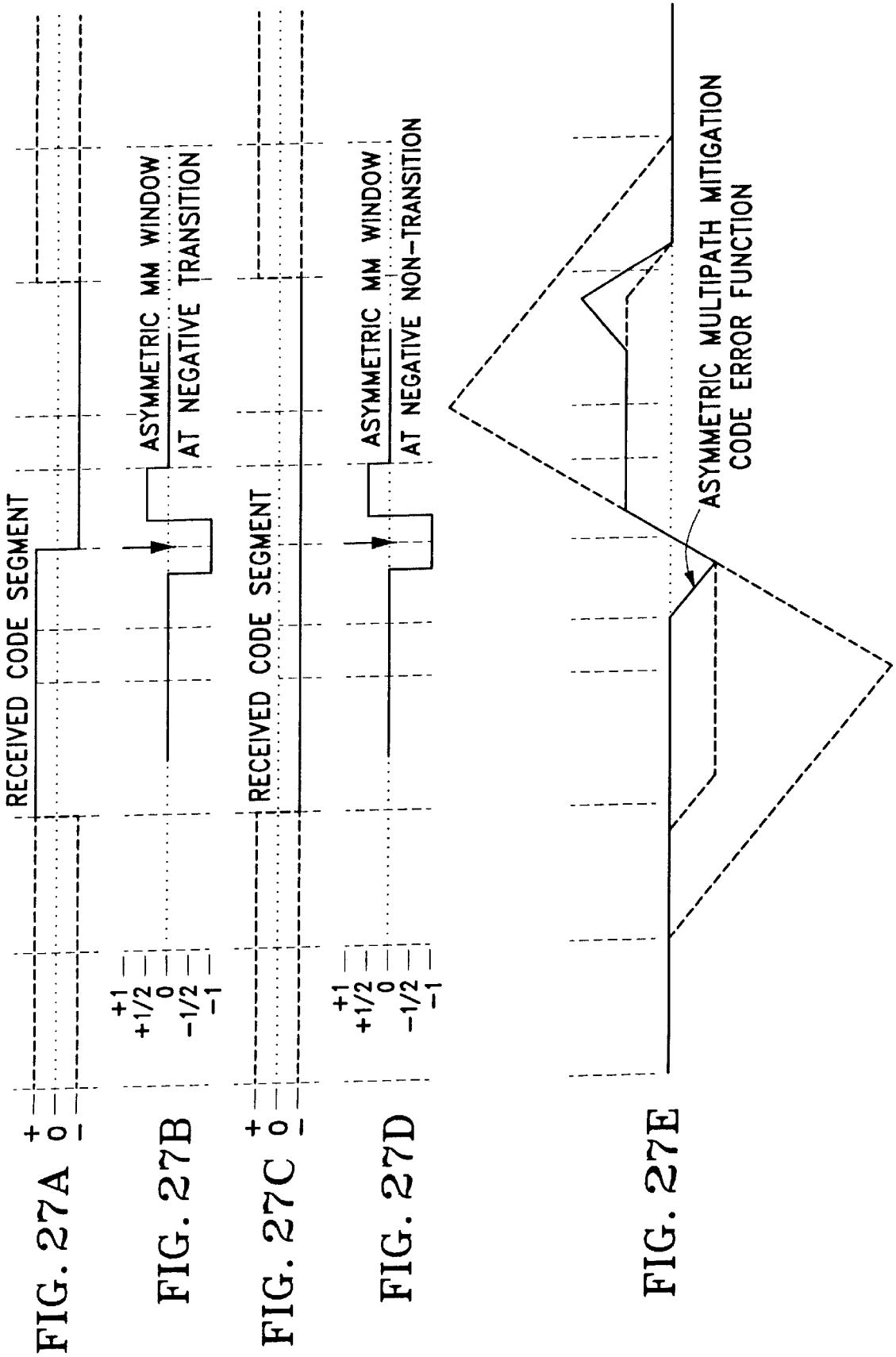

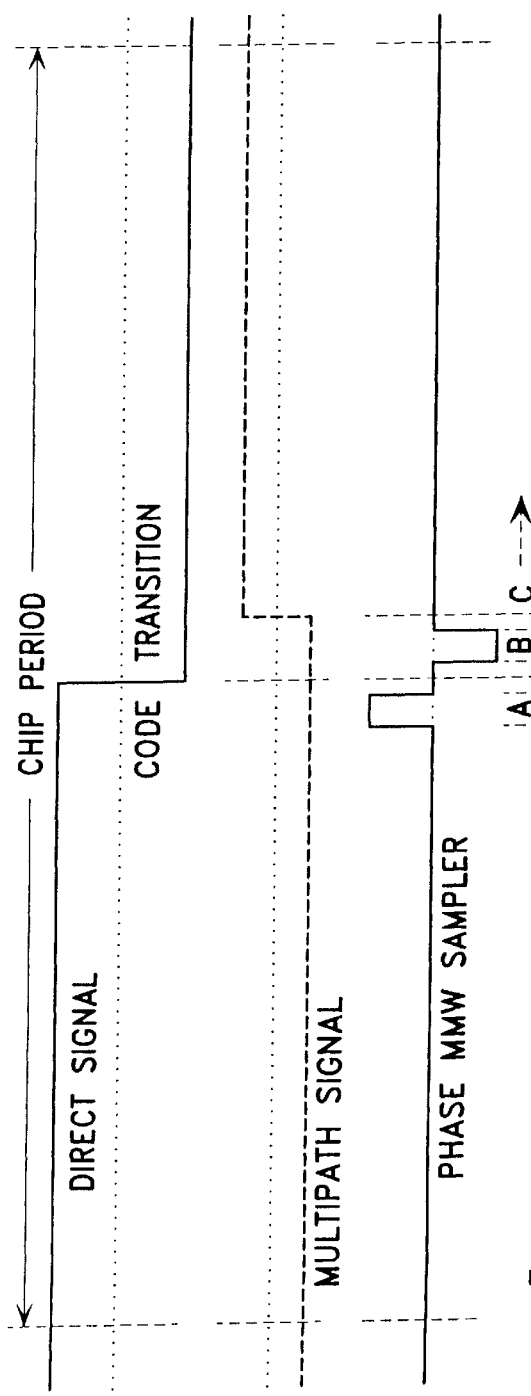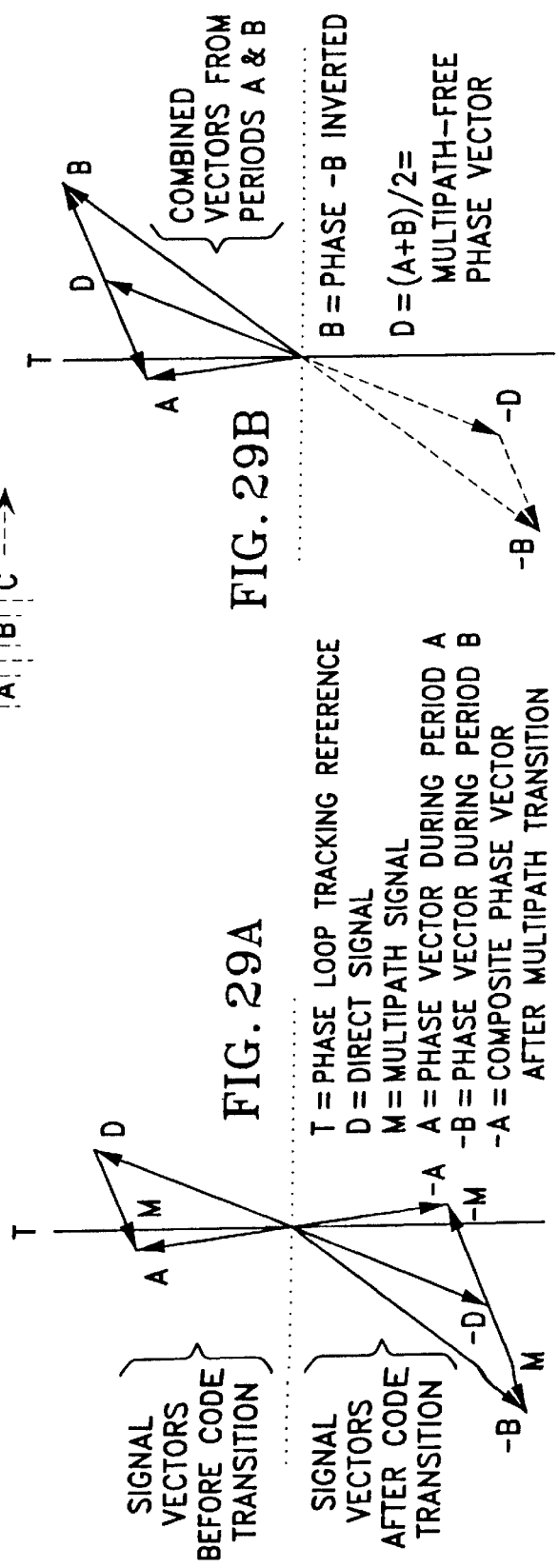
FIG. 28A
FIG. 28B
FIG. 28C
FIG. 29A
FIG. 29B

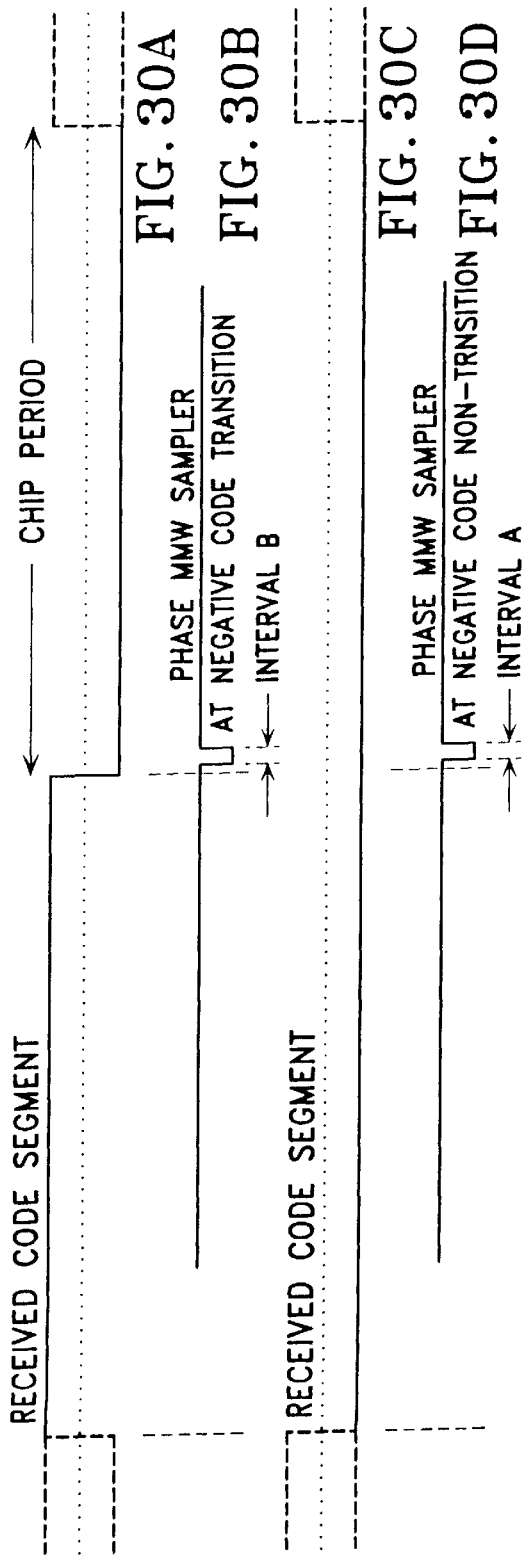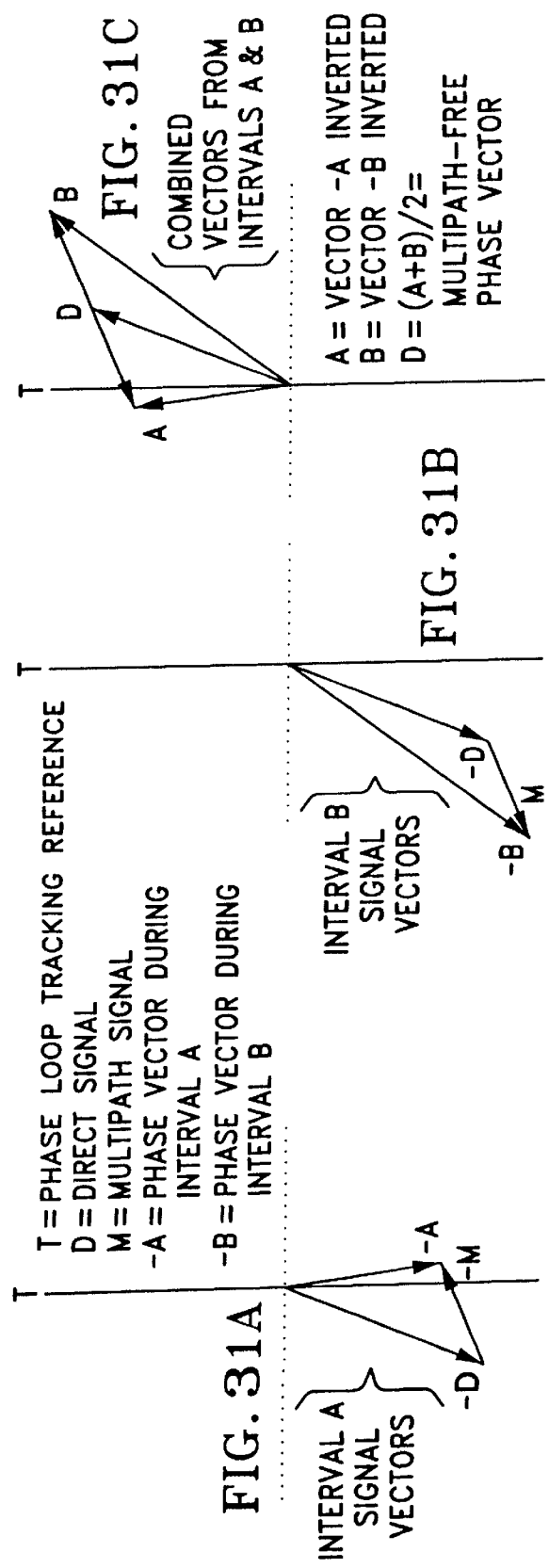

FIG. 36A SIGNAL SAMPLES

FIG. 36B RECEIVER CLOCK

FIG. 36C CLOCK 0

FIG. 36D CLOCK 1

FIG. 36E STATE 0

FIG. 36F STATE 1

FIG. 36G PUNCTUAL CODE

FIG. 36H CODE MMW

FIG. 36I PHASE MMW

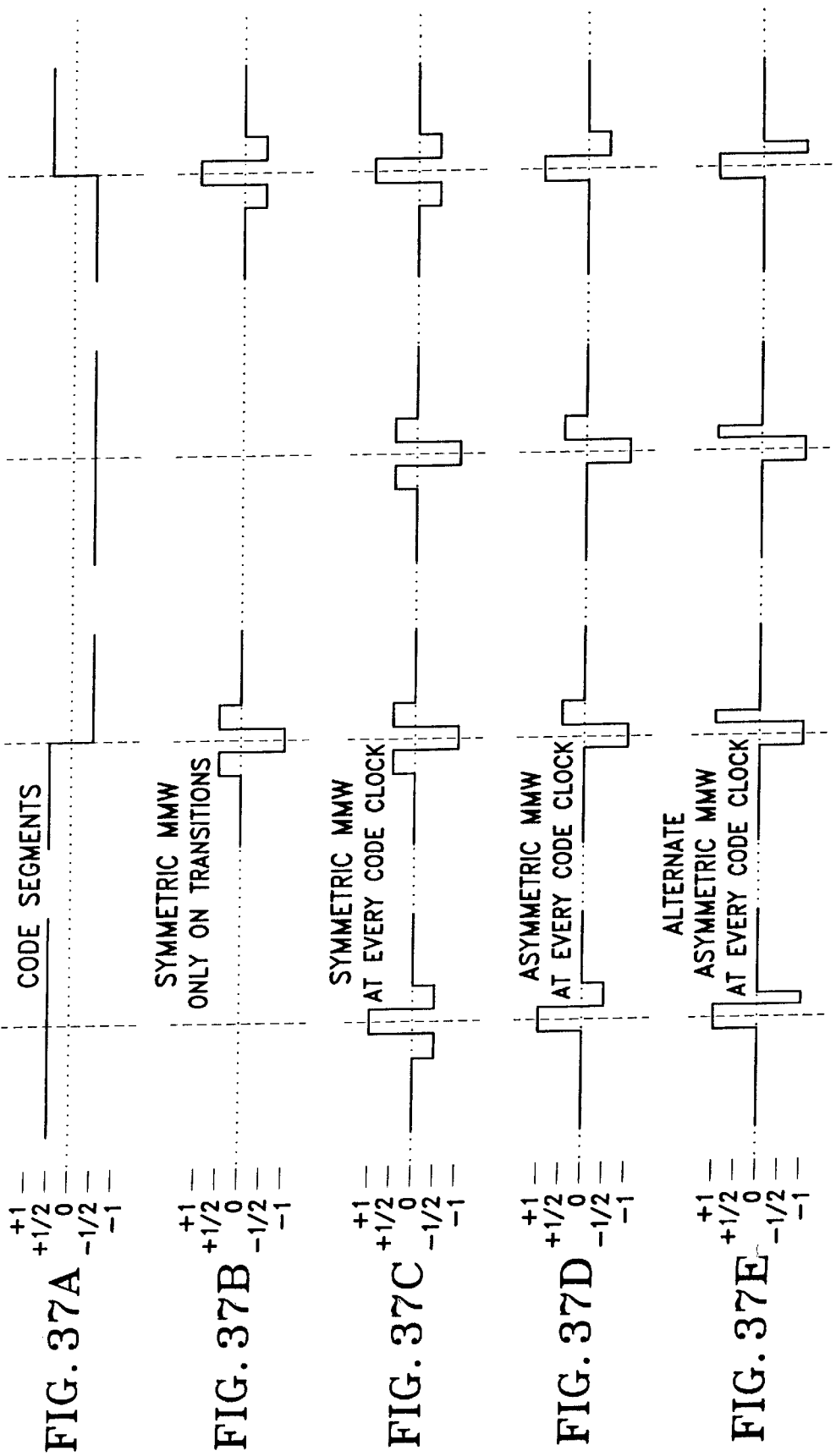

MITIGATION OF MULTIPATH EFFECTS IN GLOBAL POSITIONING SYSTEM RECEIVERS

This application is a division of international application number PCT US/96/07774 filed May 24, 1996 pending.

BACKGROUND OF THE INVENTION

The present invention relates generally to Global Positioning System ("GPS") signal receivers. More particularly, the present invention relates to a novel and improved technique for code synchronization and carrier synchronization within such receivers, the technique being highly insensitive to received multipath signal energy. Overview of GPS and the code synchronization problem:

The global positioning system (GPS) may be used for determining the position of a user on or near the earth, from signals received from multiple orbiting satellites. The orbits of the GPS satellites are arranged in multiple planes, in order that signals can be received from at least four GPS satellites at any selected point on or near the earth.

The nature of the signals transmitted from GPS satellites is well known from the literature, but will be described briefly by way of background. Each satellite transmits two spread-spectrum signals in the L band, known as L1 and L2, with separate carrier frequencies. Two signals are needed if it is desired to eliminate an error that arises due to the refraction of the transmitted signals by the ionosphere. Each of the carrier signals is modulated in the satellite by at least one of two pseudorandom noise (PRN) codes unique to the satellite. This allows the L-band signals from a number of satellites to be individually identified and separated in a receiver. Each carrier is also modulated by a slower-varying data signal defining the satellite orbits and other system information. One of the PRN codes is referred to as the C/A (clear/acquisition) code, while the second is known as the P (precise) code.

In the GPS receiver, the signals corresponding to the known P-code and C/A code may be generated in the same manner as in the satellite. The L1 and L2 signals from a given satellite are demodulated by aligning the phases, i.e., by adjusting the timing, of the locally-generated codes with those modulated onto the signals from that satellite. In order to achieve such phase alignment the locally generated code replicas are correlated with the received signals until the resultant output signal power is maximized. Since the time at which each particular bit of the pseudorandom sequence is transmitted from the satellite is defined, the time of receipt a particular bit can be used as a measure of the transit time or range to the satellite. Again, because the C/A and P-codes are unique to each satellite, a specific satellite may be identified based on the results of the correlations between the received signals and the locally-generated C/A and P-code replicas.

Each receiver "channel" within the GPS receiver is used to track the received signal from a particular satellite. A synchronization circuit of each channel provides locally generated code and carrier replicas, which are synchronous with each other. During acquisition of the code phase within a particular channel, the received satellite signal is correlated with a discrimination pattern comprised of some combination of "early" and "late" versions of the channel's locally generated code replica. The resultant early-minus-late correlation signals are accumulated and processed to provide feedback signals to control code and carrier synchronization.

Historically, the phase difference between the early and late code versions generated within the GPS receiver has been equivalent to one code chip (i.e., 1.0 chip correlator spacing). A number of factors have contributed to widespread use of early-minus-late discrimination patterns relying upon 1.0 chip correlator spacing. For example, in analog GPS receivers this correlator spacing minimized the required hardware. Also, early GPS receivers typically utilized P-code (rather than CIA code) tracking, in which synchronization is established with relatively short-duration P-code chips. As a consequence, it was believed that the use of narrow correlator spacings, i.e., less than 1 chip, could result in loss of code lock due to Doppler and other disturbances. Such narrower spacings also increase the requisite speed of P-code signal processing circuitry, which is of necessity already relatively fast due to the high P-code chip rate.

Recently, digital GPS receivers relying upon C/A code tracking have been developed which employ correlator spacings of less than one C/A code chip. Such narrow correlator spacing is believed to reduce code-tracking error by increasing the correlation between the "early" and "late" noise contributions, which tend to cancel in the early-minus-late code discriminator. Although discrimination patterns characterized by narrow early-minus-late correlator spacing afford improved C/A code tracking, such early-minus-late discrimination schemes are still relatively sensitive to received multipath signal energy. Multipath signal energy arises due to reflections of the satellite signals from objects within the vicinity of the GPS receiver antenna. Since the multipath signals are processed together with the GPS signal directly received from the satellite, code and carrier tracking can be significantly corrupted by multipath errors.

Since multipath energy is always delayed relative to directly received GPS signals, multipath energy tends to corrupt the locally generated "late" version of a code signal rather than the early version. As a consequence, GPS receivers have been developed which utilize an "early-minus-prompt" discrimination pattern in the code correlation process. By forming the discrimination pattern based on the difference of the early and prompt, or "on-time", code replicas, it has been possible to somewhat reduce the deleterious effects of multipath. However, it is believed that substantially improved performance could be obtained through the use of discrimination patterns even less susceptible to adverse multipath effects.

Accordingly, it is an object of the present invention to provide a method of code synchronization which is even less sensitive to the effects of multipath than are techniques predicated on the use of "early-minus-prompt" discrimination patterns.

More detailed background—GPS fundamentals:

(a) Spread spectrum signal fundamentals:

Although there are several ways to create a spread spectrum signal, the one most often used is "direct spreading" with a pseudorandom code, which is the technique used in GPS. (Pseudorandom codes are often called PN or PRN codes, meaning pseudorandom noise codes.) The most frequently used pseudorandom code is a binary sequence, i.e., the signal has only two states, e.g., +1 or zero. It is equally valid and often useful to define the two states as +1 and −1. Each of these notations will be used in this discussion, depending on the circumstance.

The term "pseudorandom" refers to the fact that these codes appear to be a random sequence of +1's and −1's, but that the code is not truly random and repeats identically over and over. The two key characteristics of a pseudorandom code are its clock rate and its code length. The clock rate defines how often the code can change state (e.g., from +1 to −1 or from −1 to +1), and the code length defines how many bits, or chips, make up the code and, therefore, how often it repeats at a given clock rate. The GPS C/A code is clocked at 1.023 MHz, it has 1,023 bits, so it repeats 1,000 times per second.

(b) Autocorrelation function:

The autocorrelation function is a useful way to envision the properties of a pseudorandom code. Table I illustrates the autocorrelation function with a 15-bit code, (111100010011010), which has the same desirable properties as any maximal length pseudorandom code.

TABLE I

Illustration of Code Correlation Function

| 111100010011010111100010011010 | Two Repetitions of Reference Code |
|---|---|
| 111100010011010 | +15 Agreements, autocorrelation = 1 |
| 111100010011010 | −1 Agreements, autocorrelation = −1/15 |
| 111100010011010 | −1 Agreements, autocorrelation = −1/15 |
| 111100010011010 | −1 Agreements, autocorrelation = −1/15 |
| 111100010011010 | −1 Agreements, autocorrelation = −1/15 |
| 111100010011010 | −1 Agreements, autocorrelation = −1/15 |
| 111100010011010 | −1 Agreements, autocorrelation = −1/15 |
| 111100010011010 | −1 Agreements, autocorrelation = −1/15 |
| 111100010011010 | −1 Agreements, autocorrelation = −1/15 |
| 111100010011010 | −1 Agreements, autocorrelation = −1/15 |
| 111100010011010 | −1 Agreements, autocorrelation = −1/15 |
| 111100010011010 | −1 Agreements, autocorrelation = −1/15 |
| 111100010011010 | −1 Agreements, autocorrelation = −1/15 |
| 111100010011010 | −1 Agreements, autocorrelation = −1/15 |
| 111100010011010 | −1 Agreements, autocorrelation = −1/15 |
| 111100010011010 | +15 Agreements, autocorrelation = −1/15 |

The code states are shown as 0 and 1 for illustration convenience. On the top line, the 15-bit code is repeated twice. On the second line the 15-bit code is in perfect alignment with the first code sequence in the top line. Every bit in the second line agrees with the corresponding bit in the line above it. Therefore, with 15 agreements out of 15 possibilities, the autocorrelation has a value of 1, meaning 100% correlation. The last line in the table is seen to be perfectly aligned with the second code sequence in the top line. It also has 15 out of 15 agreements and an autocorrelation value of 1. The bits in every line between the second and the last agree with the corresponding bits in the top line only 5 times and disagree 6 times, for a net count of one disagreement. Therefore, a particularly useful characteristic of these codes is that a code shift of only one bit from perfect alignment causes the autocorrelation function to drop from +1 to −1/N, where N is the number of bits in the code. For a code length of 1,023 bits, the autocorrelation function drops from +1 at perfect alignment to −1/1023 with a one bit shift. For most practical purposes we can consider the autocorrelation function to be zero whenever codes are misaligned by one or more bits.

FIGS. 7A–7G show the same process as Table I. In this case, however, each code chip in FIGS. 7A–7F is drawn as a horizontal line with a width of one clock period. The 15-chip code repetition period also is designated. FIG. 7A depicts a continuing code sequence; FIG. 7B shows a replica of one code repetition period in perfect alignment with the code of FIG. 7A; and FIGS. 7C–7F show the same code sequence advanced in time by ¼ chip, ½ chip, ¾ chip and one chip, respectively. Finally, FIG. 7G plots the autocorrelation function with respect to time displacement, measured in chips. The purpose of this diagram is to illustrate that the autocorrelation function has a value of 1 at perfect alignment and drops linearly with increasing code displacement to the −1/N value with a displacement of one bit or more. The distance between autocorrelation peaks is the code repetition period, and the total width of the autocorrelation "pulse" is two chips or code clock periods.

GPS satellites transmit two codes, the C/A code and the P code. The C/A code has a clock period of about 977.5 nanoseconds and a code repetition period of 0.001 second. The P code has a clock period of about 97.75 nanoseconds and a code repetition period of one week.

(c) Spread Spectrum Signal:

A direct sequence spread spectrum signal is normally created by biphase modulating a narrowband signal with a pseudorandom code, as shown in FIGS. 8 and 9A–9C. FIG. 8 shows a biphase modulator 300, which modulates a carrier received on line 302 with a code signal received on line 304, outputting the modulated carrier on line 306. The carrier is depicted in FIG. 9A, the code in FIG. 9B and the modulated, spread-spectrum output signal in FIG. 9C. The carrier and the code are not necessarily drawn to the same scale and are shown only for purposes of illustration. When the code is in the +1 state, the carrier signal is not inverted. When the code is in the −1 state, the carrier signal is inverted.

The spectral result of this process is shown in FIG. 10. The original carrier frequency at $F_O$ is suppressed, and the total signal energy is spread over a bandwidth around $F_O$ of plus and minus the code clock frequency to first nulls. Spectral components outside this bandwidth also are created, but at ever lower amplitude with frequency separation.

FIG. 10 also shows a line structure within the spread spectrum envelope. These spectral lines occur at the code repetition frequency. The GPS L1 carrier frequency of 1575.42 MHz carries both a C/A code and a P (or Y) code. The C/A code energy is spread over a bandwidth of ±1.023 MHz around L1, and the signal has spectral components every 1 kHz, which is the C/A code repetition frequency. The P code is spread over a bandwidth ±10.23 MHz around L1, and the spectral components are at an undetectable one cycle per week, which is the P code repetition frequency.

(d) GPS Signal Structure:

FIG. 11 is a highly simplified block diagram of a GPS satellite. In light of the preceding sections, this diagram explains the nature of the GPS signals. FIG. 11 shows that there are five key functions of the satellite, all driven by a single atomic clock 310 with a frequency of 10.23 MHz. The L1 carrier frequency of 1575.42 MHz is obtained by multiplying 10.23 MHz by 154, as indicated by frequency multiplier 312. The L2 carrier frequency of 1227.6 MHz is 120 times the clock and is obtained through another frequency multiplier 314. The P code rate is 10.23 MHz and is obtained directly from the clock 310. The C/A code rate is one tenth the clock frequency and is obtained through a frequency divider 316. Even the 50 bit per second data rate from the memory is derived from the atomic clock 310, through another frequency divider 318. It can be said that all of these signals are coherent because they are derived from a single clock.

Each GPS satellite normally transmits three navigation signals. One is on the L2 carrier signal and is based on the P code from a P code generator 322, and two are on the L1 carrier signal and are based on the P code from the P code generator and the C/A code from a C/A code generator 324, respectively. To accomplish this, the L1 carrier signal is first divided into two components that are in phase quadrature, as indicated at 320. Each of these components is individually modulated with navigation signals before being combined, amplified, and transmitted.

A memory 326 produces data at 50 bits per second. These data bits are combined in EXCLUSIVE OR gates 328 and 330, respectively, with the CIA code and with the P code. The effect is to invert or not to invert the polarity of the code bits depending on whether the current data bit is a zero or a one. The combined C/A code with data bits is used to biphase modulate one of the two L1 components, creating a spread spectrum signal as described previously. The combined P code with data bits is used to bi-phase modulate the other L1 component and the L2 carrier signal.

(e) GPS Anti-Spoofing:

The U.S. Department of Defense, which operates the Global Positioning System, wants to prevent an enemy from spoofing their GPS receivers by transmitting a false signal which could be accepted as real. This is accomplished in the GPS satellites by encrypting the P code before it is transmitted. The process is called anti-spoofing (AS), and the resultant code is called the Y code. As described in U.S. Pat. No. 4,972,431, issued in the name of Richard G. Keegan, the Y code is an EXCLUSIVE OR combination of the 10.23 MHz P code and an encryption code which is clocked at approximately 500 kHz.

Purpose and Advantages of Tracking Spread Spectrum Signals:

FIG. 12 and FIGS. 13A and 13B illustrate a basic spread spectrum signal tracking concept. "Tracking," in the context of this invention, is synonymous with synchronization. The spread spectrum signal (FIG. 13A) being received by an antenna 332 is the product of a narrowband signal S and the pseudorandom code C. This signal plus the incoming wideband noise N are biphase modulated, as indicated at 334 with a locally generated version of the same code C. When the time phase of the received code and the locally generated code are accurately aligned, the biphase modulation originally applied to the signal is canceled by again modulating the signal with the same code. The result is the original narrowband signal S before it was initially modulated. The narrowband signal S now can be filtered by an appropriately narrow filter 336, which allows the entire signal through but rejects most of the wideband noise, as indicated in FIG. 13B.

Note that cancellation of the biphase modulation does not occur unless the two codes are identically the same and are accurately aligned, meaning that the autocorrelation function of the two codes must be near one. This characteristic explains why it is possible for all GPS satellites to transmit on the same L1 and L2 frequencies. Each satellite uses a different C/A and P code. Therefore, a receiver, or one channel of a multi-channel receiver, can select a single GPS satellite signal by using the appropriate pseudorandom code for that particular satellite. This process is called Code Division Multiple Access (CDMA).

To achieve the required time phase alignment of the locally generated code with the received code, a code search and tracking function is required. An important benefit of the code tracking function is to locally measure the time of arrival of the received code time phase. This is the process used to make pseudorange measurements on GPS signals.

(Ignoring ionospheric and tropospheric refraction effects, if the time of transmission and time of reception of a GPS signal were known precisely, the difference between these times multiplied by the speed of light would give an accurate measure of the distance between the satellite and the receiver. The term pseudorange is used to designate the distance calculated by multiplying the speed of light by the difference between the locally determined receive time and the GPS transmit time. This calculated value contains a bias due to the local clock error, hence the term pseudorange. Simultaneous pseudorange measurements on multiple satellites each contain the same bias, which is removed as part of the navigation calculation.)

An important benefit of spread spectrum signal processing is that the effect of narrowband interfering signals is greatly reduced. When a spread spectrum communication signal is "despread" at a receiver to recover the communication signal in narrowband form, any interfering narrowband signal is simultaneously spread over a wider bandwidth and can be largely removed by filtering.

Digital Tracking Methods:

FIG. 14 is a simplified block diagram of a spread spectrum receiver, using digital signal processing techniques, which is typical of modern GPS receivers. Although this receiver is conventional, one needs to understand its function and operation in order to appreciate the specific problems addressed by the present invention. In the receiver, a single antenna 340 collects all available signals, which are processed through a filter 342, an amplifier 344 and, optionally, a downconverter 346 to obtain a lower IF frequency for further processing. Next, the composite signal is digitally sampled, as indicated by the sampler 348 and clock 350.

A number of digital sampling techniques can be used, of which there are three key characteristics. These are: (1) sampling rate, (2) sample quantification, and (3) single or dual phase sampling.

The sampling rate must be chosen to adequately reproduce the signal in digital form (Nyquist rate) without too much loss of signal-to-noise ratio and without folding out-of-band noise into the signal bandwidth (a phenomenon known as aliasing). Signal sampling also often performs a frequency downconversion of the sampled signal. If the carrier frequency (whether present or suppressed) of the signal being sampled has a frequency of $(N+\delta)$ cycles per sample clock period, where $\delta$ is a fraction between $\pm 0.5$, the carrier frequency of the sampled signal will be $\delta F_S$, where $F_S$ is the sampling frequency. For example, if $\delta$ were 0.25, the phase of the sampled signal would rotate by one quarter of a cycle between samples. The nominal value of 0.25 is not required, but it is typical because of design constraints. A smaller fraction reduces the sampled carrier frequency, which must be high enough to support the full spread spectrum bandwidth without folding at zero frequency. A larger fraction raises the sampled carrier frequency, and with it the upper edge of the spread spectrum signal, which cannot exceed the sampling frequency without aliasing.

Digital samples quantify the composite signal amplitude. The least complex sample is a one-bit quantification of the composite signal. At each sample clock, the sampler only reports whether the signal is positive or negative. More complex digital samplers quantify the signal amplitude at each sample clock into three or more levels. Compared with binary sampling, higher resolution sampling improves signal-to-noise ratio and permits certain types of interfering signals to be attenuated. In addition to a more complex signal sampling circuit, multi-level sampling requires use of an automatic gain control (AGC), not shown, to adjust the signal amplitude to best match the available quantification levels. (Alternatively, the quantification levels can be adjusted to best match the input signal level.)

In processing digital samples, it is necessary to form two signal components, usually called I and Q for in-phase and quadrature components. These components are in phase quadrature with each other, as are the sine and the cosine of an angle. These I and Q components can be created directly by the sampler 348, or they can be formed in later processing. The latter approach is shown in FIG. 14.

FIG. 14 shows only one channel of a multi-channel receiver. Identically the same signal samples are fed to every channel, so there is no relative time delay between channels. As also shown, each channel includes a code generator (PRN coder 350) and a numerically controlled oscillator (NCO 352). The components above these central elements in the figure are used to track the phase of the sampled carrier frequency, and the components below are used to acquire and track the pseudorandom code. These processes are described in the following sections. Briefly, phase tracking is accomplished using a Costas carrier tracker 354, which controls the NCO 352 to effect phase tracking with the received carrier. Code tracking is accomplished with a code tracker 356, which controls the code generator 350 to effect synchronization with the received code signals.

Carrier Phase Tracking:

To begin this description, it is assumed that the code and carrier phase tracking loops in FIG. 14 are synchronized and running properly. This means that the punctual code coming from the PRN Coder 350 is accurately aligned with the same code on the received signal being sampled. The word "punctual" means that the code is aligned as well as possible, rather than having an intentional offset. As a result, correlating the sampled signal with the punctual code produces a narrowband signal which is biphase modulated only by the data bits. In the case of GPS, the data bits modulate the narrowband carrier at a rate of 50 bits per second.

When the numerically controlled oscillator (NCO 352) is phase locked to the incoming signal, it creates two outputs, I Reference and Q Reference, which are in phase quadrature (have a 90-degree phase shift relative to each other) and have precisely the same frequency as the downconverted, intermediate carrier frequency of the sampled signal. These two signals are each correlated (as indicated at 358 and 360) with the output of a punctual code correlator 362 to produce I Punctual and Q Punctual baseband signal components, which are input both to the Costas carrier tracker 354 and to the code tracker 356.

With vector notations in mind, FIGS. 15A and 15B illustrate the I and Q correlation process taking place in the receiver of FIG. 14. FIG. 15A shows the I and Q correlators, each with its own reference signal. Between these two reference signals in figure, is the input signal. Note that the two reference signals are in phase quadrature and that the input signal is precisely in phase with the upper reference signal. Each correlator multiplies one of its inputs by the other. The output of the I correlator 358 is the product of the sine function times another perfectly aligned sine function. From trigonometry, $$\sin^2 x = \frac{1}{2}[1-\cos(2x)]$$

Thus the I correlator 358 output is a constant value of $+\frac{1}{2}$ plus a cosine function at double the input frequency. The purpose of these correlators 358 and 360 is to produce very slowly varying signals, which can be used to control the tracking functions. Therefore, the correlator output signals are passed through a low pass filters 364 and 366 to obtain the slowly varying signals and to reject the high frequency components. Thus, the output of the I correlator 358 is represented by a stationary, non-rotating, positive vector 368, which is proportional to the incoming signal strength.

The output of the Q correlator is the product of the sine function times a cosine function of the same frequency. From trigonometry, $$\sin x \cos x = \sin 2x$$

Thus, the Q correlator output has only a high frequency component. When this is low-pass filtered, the output is zero, which is represented by a horizontal vector 370 with its tip at the zero amplitude position.

A more general trigonometric expression of such products is $$\sin(\omega t + \omega)\sin(\omega t) = \frac{1}{2}[\cos(\omega) - \cos(2\omega t + \omega)]$$

$$\sin(\omega t + \omega)\cos(\omega t) = \frac{1}{2}[\sin(2\omega t + \omega) + \sin(\omega)],$$

where $\omega$ is the phase rate ($2\pi F$) and $\omega$ is the signal phase offset This shows that the product of two sinusoids with the same frequency but with different phase offsets results in a high frequency term at twice the input frequency and a low frequency term with its amplitude proportional to the cosine of the phase difference between the two signals. The low pass filter eliminates the high frequency term, leaving only the low frequency term. Therefore, if the input signal shifts in phase relative to the two reference signals, the I and Q output vectors will rotate, decreasing the I value and causing a positive or negative Q value, depending on the direction of the phase shift.

FIG. 15B illustrates what happens when the phase of the input signal is inverted due to the data modulation. Specifically, both the I and Q vectors flip to the opposite direction, representing a 180-degree phase shift of the input signal.

Conventional phase-locked loops use the Q vector as an error signal in a control loop which locks the reference signal to the phase of the signal being tracked. When the loop is correctly locked, the Q vector output is at zero. If the phase of the input signal changes relative to the reference signal, the Q vector rotates counterclockwise or clockwise, depending on the direction of the phase shift, producing a positive or a negative error voltage which drives the loop to eliminate the phase error. However, if the input signal is biphase modulated by data bits, the Q error signal also is modulated. A positive error voltage during a +1 data bit becomes an equal negative error voltage during a -1 data bit. As a result, the Q signal cannot be used directly as an error signal to phase track biphase modulated signals.

A solution to this problem is shown in FIGS. 16A and 16B. The polarity of the I signal is detected, as indicated diagrammatically at 368, and used to rectify the Q signal. As a result, a positive Q error voltage during a +1 data bit and a negative Q error voltage during a -1 data bit both produce a positive output error voltage. This configuration is called a Costas loop, labeled as the Costas carrier tracker 354 in FIG. 14, and it permits phase locked tracking of biphase modulated signals. One consequence of the Costas loop is that it will lock and track successfully at either of two carrier phase values which are 180 degrees apart. At one phase the I vector is positive for +1 data bits, and at the other the I vector is negative for +1 data bits. Data content rather than I vector polarity must be used to distinguish +1 bits from -1 bits.

FIGS. 16A and 16B also show that the low-pass filtering process is implemented with an integrate and dump (I/D) function 370, 372. The output of this function is the integral of the input signal, which is equivalent to a good low-pass filter. The integrator is reset to zero, or dumped, upon command. For example, the I integrator is reset at the beginning of each new data bit. As a result, the I output at the end of each data bit provides the best estimate of whether the data bit was 1 or 0. This data bit demodulation process provides the message data from the Costas carrier tracker 354 of FIG. 14.

If the Q value were needed only once per data bit, it would be best to integrate both the I and Q signals for an entire data bit period before rectifying the Q signal with the polarity of the I signal. If the bandwidth of the phase-locked loop requires a Q input more often than the data rate, the Q integrator is read and dumped at the necessary rate, but the I integration continues over the entire bit interval, improving the I output signal to-noise-ratio as the integration time increases.

The Costas carrier tracker 354 of FIG. 14 controls the numerically controlled oscillator (NCO 352) so that the I and Q reference signals are phase locked to the incoming carrier signal. Thus, the phase of the NCO signal accurately represents the phase of the received carrier signal and can be measured and compared with the phase of other satellite signals at discrete time marks. This is the basis for high precision navigation or positioning with carrier phase signals.

Code Tracking:
(a) Early minus Late Code Tracking:

Because the code and carrier signals from the satellite are coherent, the NCO 352 in FIG. 14 also is able to clock the PRN code generator 350 at very nearly the correct rate. Although carrier aided code tracking is not mandatory, it does improve code tracking accuracy. There is a small error in the aiding rate due to the effect of the earth's ionosphere on a GPS signal. Being a dispersive medium, the ionosphere advances the phase of the carrier signal and retards the time (phase) of the code modulation. Therefore, a code tracking function is needed not only to find the proper code phase initially but also to track out the slow divergence between the code phase and the carrier phase.

In the receiver example of FIG. 14, code tracking is achieved by first correlating the signal samples with an early-minus-late (E–L) version of the local code, as indicated at 380. The output of this correlation step is then correlated with both carrier phase reference signals, I Reference and Q Reference, as indicated at 382 and 384, to produce vectors $I_{E-L \, and \, QE-L}$. Note that I Punctual ($I_P$) and $I_{E-L}$ are identical except for the difference caused by the effect of first correlating with an E–L code rather than with a punctual code. The same can be said for $Q_P$ and $Q_{E-L}$. Therefore, the next step is to examine the effect of E–L correlation on the vectors shown in FIGS. 15A and 15B.

FIGS. 17 (A–H) illustrates eight code segments. FIG. 17A shows a segment of received code. FIG. 17B is a properly aligned local code segment, such as the punctual code of FIG. 14. As shown before, the product of the received code with a properly aligned punctual code results in a narrowband signal with maximum amplitude. This relationship is represented by the peak of the autocorrelation function of FIG. 7G.

FIG. 17C, labeled early code, is the same as the second, except that it has been shifted early in time phase by a half chip. Similarly, FIG. 17D, labeled late code, has been shifted late by a half chip.

FIG. 17E, labeled early minus late, is the early segment minus the late segment, which could be used as the E–L Code of FIG. 14. Note first that the E–L code has three amplitude levels rather than just two, i.e., +1, 0, and −1. With reference to FIG. 14, when the E–L code is at zero, no signal samples pass through the E–L code correlator 380. Next, note that the E–L code has a zero value whenever the punctual code does <u>not</u> transition, e.g., at the time of a code clock where no transition occurs. The illustrated E–L code is at +1 whenever the punctual code transitions from −1 to +1, and it is at −1 whenever the punctual code transitions from +1 to −1.

In the case illustrated by FIG. 17, the E–L code is seen to be a series of windows centered on punctual code transitions, with the polarity of the window determined by the direction of the corresponding transition. Note that the window can be formed either by differencing two separate correlators, one referenced with a continuous early code and one with a continuous late code, or by a single correlator referenced with an E–L code window.

FIG. 17F, labeled punctual E–L product, is the product of the received code with the E–L code. The product is, of course, at zero whenever the E–L code is zero. Elsewhere, the product has equal durations of positive and negative values, so the average value of the product segment is zero.

FIG. 17G, labeled delayed early minus late, is a delayed version of the E–L code, and FIG. 17H, labeled delayed product, is the product of the received code and the delayed E–L code. In this example, the duration of positive and negative product values are not equal, so the average value of this segment is positive.

With respect to FIG. 14, it should be clear that the average amplitude of both $I_{E-L}$ and $Q_{E-L}$ will be zero when the punctual code is properly aligned with the received code, because with that alignment the product of the signal with the E–L code averages to zero. However, the $I_{E-L}$ and $Q_{E-L}$ vectors grow larger if the perfect alignment is disturbed. Furthermore, the polarity of these vectors is reversed if the misalignment is a delay rather than an advance. As a result, these vectors are used as an error signal by the code tracker 356. The code tracker 356 adjusts the time phase of the PRN coder 350 to minimize the code error function and thus achieve proper alignment with the received code. Because of this, the time phase of the PRN coder 350 accurately represents the time phase of the received code signal, and it can be measured and compared with the time phase of other satellite signals at discrete time marks. This is the basis for navigation and positioning with code measurements.

Note that I Punctual ($I_P$), Q Punctual ($Q_P$), and the message data (D) bit signals also enter the code tracker 356 of FIG. 14. The first purpose of this is to rectify the $I_{E-L}$ and $Q_{E-L}$ signals to remove the phase reversal effect of data bit modulation on these signals. When the Costas loop is properly locked, both $Q_P$ and $Q_{E-L}$ remain at zero, so that only $I_{E-L}$ provides a useful signal for the code error function. In this case, $I_P$ is rectified by the data bit value D, i.e., ($I_P$)(D), so the code error function is not affected by the data modulation. However, it is often necessary to search for proper code alignment before the Costas loop has locked. In this case the I and Q vectors are rotating at the frequency difference between the received carrier signal and the NCO (352) frequency. By summing ($I_P$)($I_{E-L}$) and ($Q_P$)($Q_{E-L}$), the result is a scalar value, which can be used as a code error function before the Costas loop locks to the carrier signal.

FIGS. 18A–F provide a convenient way to visualize the error function created by the product of the received code and the E–L code. FIG. 18A shows a received code segment.

FIG. 18B shows a single E–L window centered on the downward code transition of FIG. 18A. The received code signal that is allowed through the window is positive during the first half of the window and negative during the second half, for an average value of zero. The arrow in the center of the window points downward toward the code error function plotted in FIG. 18F, which has zero value at that point. FIGS. 18C, 18D and 18E show three other earlier positions of the E–L window relative to the received code, these being one half chip advanced (FIG. 18C), one full chip advanced (FIG. 18D), and 1.5 chip advanced (FIG. 18E). At the half chip advanced position, the portion of the received code allowed through the window is always positive. This positive value is inverted by the –1 state of the window, so at that position the code error function (shown in FIG. 18F) has its maximum negative value.

The explanation for the value of the code error function at the full chip and at the 1.5 chip advanced E–L window is not as obvious as for the other two positions considered above. For simplicity, FIG. 18A shows only one small portion of a code which, in its entirety, has at least hundreds of transitions. For example, the GPS C/A code of 1023 bits has 512 transitions. Therefore, because of the decorrelation properties of PRN codes, the probability of a transition occurring, or not occurring, at any code clock pulse essentially is 50%. FIGS. 18A–18E illustrate this by showing that the received code could be either positive or negative one chip from the transition being considered. As a result, by advancing the E–L window by one full chip, it will be centered on another transition half of the time and on no transition, in this example remaining positive, the other half. Thus, the average result is a negative value one-half as large as the maximum negative value of the code error function. The 1.5 chip advanced window has an equal probability of seeing +1 or –1, for an average value of zero. FIG. 18F therefore illustrates how the code error function is formed.

The code tracking loop searches for the received signal by testing different time phase values, usually stepping one-half chip at a time. When the local code is less than one chip from alignment with the received code, signal energy will be detected by the Costas loop and a code error function will be detected by the code tracker 356. The code tracking function drives the code in one direction for a positive error and in the other direction for a negative error. The objective is to seek and to maintain an error value of zero at the center of the error function, which represents proper alignment of the two codes.

(b) Effect of Multipath on Code Tracking:

It would be ideal if the only signals reaching the receiver's antenna came directly from the signal source, e.g., GPS satellites. Unfortunately, signals come not only directly but also indirectly by being reflected from local objects. FIG. 19 is a simplified, two-dimensional view of this reality. Because the orbit of a GPS satellite is more than 11,000 miles above the earth, its signals appear to arrive at exactly the same angle at every location within a local area. This is why FIG. 19 shows the incoming signals from one satellite as parallel lines. Because there are many reflected signals, and only one direct signal, the term multipath interference is used. In FIG. 19, only two multipath signals are illustrated, one from a low angle and one from a high angle. It is evident that every reflected signal must travel a greater distance to the receiving antenna than the direct signal.

Although normally there are many reflected signals, the explanation of the multipath effect is simplified by considering only one reflected signal at a time. By the principle of superposition, the composite effect of many multipath signals can be obtained by summing the individual effect of each one.

To evaluate the effect, FIGS. 20A–20C show the received code and the E–L code error function of FIG. 18, but it also illustrates the effect of one multipath signal. There are three key characteristics of such a reflected signal. First, because it must travel a longer path than the direct signal, it always is delayed relative to the direct signal. Second, because of the longer path, the phase of its carrier frequency is shifted relative to that of the direct signal, often by many cycles. Because the wavelength of the GPS L1 signal is approximately 19 centimeters, every centimeter of extra path length causes about 19 degrees of phase shift. With such high sensitivity of phase angle to path length, it is evident that the relative phase of a reflected signal has a uniform probability of being any value between zero and 360 degrees. Even so, when a GPS receiving antenna is stationary, the phase difference between the direct signal and a signal reflected from a stationary object can be quite stable. Depending on the geometry, the path length difference can change very slowly, because GPS satellites are far away and their angular motion therefore is slow. Finally, and fortunately, it usually is true that the reflected signal reaches the antenna with a lower signal level than the direct signal due to losses and polarity reversals experienced when the signal is reflected. The code error function for the directly received code is plotted at 390 in FIG. 20C, and is identical with the code error function of FIG. 18F.

For illustration purposes, the received multipath code of FIG. 20B is shown at half the amplitude of the direct signal of FIG. 20A, with a delay of one quarter chip, and with opposite polarity due to an assumed 180 degree carrier phase difference relative to the direct signal. Given this multipath signal as an example, there is a corresponding received multipath code error function, shown at 392 in FIG. 20C. Relative to the direct code error function, the multipath code error function has half the amplitude, it is delayed by one quarter chip, and it has opposite polarity. FIG. 20C also shows the sum of these two error functions, labeled error sum, at 396. If the relative carrier phase were zero rather than 180 degrees, the received multipath code error function would be inverted, and the corresponding composite result is shown by the error function labeled error difference, at 398, which is the directly received code error function minus the received multipath code error function.

The code tracking function cannot discriminate between the direct error function and the multipath error function. Therefore, it adjusts the code time phase to bring the sum of the error functions to a value of zero. FIG. 20C also shows the location of the track point with the illustrated multipath signal (400), without a multipath signal (402), and with the non-inverted multipath signal (404). These track points are labeled track point with error sum, punctual track point without multipath, and track point with error difference, respectively. Note that even though the multipath signals always arrive later than the direct signal, the track point can be advanced as well as delayed by multipath.

An important observation from FIG. 20C is that the track point advance always is greater than the track point delay, i.e., the effect is asymmetric about the multipath-free track point 402. It is often thought that motion of the receiving antenna relative to reflecting objects eliminates the effect of multipath from these objects. The reason is that the carrier phase difference between the direct and the reflected signals changes so rapidly with motion of the receiving antenna that a narrowband code tracking loop will not follow the rapid excursions. However, because of the asymmetric effect, even rapidly changing multipath signals will induce an early bias in the track point.

Basic Approaches to Code Multipath Mitigation:

Over the years, a number of multipath mitigation techniques have been developed. Those used for GPS fall into three broad categories. The first is filtering, in which carrier phase measurements are used to define code dynamics very precisely, which, in turn, allows the code measurements to be smoothed with a long time constant filter to remove much of the multipath noise. A second technique employs additional correlators in each channel to characterize the shape of the autocorrelation function and thereby draw conclusions about the effect of the multipath error. A third approach is to modify the shape of the tracking window to minimize the effect of multipath signals. The earliest form of this third technique is the narrow correlator.

(a) Narrow correlator:

An important multipath mitigation technique is the narrow correlator. This concept is illustrated by FIGS. 21A–21F. As in FIGS. 18A–18F, the error function is formed by means of an early-minus-late (E–L) window centered on code transitions, with its polarity determined by the direction of the transition. In this case, however, the window is quite narrow relative to the period of the code chip. As a result, the maximum amplitude of the narrow correlator code error function is shown to be limited relative to the wide correlator code error function. FIG. 21A shows a received code signal, and FIGS. 21B–21E depict a narrow E–L window aligned with a code transition (FIG. 21B), and advanced by a half chip, one chip and 1.5 chip, respectively (FIGS. 21C, 21D and 21E). The corresponding code error function is plotted as a solid line in FIG. 21F, in comparison with the code error function for the wide correlator discussed earlier, plotted as a broken line.

FIGS. 22A–22D show how the narrow correlator dramatically reduces the impact of multipath signals. FIGS. 22A and 22B show the directly received code and an example of a received multipath code, and FIG. 22C shows the code error functions for the two; these curves being identical with those shown in FIG. 20C. FIG. 22D shows for comparison the code error functions for the directly received and received multipath codes when a narrow correlator is used. Significantly, the track point advance and delay due to multipath signals with a delay somewhat greater than half the window width become symmetric about the multipath-free track point, as indicated by the track points at 400', 402' and 404'. Therefore, not only is the effect of static multipath greatly reduced, but the residual bias from multipath signals with a delay somewhat greater than half the narrow correlator window width is eliminated. As a result, motion of the receiving antenna relative to reflecting objects does effectively eliminate the effect of multipath from these objects.

The narrow correlator has a disadvantage in searching for a signal. When a signal is first detected, the received and local codes may be misaligned by a large fraction of a chip. In this case, the wide correlator provides a much larger error signal than the narrow correlator. As a result, the wide correlator will pull the tracking loop into alignment much faster than the narrow correlator. Once the codes are aligned within the central linear slope region of the narrow correlator error function, both the wide and the narrow correlator provide identically the same direct path error signal to the tracking loop with sufficient receiver bandwidth. (The narrow correlator error function slope can be attenuated if the receiver bandwidth is restricted.) Therefore, it is customary to use a wide correlator during signal acquisition and then switch to the narrow correlator for tracking after initial code alignment.

Effect of Multipath on Phase Measurement:

As noted above, highly accurate navigation or positioning measurements can be obtained from measurements of carrier phase. When multipath signal components are present, however, the receiver tracks the composite phase of the direct signal plus all of the multipath signals. In effect, the direct signal carrier measurements are distorted by the multipath components. An important object of the present invention is to reduce or eliminate the effects of multipath signals on the measurement of carrier signals.

Conclusion of Background:

In view of the foregoing, it will be understood that there is an ongoing need for improvement in the accuracy of navigation and position signals derived from the GPS, and that a significant source of errors in GPS measurements is the presence of multipath signal energy at the receiver. Ideally, what is needed is a system for eliminating or dramatically reducing multipath effects on code and carrier synchronization, and thereby improving the speed and accuracy of GPS measurements and position solutions. The present invention satisfies this need.

SUMMARY OF THE INVENTION

The present invention achieves the objectives outlined above, and other objectives, by providing an improved method and apparatus for effecting code synchronization in a global positioning system receiver. Within the receiver, digital in-phase (I) and quadrature (Q) samples of a plurality of received pseudorandom noise (PRN) encoded signals are provided to a code synchronization circuit. The code synchronization circuit is designed for coherent-mode operation when the receiver has achieved phase-lock with one of the PRN encoded signals, and operates in a non-coherent mode otherwise.

The receiver includes an I-channel correlator for producing a coherent-mode discrimination signal by correlating in-phase (I) samples of a first of the received PRN encoded signals with a discrimination pattern, wherein the first PRN encoded signal is encoded with a first PRN code. The discrimination pattern is comprised of two or more PRN code modulation components, the phases of which are adjusted based on the value of a code phase control signal obtained by averaging or otherwise processing the coherent-mode discrimination signal.

During non-coherent mode operation, both the in-phase (I) and quadrature (Q) samples of one of the PRN-encoded signals are correlated with a discrimination pattern. In addition, the in-phase (I) and quadrature (Q) samples of the one PRN-encoded signal are also correlated with a locally-generated replica of the PRN code used to encode the one PRN-encoded signal. The results of the two I-channel correlations are then multiplied, as are the results of the Q-channel correlations. Next, the resultant product signals are combined into a non-coherent mode discrimination signal. A non-coherent mode code phase control signal, useable to control the phase of the locally-generated PRN-encoded signal, is obtained by averaging or otherwise processing the non-coherent mode discrimination signal.

In a preferred implementation, the first and second modulation components are generated to be of nonzero values for first and second intervals, respectively, during each period of the PRN-encoded signal, and to be of zero value otherwise. It has also been found that improved synchronization may be achieved by scaling the magnitude of the first modulation component relative to the magnitude of the second modulation component.

As it pertains to code tracking, the present invention may also be defined as apparatus for mitigating effects of multipath signals on code tracking of the received PRN signals in a receiver for decoding received pseudorandom noise (PRN) encoded signals. Briefly, and in general terms, the apparatus comprises a PRN code generator for generating a replica of the PRN code and for generating related code multipath mitigation windows (MMWs); a controllable oscillator, for generating timing signals for the PRN code generator; a first correlator, for correlating the received PRN signals with the replica of the PRN code, to derive phase error signals used for controlling the oscillator; and a second correlator, for correlating the received PRN signals with the code MMWs, and thereby generating code error signals, in accordance with a code error function, used to control the PRN code generator to synchronize the generated PRN code with the received PRN code signals. The code error function effectively has a zero value at a desired track point when the generated PRN code is synchronized with the received PRN signals and, immediately on each side of the tracking point, has a polarity that depends on whether the generated PRN code is early or late with respect to the received PRN code.

In accordance with an important aspect of the invention, the shape of the code MMW generated by the PRN code generator is selected to provide a code error function that mitigates the effect of received multipath signals by providing an error value that increases rapidly in opposite directions from the track point, but assumes a practically zero value when the code MMW is advanced only a fraction of a PRN code chip from the track point. Therefore, a code error function associated with delayed multipath code signals will have a practically zero value near the desired track point and thus will have little or no effect on tracking the received code signals. The code MMW may, for example, have multiple instances that are timed to occur only at received PRN code transitions, or it may be timed to occur at every code clock position, regardless of whether or not there is a PRN code transition. Each instance of the code MMW may be symmetric about the desired track point, and have a central segment of one polarity and two adjacent segments of the opposite polarity, resulting in an individual average value of zero. Alternatively, each instance of the code MMW may be asymmetric about the desired track point, and may include a first segment approximately aligned with the clock position and a second segment adjacent to the first segment and having opposite polarity and a different amplitude or width relative to the first segment. Whatever the specific form of the code MMW, it may have multiple instances that collectively have a zero average value.

In method terms, the invention as it pertains to code tracking comprises the steps of generating a replica of the PRN code; generating code multipath mitigation windows (MMWs); generating timing signals, in a controllable oscillator, to control the steps of generating the replica of the PRN code and the code MMWs; correlating the received PRN signals with the replica of the PRN code, to derive phase error signals used for controlling the oscillator; correlating the received PRN signals with the code MMWs, and thereby generating code error signals, in accordance with a code error function; and controlling the step of generating the PRN code, to synchronize the generated PRN code with the received PRN code signals.

As it pertains to carrier or phase tracking, the invention comprises a PRN code generator for generating a replica of the PRN code and for generating related phase multipath mitigation windows (MMWs); a controllable oscillator, for generating timing signals for the PRN code generator; a first correlator, for correlating the received PRN signals with the replica of the PRN code, to derive phase error signals used for controlling the oscillator; a second correlator, for correlating the received PRN signals with the phase MMW, and thereby obtaining first samples of the received PRN signals prior to a code transition and second samples of the received PRN signals immediately after a code transition; and phase calculation logic, for eliminating the effect of multipath components by vector averaging multiple instances of the first and second samples of the received PRN signals, to obtain the phase of the directly received PRN signals. In one embodiment of the invention, the phase MMW includes a first segment for obtaining a first sample of the received PRN signals immediately prior to the transition and a second segment for obtaining a second sample of the PRN signals immediately after the transition. In another embodiment, the phase MMW includes a first instance with segments immediately after code clock times where there is no code transition, to obtain first samples of the received PRN signals, and a second instance with segments occurring immediately after code clock times where there is a code transition, to obtain second samples of the received PRN signals. In yet another embodiment, the phase MMWs include a first instance with segments occurring immediately after a code transition and a second instance with segments occurring at any selected time not close to a code transition.

In method terms, the invention as it pertains to carrier phase tracking comprises the steps of generating a replica of the PRN code; generating related phase multipath mitigation windows (MMWs); generating, in a controllable oscillator, timing signals for controlling the steps of generating the PRN code and the related phase MMWs; correlating the received PRN signals with the replica of the PRN code, to derive phase error signals used for controlling the oscillator; correlating the received PRN signals with the phase MMWs, and thereby obtaining first samples of the received PRN signals prior to a code transition and second samples of the received PRN signals immediately after code transitions; and eliminating the effect of multipath components by vector averaging the first and second samples of the received PRN signals, to obtain the phase of the directly received PRN signals.

It will be appreciated from the foregoing that the present invention represents a significant advance in the field of PRN code receivers, such as GPS receivers. In particular, the invention provides for the minimization or elimination of the effects of received multipath signals on code and phase synchronization of the receiver with the received signals, and on measurements based either on PRN code or on carrier phase. Other aspects and advantages of the invention will become apparent from the following more detailed description.

BRIEF DESCRIPTION OF THE DRAWINGS

Additional objects and features of the invention will be more readily apparent from the following detailed description and appended claims when taken in conjunction with the drawings, in which:

FIG. 3A is a graph of a discrimination function depicting variation in the DC value of the C/A code phase control signal generated within the GPS receiver of FIG. 1.

FIG. 3B depicts a discrimination function representative of the variation in the DC value of a C/A code phase control signal generated using the discrimination pattern of FIGS. 2F or 2I.

FIGS. 3C and 3D are graphs of the discrimination functions characterizing variation in the averaged value of discrimination signals generated using the discrimination patterns of FIGS. 2J and 2K, respectively.

FIGS. 15A and 15B are block diagrams illustrating the generation of phase error signals by correlation of an incoming signal with a reference signal.

FIGS. 16A and 16B are block diagrams further illustrating the generation of phase error signals by correlation of an incoming signal with a reference signal.

FIGS. 17A–17H are waveforms of a received code signal and various other signals illustrating the concept of forming an early minus late signal with which to track the received code.

FIGS. 18A–18E are waveforms of a received code signal and an early-minus-late code signal at various time relationships with the received code.

FIG. 18F is a graphical representation of a code error function resulting from use of a wide correlator early minus late window.

FIG. 21A shows a received code signal.

FIGS. 21B–21E show a narrow correlation window at various phases of alignment with the received code transition.

FIG. 21F is a graphical representation of a code error function resulting from use of the narrow correlation window, shown in contrast with the code error function resulting from a wide correlation window.

FIGS. 22A and 22B show a directly received code and a delayed received multipath code.

FIG. 22C is a graphical representation of the code error functions for the directly received code and the multipath code.

FIG. 22D is a similar representation of the code error functions for the directly received code and the multipath code when a narrow correlator window is used.

FIG. 23A shows a received code.

FIGS. 23B–23E show a symmetrical multipath mitigation window (MMW at various phases of alignment with the received code signal transition.

FIG. 23F is a graphical representation of a code error function resulting from use of this MMW.

FIG. 24A shows the same received code as FIG. 23A, but drawn to a different time scale.

FIG. 24B shows a similar shaped MMW to the one in FIG. 23B.

FIG. 24C shows a code error function similar to the one in FIG. 23F.

FIGS. 25A–25F summarize some of the earlier figures and show the effect on the code error function of a symmetrical MMW located only at code transitions; FIGS. 25A and B show a received code and a received multipath code: FIGS. 25C and 25D show a narrow correlator window and a multipath mitigation window (MMW); FIG. 25E shows the code error functions for the narrow correlator; and FIG. 25F shows the code error functions for the MMW.

FIGS. 26A–26E show the effect on the code error function of a symmetrical MMW located at every code clock time.

FIGS. 27A–27E show the effect on the code error function of an asymmetrical MMW located at every code clock time.

FIGS. 28A–28C show a code transition, a corresponding multipath transition and a phase MMW for sampling the phase of a received signal immediately before and after each code transition;

FIGS. 29A and 29B are vector diagrams showing the vector relationships between the received and multipath signals before and after a code transition.

FIGS. 30A–30D show a received code, a phase MMW located immediately after the code clock at a code transition, another received code sample, and an asymmetric MMW located immediately after the code clock at a non-transition.

FIGS. 31A–31C are vector diagrams showing the vector relationships between the received and multipath signals during the phase MMW intervals defined in FIGS. 30A and 30D.

FIGS. 36A–36G are waveforms of signals associated with the PRN coder of FIG. 35.

FIG. 37A shows selected received code segments, and FIGS. 37B–37E are examples of various forms of code multipath mitigation windows.

DESCRIPTION OF THE PREFERRED EMBODIMENTS

Figure 1:
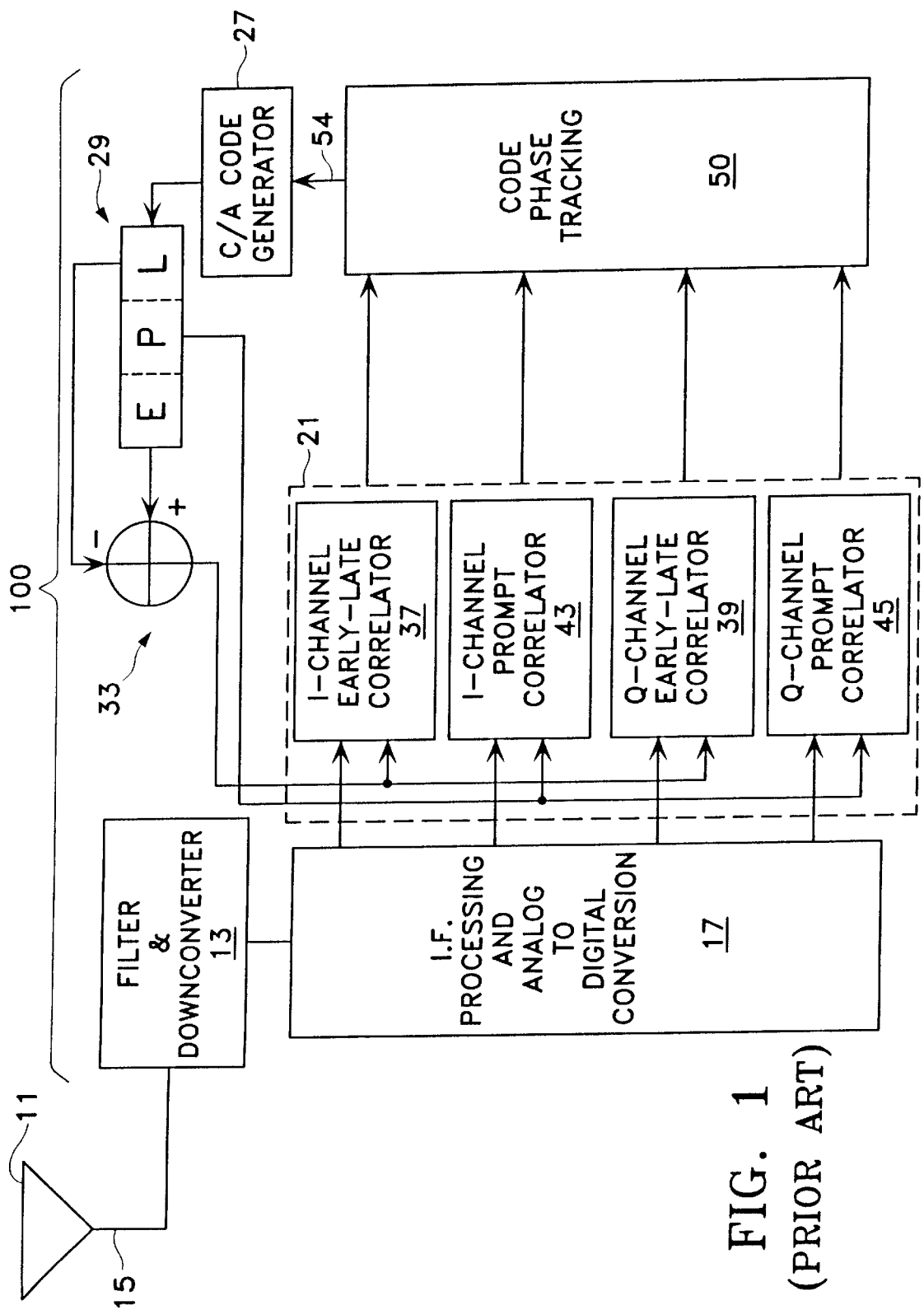
FIG. 1 shows a block diagram representation of a conventional global positioning system (GPS) receiver.

Referring to FIG. 1, there is shown a block diagram representation of a conventional global positioning system (GPS) receiver 10. As shown in FIG. 1, the L1-band and L2-band PRN-encoded frequency signals simultaneously received by an antenna 11 from a plurality of GPS satellites are supplied to an R.F. downconverter 13 through a high-frequency transmission line or waveguide 15. The R.F. downconverter 13 is operative to convert the received signals to a plurality of intermediate frequency (I.F.) signals. The I.F. signals from downconverter 13 are supplied to an I.F. processing network 17, which includes an intermediate frequency section and a set of analog-to-digital converters. The I.F. processing network 17 provides phase quadrature digital representations of one of the received L1-band (or L2-band) PRN-encoded satellite signals, which are respectively identified hereinafter as In-Phase ($L1_I$) and Quadrature-Phase ($L1_Q$) signal components. The digitized L1 band signals $L1_I$ and $L1_Q$ are said to be in "phase quadrature" due to the phase shift of 90 degrees existing between their respective L1-band carriers.

The L1-band digital outputs from the I.F. processing network 17 are supplied to a set of baseband processors 21, one of which is shown in FIG. 1. Each baseband processor 21 is associated with a separate satellite from which a signal is received. The number of baseband processors provided is sufficient to ensure that a separate baseband processor is available for each received satellite signal. As is described below, each baseband processor 21 correlates the I.F. outputs from the network 17 with a locally generated replica of the C/A code unique to a given satellite. The I.F. outputs are also correlated with a discrimination pattern comprised of the difference between early and late versions of the locally generated C/A code.

Referring to FIG. 1, a C/A code generator 27 is seen to provide a C/A code replica to an early-prompt-late (EPL) shift register 29 which includes early (E), prompt (P) and late (L) gates. An early-minus-late discrimination pattern is formed by combiner 33 by taking the difference between the C/A code samples latched by the early (E) and late (L) gates. Successive samples of the C/A code replica produced by the C/A code generator 27 are circulated through the EPL shift register 29 at a clock rate selected in accordance with the desired time offset (i.e., "correlator spacing") between the early and late C/A code samples comprising each sample of the discrimination pattern. For example, to achieve a one chip correlator spacing the clock rate through the EPL shift register 29 is selected such that a time offset of ½ chip exists between the early (E) and prompt (P) samples, and hence so that a time offset of ½ chip also exists between the prompt (P) and late (L) samples. Narrower correlator spacings are obtained by increasing the clock rate at which CIA code samples are passed through the EPL shift register 29.

Referring again to FIG. 1, the I.F. outputs from the network 17 are correlated with the early-minus-late (E–L) discrimination pattern from the combiner 33 within L1 I-channel and L1 Q-channel E–L correlators 37 and 39. In addition, the prompt C/A code samples from the register 29 are correlated with the I.F. outputs using L1 I-channel and L1 P-channel prompt correlators 43 and 45. The correlation results from the correlators 37, 39, 43 and 45 are provided to a phase tracking processor 50, which adjusts the phase of the C/A code generator 27 so as to achieve phase-lock with the C/A code carried by the received GPS satellite signal.

Figure 2A:
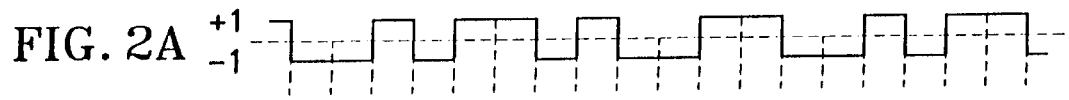
FIG. 2A is a timing diagram of an exemplary sequence of the C/A code carried by a received GPS satellite signal.

As mentioned above, a discrimination pattern characterized by one-chip correlator spacing may be formed within the combiner 33 by clocking the EPL shift register 29 such that a ½ chip phase difference exists between each of the early, prompt and late C/A code samples therein. Turning now to FIG. 2A, a timing diagram is provided of the C/A code carried by the received GPS satellite signal. The vertical dashed lines of FIG. 2A are representative of the C/A code clock period, and hence are separated by an interval equivalent to the duration of one C/A code chip. As is indicated by FIG. 2A, transitions in the logical state of the received C/A code occur at the boundaries between C/A code clock periods.

Figure 2B:
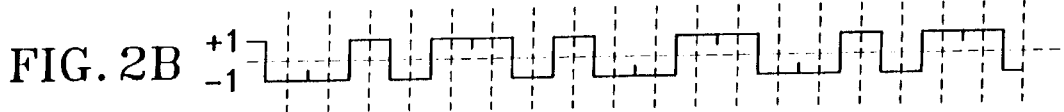
FIGS. 2B, 2C and 2E respectively depict locally-generated one-half chip early, one-half chip late, and prompt versions of the exemplary C/A code.
Figure 2C:
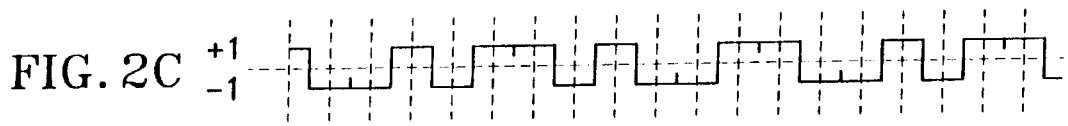
Figure 2D:
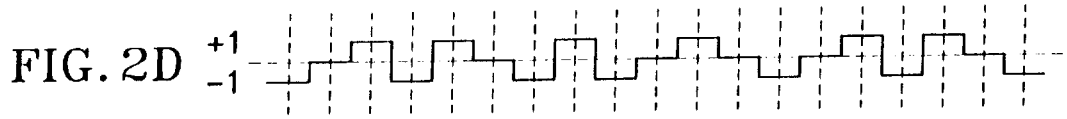
FIG. 2D is a timing diagram of a normalized early-minus-late discrimination pattern (DP) characterized by one-chip correlator spacing.
Figure 2E:
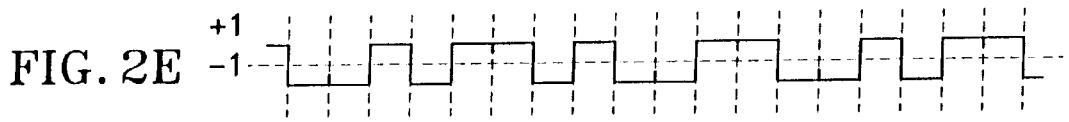

In FIGS. 2B, 2C and 2E, the locally generated one-half chip early, one-half chip late, and prompt C/A codes are respectively depicted. In the exemplary representation of FIG. 2 is assumed that the C/A code generator 27 is locked to the phase of the received C/A code. Accordingly, the prompt C/A code (FIG. 2E) is seen to be in precise time-alignment with the received C/A code (FIG. 2A).

Referring to FIG. 2D, a timing diagram is provided of a normalized early-minus-late discrimination pattern (DP) characterized by one-chip correlator spacing. The standard early-minus-late DP of FIG. 2D is seen to be of a value of negative one for a one-chip period centered about each positive to negative transition in the received C/A code (FIG. 2A). That is, the standard DP "brackets" each such C/A code by exhibiting a value of negative one for a period of one-half chip before and after each transition. Similarly, the standard DP "brackets" each negative to positive C/A code transition by being of a value of positive one for a one-chip period about each transition. It is observed that the standard DP only assumes a zero value about each C/A code clock boundary (vertical dashed line) at which the received C/A code fails to transition between logical states.

The processor 50 is generally disposed to operate in one of two modes depending upon whether or not the receiver 10 has become phase-locked to the carrier frequency of the received GPS signal. Prior to the establishment of phase-lock with the received carrier, the processor 50 operates in a non-coherent mode to strip the received carrier from the outputs of the E–L correlators 37 and 39. Specifically, the output of the I-channel E–L correlator 37 is multiplied by the output of the I-channel prompt correlator 43, and the output of the Q-channel E–L correlator 39 is multiplied by the output of the Q-channel prompt correlator 45. The two results are then added and averaged in order to produce a C/A code phase control signal 54 applied to the C/A code generator 27.

Once phase-lock with the received carrier has been established, the received carrier is completely removed from the received I-channel and Q-channel signals during correlation with the discrimination pattern in correlators 37 and 39. During such "coherent-mode" operation, the averaged output of the I-channel correlator 37 comprises the C/A code phase control signal 54 provided to the C/A code generator 27. The C/A code phase control signal 54 will be of a predefined DC value (typically zero) when the prompt and received C/A codes (FIGS. 2E and 2A) are in alignment. When the discrimination pattern (FIG. 2D) drifts in phase relative to the received C/A code (FIG. 2A), the ±1 values of the discrimination pattern will no longer evenly "bracket" transitions in the C/A code. This misalignment is sensed by the processor 50, and the control signal 54 is adjusted in accordance with a non-zero value until phase alignment is again achieved with the received C/A code.

FIG. 3A is a graph of a discrimination function depicting variation in the DC value of the C/A code phase control signal 54. For convenience of illustration, FIGS. 3A–3D assume the existence of an infinite processing bandwidth within the GPS satellite and receiver. In the illustration of FIG. 3A, variation in the DC value of the signal 54 is represented as a function of the phase offset between the locally-generated prompt and received C/A codes (FIGS. 2E and 2A). For example, the control signal 54 assumes a normalized value of negative one when the prompt C/A code is ½ chip late relative to the received C/A code. Similarly, when the locally-generated prompt C/A code is ½ chip early relative to the received C/A code, the C/A code control signal becomes positive one. Since the prompt C/A code is synchronous with the early-minus-late (E–L) discrimination pattern (DP) produced by the combiner 33, FIG. 3A is equally representative of the variation in the value of the control signal 54 relative to the phase of the E–L DP.

Figure 2F:
FIG. 2F is a timing diagram of ⅛ chip early minus ⅛ chip late discrimination pattern (DP).

As mentioned above, it has been found that the use of discrimination patterns characterized by a correlator spacing of less than one C/A code chip has enabled improved tracking performance in the presence of received multipath signal energy. Referring to FIG. 2F, a timing diagram is provided of a "⅛ chip early" minus "⅛ chip late" discrimination pattern (DP). In order to produce the DP of FIG. 2F, the clock rate of the EPL shift register 29 is increased relative to the case in which the correlator spacing is one C/A code chip. When the DP of FIG. 2F is supplied to the correlators 37, 39, 43 and 45, the DC value of the resultant C/A code phase control signal varies in accordance with the discrimination function of FIG. 3B.

Figure 2G:
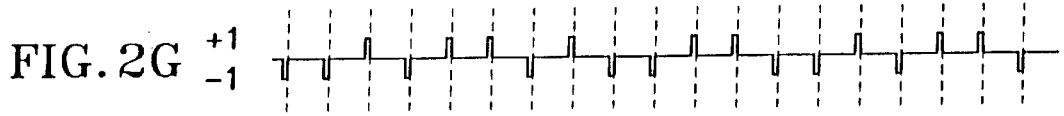
FIG. 2G illustratively represents an earliest one-eighth modulation component of a one-eighth early version of the exemplary C/A code.
Figure 2H:
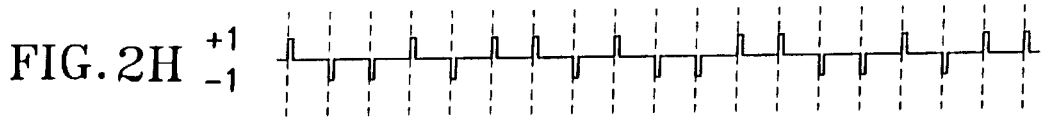
FIG. 2H illustrates the last one-eighth modulation component of a version of the exemplary C/A code which is shifted to the right by one-eighth of a C/A code chip.

As is described hereinafter, the present invention is directed to a technique for generating a uniquely-formatted discrimination pattern resulting in improved insensitivity to received multipath signal energy. Each discrimination pattern formed in accordance with the invention may be viewed as comprising two or more modulation waveforms, hereinafter referred to as "modulation components". One distinguishing feature of the discrimination patterns contemplated by the present invention is that the constituent modulation components assume non-zero values during only a small portion of each C/A code chip period. As an example, the timing diagram of FIG. 2G illustratively represents an "earliest one-eighth" modulation component of a "one-eighth early" version of the CIA code. That is, the modulation component of FIG. 2G may be generated by shifting the prompt C/A code (FIG. 2E) to the left by one-eighth of a C/A code chip, and by then setting the resultant shifted C/A code to zero except during the first one-eighth of each CIA code clock cycle. Similarly, FIG. 2H illustrates the last one-eighth modulation component of a version of the prompt C/A code which is shifted to the right by one-eighth of a C/A code chip. Although the present invention is described herein with reference to a discrimination pattern formed from signals modulated with the C/A code, the teachings of the present invention are equally applicable to discrimination patterns formed from P-code signals or various other types of PRN-encoded signals.

Figure 2I:
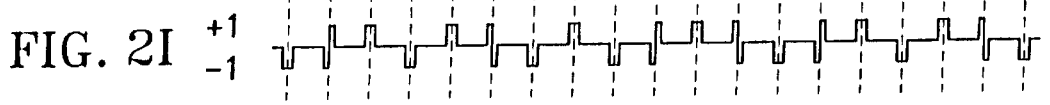
FIG. 2I is a timing diagram of a discrimination pattern in accordance with the invention obtained by using modulation components of one-eighth chip duration.

Referring now to FIG. 2I, a discrimination pattern in accordance with the invention is obtained by subtracting the latest one-eighth component of the one-eighth late C/A code (FIG. 2H) from the first one-eighth component of a one-eighth early version of the prompt C/A code (FIG. 2G). Referring to FIG. 2I, it is seen that the discrimination pattern is of a value of positive and negative one for one-eighth chip intervals immediately before and after each chip boundary at which the received C/A code (FIG. 2A) does not transition between logical states. It follows that these one-eighth chip components are multiplied by the same value of the received C/A code, and hence that an average value of zero results. Since these one-eighth chip components "bracket" chip boundaries at which the received C/A code does not change logical state, small variations in the phase of the discrimination pattern will not alter this zero average value.

As mentioned above, it has been found that received multipath energy adversely affects the "late" portion of conventional early-minus-late discrimination patterns. Similarly, in the discrimination pattern (DP) of FIG. 2I, the latest one-eighth component of the one-eighth late version of the C/A code is believed to be more susceptible to corruption by multipath than is the other modulation component of the DP. This stands to reason, since the conventional discrimination pattern of FIG. 2F and the discrimination pattern of FIG. 2I yield the same discrimination function (FIG. 3B).

Figure 2J:
FIG. 2J depicts a discrimination pattern consisting of one-eighth chip modulation components of a one-sixteenth early-shifted version of the C/A code.

In accordance with the present invention, the discrimination patterns described hereinafter are formed exclusively from early-shifted C/A code modulation components. As an example, FIG. 2J depicts a discrimination pattern having a first modulation component consisting of the earliest one-eighth component of a one-sixteenth early-shifted version of the C/A code (scaled in magnitude by a factor of two). The discrimination pattern of FIG. 2J is formed by subtracting from the first modulation component a second modulation component. The second modulation component consists of the second earliest one-eighth component of a one-sixteenth early-shifted version of the C/A code (of unity magnitude). Since both of the modulation components of the discrimination pattern (DP) of FIG. 2J are derived from an early-shifted version of the C/A code, and hence do not incorporate any "late" components, the DP is believed to be substantially insensitive to received multipath signal energy.

Figure 2K:
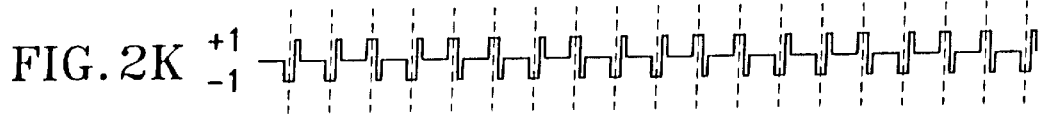
FIG. 2K provides another example of a discrimination pattern comprised exclusively of modulation components derived from an early-shifted version of the C/A code.

FIG. 2K provides another example of a discrimination pattern (DP) comprised exclusively of modulation components derived from an early-shifted version of the C/A code. In particular, the DP of FIG. 2K includes first and second modulation components consisting of the first and second earliest one-eighth components of a one-eighth early-shifted version of the C/A code. The DP of FIG. 2K is then formed by subtracting from the first two modulation components a third modulation component consisting of the third earliest one-eighth component of the one-eighth early-shifted version of the C/A code. It is observed that the discrimination patterns of FIGS. 2J and 2K both change value during every period of the C/A code, thereby bracketing each C/A code clock phase boundary irrespective of whether a transition in the received C/A code has occurred at the boundary. In contrast, conventional early-late discrimination patterns (e.g., FIG. 2D) only bracket changes in the logical state of the received C/A code.

Figure 4:
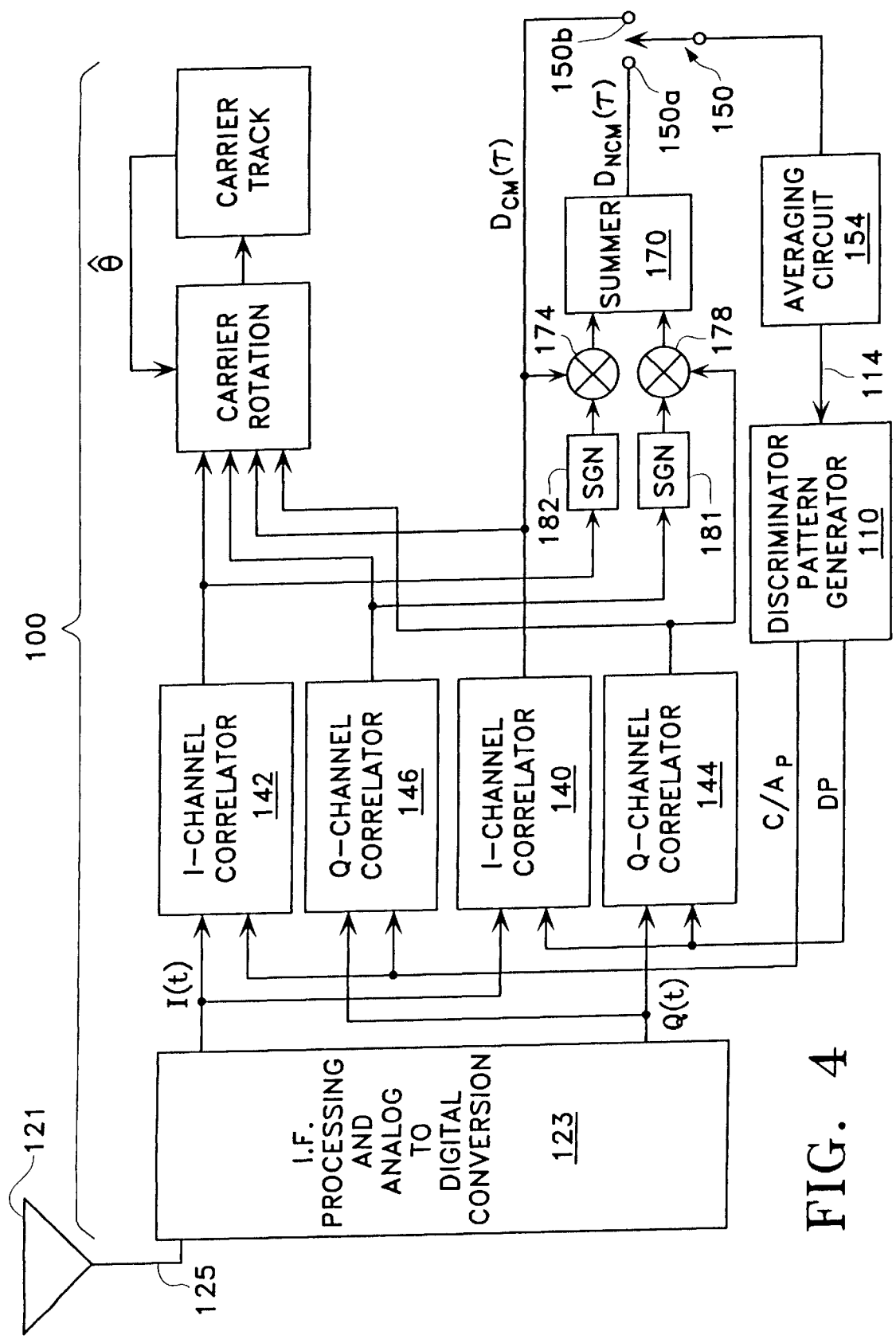
FIG. 4 shows a block diagram representation of a global positioning system (GPS) receiver configured to perform code-synchronization in accordance with the invention.

Referring now to FIG. 4, a functional block diagram representation is provided of a global positioning system (GPS) receiver 100 configured in accordance with the invention. The receiver 100 includes a discrimination pattern (DP) generator 110 disposed to generate discrimination patterns of the type depicted in FIGS. 2I–2K. The phases of the discrimination patterns produced by the DP generator 110 are adjusted in accordance with a DP phase control signal 114, the value of which is indicative of the phase offset between the locally-generated C/A code (or P-code) and the C/A code (or P-code) carried by the received GPS satellite signals. As is discussed below, the DP phase control signal 114 is derived from the results of correlation of the discrimination patterns produced by the DP generator 110 with the received GPS satellite signals. During operation, the DP phase control signal 114 adjusts the phase of the C/A code or P-code clock signal generated within the DP generator 110, thereby achieving time-alignment between the phase of the locally-generated code and the code phase of the received satellite signals.

In the functional representation of FIG. 4, the PRN-encoded GPS signals simultaneously received by an antenna 121 from a plurality of GPS satellites are supplied to a frequency conversion network 123 through a high-frequency transmission line or waveguide 125. The network 123 is operative to convert the received GPS signals to a plurality of digitized intermediate frequency (I.F.) signals. Specifically, the network 123 provides In-phase and Quadrature digital representations of the received L1-band C/A-encoded GPS satellite signal. It is understood, however, that the teachings of the invention could be equally applied to facilitate synchronization with the P-code carried by either L1-band or L2-band signals.

When expressed as a function of time, the received In-phase L1 signal from a given satellite may be denoted as I(t), and is given by:

$$I(t) = \sqrt{S}\, C(t)d(t) + \alpha\sqrt{S}\, C(t-\sigma)d(t-\sigma)\cos\theta_m$$

where C(t) is the received C/A code unique to the given satellite, d(t) is the received navigation data, S is the received signal power, $\alpha$ is the amplitude ratio between received multipath energy and the signal S, $\delta$ is the time delay of the multipath relative to the received signal, and $\theta_m$ is the relative phase between the signal and the multipath.

In the functional representation of FIG. 4, the signal I(t) from the given satellite may be viewed as being correlated with the discrimination pattern from the DP generator 110 within a first L1 I-channel correlator 140, and as being correlated with the locally-generated prompt C/A code (C/A$_P$) within a second L1 I-channel correlator 142. However, in a preferred implementation the functions performed by the DP generator 110 and the L1 I-channel correlator are combined within a unitary device hereinafter referred to as a modulation component discriminator module. The structure and operation of the modulation component discriminator module is described below with reference to FIG. 5.

Again referring to FIG. 4, the received signal Q(t), in phase quadrature with I(t), is correlated with the discrimination pattern from the DP generator 110 within a first L1 Q-channel correlator 144. Similarly, the received signal Q(t) is correlated with the locally-generated prompt CIA code (C/A$_P$) within a second L1 Q-channel correlator 146.

When the receiver 100 is initially turned-on or otherwise fails to maintain phase-lock with the carrier of the received GPS signal, the receiver 100 functions in a "non-coherent" mode. During non-coherent mode operation, a switch 150 is set to throw position 150a until phase-lock with the received carrier is again achieved. Descriptions of both coherent-mode and non-coherent mode operation of the receiver 100 are provided immediately below.

Coherent-Mode Operation

Upon the achievement of phase-lock with the received carrier, the switch 150 is set to throw position 150b in order to initiate coherent-mode operation. Under these conditions the navigation data d(t) may be separately removed from the received signal within a demodulator (not shown), hence allowing the received signal I(t) to be expressed as:

$$I(t) = \sqrt{S}\, C(t) + \alpha\sqrt{S}\, C(t-\sigma)\cos\theta_m$$

During coherent-mode operation, the output of the I-channel correlator 140 produces a coherent-mode discrimination signal $D_{CM}(\tau)$, which is provided to an averaging circuit 154. As is indicated by FIG. 4, the averaged value of the signal $D_{CM}(\tau)$ forms the DP phase control signal 114 supplied to the DP generator 110. In the general case, the signal $D_{CM}(\tau)$ may be expressed as:

$$D_{CM}(\tau) = \int_0^T I(t)\sum_1^K c_k(t-\tau)dt - \frac{1}{2}\int_0^T I(t)\sum_{K+1}^{2K} c_k(t-\tau)dt$$

where T is the period of the C/A code, and $c_k(t)$ is the $k^{th}$ modulation component included within a discrimination pattern (DP) comprised of a set of 2K modulation components. The modulation components $c_k(t)$ are defined as:

$$C_k(t) = \sum \beta_j \phi_k(t - jT_c)$$

where $\beta_j$ is the value (i.e., ±1) of the C/A code during a $j^{th}$ code cycle, and $\Phi_k(t)$ is a pulse function admitting to the following representation:

$\Phi_k(t)=1$ for $(k-1)T/N \leq t \leq kT/N$ $\Phi_k(t)=0$ otherwise where N corresponds to the number of modulation components.

Non-coherent Mode Operation

As mentioned above, during non-coherent mode operation the receiver 100 is out of phase-lock with the received carrier. In order to remove the carrier phase component from the received GPS signals, both the I-channel signal I(t) and the received Q-channel signal Q(t) are used during formation of the non-coherent mode discrimination signal $D_{NCM}(\tau)$. As an example, a quantitative representation of a non-coherent mode discrimination signal $D_{NCM}(\tau)$ derived from a discrimination pattern comprised of two modulation components $c_1$, $c_2$ is set forth below:

$$D(\tau) = \left[\int_o^T I(t)[c_1(t-\tau) - 0.5c_2(t-\tau)]dt\right] \cdot sgn\left[\int_o^T I(t)C/A_P(t-\tau)dt\right] + \left[\int_0^T Q(t)[c_1(t-\tau) - 0.5c_2(t-\tau)]dt\right] \cdot sgn\left[\int_0^T Q(t)C/A_P(T-\tau)dt\right]$$

wherein $c_1$ and $c_2$ correspond to the two earliest modulation components of a version of the prompt C/A code (C/A$_P$) shifted early by the time offset τ. For the specific case of the discrimination pattern depicted in FIG. 2J, the first modulation component $c_1$ corresponds to the earliest one-eighth component of a version of the prompt C/A code (C/A$_P$) shifted early by 1/16 of a C/A code chip (i.e., τ=T/16). Similarly, the second modulation component corresponds to the next earliest one-eighth component of a version of the prompt C/A code (C/A$_P$) shifted early by T/16.

FIGS. 3C and 3D are graphs of the discrimination functions characterizing variation in the averaged value of the discrimination signals, i.e., of either $D_{CM}(\tau)$ or $D_{NCM}(\tau)$, generated using the discrimination patterns of FIGS. 2J and 2K, respectively. That is, the discrimination functions of FIGS. 3C and 3D are equally representative of coherent-mode and non-coherent mode operation. FIG. 3C provides a representation of the variation in the value of the code phase control signal 114 for the case of the discrimination pattern depicted in PIG. 2J. Again, the horizontal axis of FIG. 3C is indicative of the phase offset between the received C/A code and the locally generated prompt C/A code (C/A$_P$).

Referring again to FIG. 4, a description will now be provided of those signal processing elements within the receiver 100 primarily responsible for generating the non-coherent mode discrimination signal $D_{NCM}(\tau)$. In particular, the signal $D_{DCM}(\tau)$ is seen to be provided by a summer 170, the output of which is switchably connected to the averaging circuit 154 through the switch 150. The summer 170 adds the product signals produced by first and second non-coherent channel multipliers 174 and 178. As is indicated by FIG. 4, multiplier 174 forms a first of the two product signals provided to summer 170 by multiplying the correlation result from the I-channel correlator 140 with the sgn 182 of the output produced by the I-channel correlator 142. Similarly, multiplier 178 forms a second product signal by multiplying the correlation result from the Q-channel correlator 144 with the sgn 184 of the output produced by the Q-channel correlator 146.

The receiver 100 further includes a carrier rotation circuit 192 and carrier track circuit 194 coupled to the I-channel correlators 140, 142, and to the Q-channel correlators 144, 146. The carrier rotation and carrier track circuits 192 and 194 operate in a conventional manner to remove the carrier component from the correlated outputs produced by the correlators 140, 142, 144 and 146.

Figure 5:
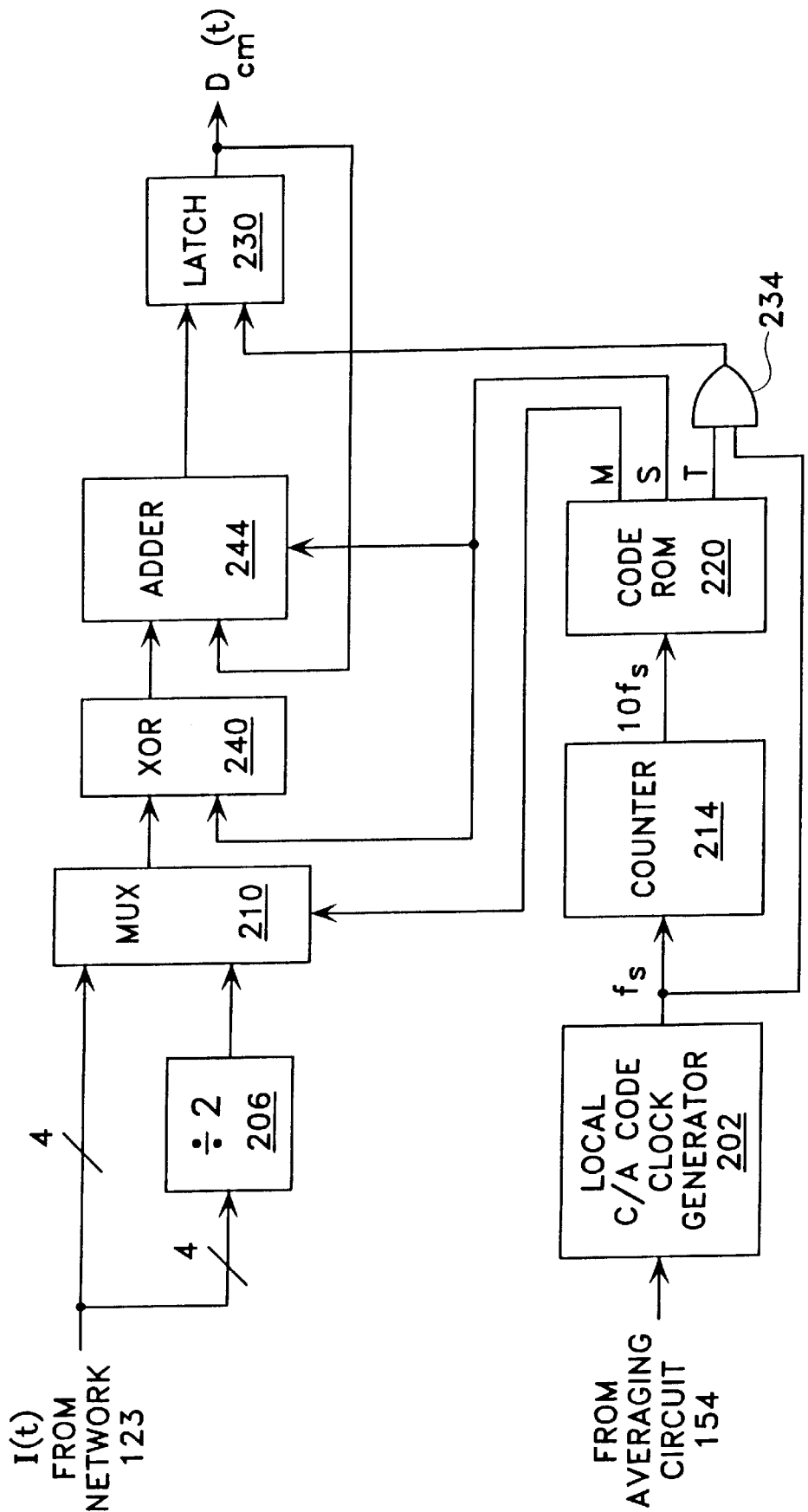
FIG. 5 depicts a preferred implementation of a component discriminator module operative to correlate the received I-channel satellite signal I(t) with a selected discrimination pattern (DP).

Turning now to FIG. 5, a preferred implementation is depicted of a component discriminator module operative to correlate the I-channel signal I(t) with the discrimination pattern (DP). The component discriminator module comprises a unitary apparatus which effects the functions performed by both the discrimination pattern generator and the I-channel correlator 140. As is discussed below, the component discriminator module is responsive to the DP phase control signal from the discriminator pattern generator 110, and produces the coherent mode discrimination signal $D_{CM}$(τ). In the exemplary embodiment of FIG. 5, the component discriminator module correlates the signal I(t) using a 10-component discrimination pattern in which each modulation component is of a duration of 0.1 code chips. This 10-component discrimination pattern is analogous to the 8-component discrimination pattern of FIG. 2J, in that it is formed by combining the first two of the ten available modulation components. That is, the 10-component discrimination pattern is formed by subtracting, from the first one-tenth of the locally-generated prompt code (i.e., C/A code or P code), the second one-tenth component of the locally-generated code scaled by a factor of one-half. This discrimination pattern is of the "A-0.5B" type described above, where "A" corresponds to the first one-tenth of the locally-generated prompt code and "B" corresponds to the second one-tenth of the locally-generated prompt code. In addition, both the first (A) and second (B) one-tenth modulation components are generated so as to be "shifted early" in time by 1/20 of a code chip relative to the phase of the locally-generated prompt code.

As is indicated by FIG. 5, the component discriminator module includes a local code clock 202, the phase of which is controlled by the DP phase control signal 114 (FIG. 4). The local code clock 202 is used to synchronize a local code generator (not shown), which produces the locally generated version of the C/A code or P-code used by the I and Q channel correlators 142 and 144 (FIG. 4). The I-channel signal I(t), which in the embodiment of FIG. 5 comprises a 4-bit digital value received from the I.F. processing network 123 (FIG. 4), is provided to a divide-by-two circuit 206, as well as to a 2 to 1 multiplexer 210. If D3, D2, D1, and D0 represent the 4 bits of the I-channel signal I(t), where D0 corresponds to the least significant bit (LSB) and D3 to the most significant bit (MSB), then the 4-bit output of divide-by-two circuit 206 may be expressed as 0, D3, D2, D1.

During each code clock period defined by the local code clock 202, a counter 214 provides a sequence of ten addresses to the code programmable read only memory (PROM) 220. Each of the ten addresses identifies a memory location at which are stored values corresponding to each of the ten modulation components of the 10-component discrimination pattern used to correlate the I-channel signal I(t). In particular, the value of each of the ten modulation components comprising the ten component discrimination pattern is defined by a set of three bits, i.e., by a sign bit (S), a multiplex bit (M), and by a take/delete bit (T). In the exemplary embodiment the three bits (S, M, T) corresponding to each modulation component are stored within sequential memory locations within the code PROM 220, the first of which is specified by each of the ten different addresses received from the counter 214 during each code clock cycle.

Figure 6:
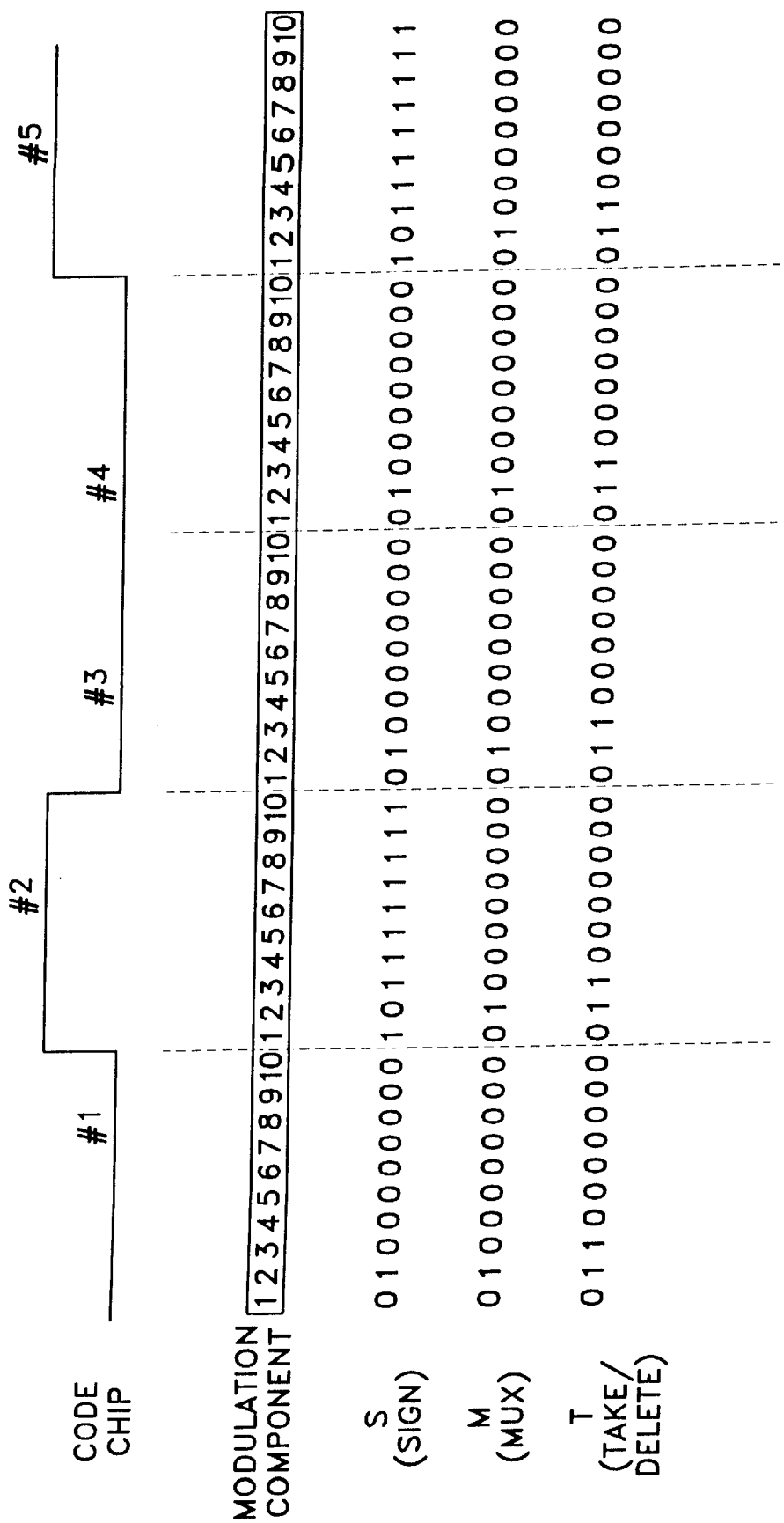
FIG. 6 provides an illustrative representation of the contents of a code programmable read-only memory (PROM) included within the component discriminator module of FIG. 5.

FIG. 6 provides an illustrative representation of the contents of the code PROM 220. As is indicated by FIG. 6, for each code clock period (i.e., "code chip") there are stored a sequence of ten sign (S) bits, ten multiplex (M) bits, and ten take/delete (T) bits. In the specific example of FIG. 6, the first chip (#1) of the locally generated code is assumed to be a zero, the second chip (#2) is a one, the third chip (#3) is a zero, the fourth chip (#4) is a zero, and the fifth chip (#5) is a one. Although not shown in FIG. 6, a set of S, M and T bits associated with each of the remaining bits of the locally-generated C/A or P code are also stored within the code PROM 220. The multiplexer 210 is controlled by the "M" bit provided by the PROM 220. Specifically, the multiplexer selects the signal I(t) when M is 0, and selects the signal I(t)/2 from the divide-by-two 206 when the M bit is 1. It is observed that the values of the "M" bit are independent of the polarity (0 or 1) of each code chip (see FIG. 6). The sequence of M-bit values specified by FIG. 6 (0100000000), results in the multiplexer 210 selecting the value of the signal I(t) for each of the ten modulation components within the discrimination pattern, except that for the second modulation component the value of I(t)/2 from the divide-by-two 206 is selected instead. This results in the first, or "A", component of the "A-0.5B" type discrimination pattern being of unity magnitude, and of the second "B" component being of one-half magnitude.

The output of the multiplexer 210 is arithmetically combined with the value stored within latch 230 during every clock cycle of the code clock generator 202, which is coupled to the latch 230 through AND gate 234. This arithmetic combination, consisting of addition or subtraction, is effected using an exclusive-OR (XOR) gate 240 and a digital adder 244. In particular, the ten outputs from the multiplexer 210 produced during a given code clock cycle are XOR'd with corresponding ones of the ten sign bits (S) generated during the clock cycle. It is observed that the S bit corresponding to each modulation component is equal to the polarity of the local code (0 or 1), except with respect to the second modulation component, for which the S bit is of opposite polarity. That is, the first (A) modulation component of the "A-0.5B" type discrimination pattern is of the same sign as the local code, and the second (B) modulation component is of opposite sign.

The operation of the latch 230 is controlled by the take/delete (T) bit provided by the code PROM 220. When the value of the T bit is zero, the output of the adder 244 is prevented from entering the latch 230. Conversely, when the value of the T bit is zero, the output of the adder 244 is acquired by the latch 230. The identical sequence of T bit values (0110000000) generated during each code clock cycle results in the values from the adder 244 corresponding to the first two modulation components (i.e., the A and B components) being admitted into the latch 230, and the values corresponding to the remaining eight modulation components being prevented from entering the latch 230. In this way only the product of the signal I(t) with the first and second modulation components is accumulated within latch 230, which is required in order to effect correlation of the received signal I(t) in accordance with a "A-0.5B" type discrimination pattern. The initial "0" bit within the T-bit sequence (0110000000) introduces a one-tenth code clock delay in the T-bit sequence relative to the M-bit and S-bit sequences (FIG. 6), which is necessitated by the one-tenth code clock propagation delay between the multiplexer 210 and latch 230.

Although the component discriminator module of FIG. 5 could be implemented so as to generate modulation components "shifted early" in time by the requisite amount (e.g., 1/20 of a code chip), a more practical technique for effecting this time shift may be employed. Specifically, if the discrimination patterns are not "shifted early" relative to the local clock phase by the component discriminator module, the resultant bias error may be removed mathematically in subsequent processing. Even if the resultant bias is not so removed, any consequent error developed in the estimated local clock phase may be immaterial in many applications.

The discriminator of FIG. 5 may be characterized as a "coherent mode" discriminator, in that it is operative to generate the coherent mode discrimination signal $D_{CM}(\tau)$. Those skilled in the art will realize that, with minor modification, such a discriminator could be also be used to generate the non-coherent mode discrimination signal $D_{NCM}(\tau)$ by correlating the Q-channel signal with a selected discrimination pattern.

Further Description of Code Multipath Mitigation:

An important aspect of this invention extends the concept of the narrow correlator to further reduce the effect of multipath signals. FIGS. 21 and 22 show how the narrow correlator substantially reduces the effect of multipath signals by symmetrically limiting the amplitude of the error function. The present invention derives from the observation that the only beneficial part of the error function, after initial alignment, is the central linear slope region of the code error function. Having an error function value of zero outside that region would eliminate rather than just attenuate the effect of all multipath signals with a delay somewhat greater than half the width of the central linear slope region.

It will be understood that the "central linear slope region" of the code error function may not be precisely linear in a practical implementation of the invention. The term "central linear slope region" will, however, be used in this description to facilitate identification of the region of the error function extending on both sides of the punctual track point without multipath (402 in FIG. 22C or 402' in FIG. 22D).

To achieve the desired multipath mitigation effect, in accordance with this aspect of the invention the narrow E–L window is modified. The modified window is referred to as a Multipath Mitigation Window (MMW), of which there are several forms. One example of a multipath mitigation window (MMW) is shown in FIG. 23, which corresponds with FIG. 18 for the wide correlator window and with FIG. 21 for the narrow correlator window. More specifically, FIG. 23A depicts a segment of the received code, FIG. 23B illustrates a punctual MMW, and FIGS. 23C–23E depict the MMW advanced by a half chip, a full chip and 1.5 chip, respectively. The amplitude of the MMW has three levels, ±½, 0, and –1, as shown in FIGS. 23B–23E, or the inverse of these levels at code transitions with the opposite polarity. FIG. 23F shows that this window creates the same central linear slope region as the narrow correlator. However, after the MMW error function reaches its maximum value in the central region, it returns to zero rather than remaining at that maximum value, as does the narrow correlator error function.

For purposes of illustration, FIGS. 23A–23F were drawn as if the highest available clock rate is only five times the code chip rate. As a result, each of the three segments of the MMW have a width of one fifth of a code chip. By way of contrast FIGS. 24A–24C assume that the available clock rate is 40 times the chip rate. It is evident that use of a narrower window improves the Code Error Function for both the narrow correlator and for the MMW.

With an even higher clock rate, all three segments of the MMW could be smaller. However, the central segment must remain wide enough to accommodate most if not all of the code transition time, which usually is defined by the receiver bandwidth. Nevertheless, the two outside MMW segments could be narrower than the central segment. The objective is to drive the error function to zero as quickly as possible on either side of the central linear region. If the two outside segments are narrower than the central one, then their amplitudes must be scaled so that the total area of the three segments remains at zero.

FIGS. 25A–25F show how the MMW further reduces the impact of multipath signals. FIG. 25A shows a directly received code segment and FIG. 25B shows a multipath segment which, relative to the direct signal, is delayed by one quarter chip, has half its amplitude, and has inverse polarity. In FIGS. 25C and 25D are the narrow correlator window and the MMW under consideration. FIG. 25E plots the code error functions obtained with the narrow correlator for the directly received code and for the received multipath code, and FIG. 25F plots the same code error functions when the MMW is used. The figures show that, although the effect of this multipath signal on the track point is attenuated by use of the narrow correlator, the MMW eliminates the effect altogether. This is because the delayed (multipath) MMW error function has a value of zero within the linear central region of the direct signal MMW error function. FIGS. 23, 24 and 25 together illustrate that multipath response with this MMW is never worse than with an equivalent narrow correlator for any multipath signal, and that multipath signals that arrive with a delay greater than 1.5 MMW segments (where there are three segments per MMW window) cause no track point error at all. Therefore, this aspect of the invention provides a major improvement in code tracking accuracy by eliminating the effect of multipath signals that arrive with a delay greater than 1.5 MMW segments.

FIGS. 23 and 24 also illustrate a problem that arises with use of the MMW depicted. There is a half-amplitude error function response that occurs at a one chip spacing on either side of the central region, and indicated at 410 and 412 in FIG. 23F and FIG. 24C, respectively. This secondary response occurs because there is a 50% chance that an opposite polarity code transition will occur one chip from the correctly aligned code transition. As a result, if the multipath signal delay is very nearly one chip, then some portion of its early secondary response will fall within the central region of the direct signal error function and thus affect the track point. Note, however, that only the early secondary response can cause this effect. Because multipath signals always are delayed, the late secondary response can never fall within the central region of the direct signal error function.

A solution to this problem is illustrated in FIG. 26. FIG. 26A shows a received code segment that is the same as FIG. 23A. FIG. 26B, similarly, is the same as the MMW of FIG. 23B. As with every detection window used to track known binary waveforms, the MMW is present where there are code transitions. This is consistent with optimizing the signal-to-noise ratio of the tracking process. Tracking information is present only at the transitions and not elsewhere. Therefore, to maximize the information and minimize the noise allowed into the tracking process, windows classically occur only at transitions, and often they are narrowed to exclude as much noise as possible.

The next aspect of the invention to be described is not intuitively apparent and goes against the conventional wisdom of decades of signal tracking experience. As illustrated by FIGS. 26C and 26D, this aspect of the invention requires that MMWs also be placed at code clock times where transitions do <u>not</u> occur. The examples shown are for a negative transition and for a clock time where the code state remains negative. The MMW has the opposite polarity at positive transitions and at clock times where the code state remains positive. In other words, one implementation of this invention places an MMW at every clock time of the code. Because each MMW has an average value of zero, it contributes nothing to the error signal unless a code transition occurs within its boundaries. The purpose of the MMW at clock times with no transition is to cancel the secondary response (indicated at 410 and 412 in FIGS. 23F and 24C), which otherwise occurs when the reference code is shifted one chip interval from punctual alignment. For the two code segments shown in FIG. 26C, the 50% probable transitions at one chip displacement are of opposite polarity, which cancels the secondary response, as shown in FIG. 26E.

To be more precise, the MMWs at non-transitions attenuate the secondary responses by 1/N, where N is the number of chips in the code. This is because the number of transitions in a maximal length code is one more than the number of non-transitions, e.g., 512 transitions and 511 non-transitions in a GPS C/A code. For all practical purposes, this difference can be ignored, or one MMW at a code transition can be deleted for perfect cancellation.

The main disadvantage of having a window at every clock time is that the amount of noise energy allowed into the tracking function is doubled without increasing the signal content. This results in a 3-decibel (3 dB) reduction of signal-to-noise ratio compared with having MMWs only at code transitions. This almost certainly is a good tradeoff for the error function of FIG. 23F, but it is not as vital for the error function of FIG. 24C. Such tradeoffs must be made for each application of the invention.

Yet another aspect of the present invention is to minimize the impact on signal-to-noise ratio of having an MMW at every code clock time. This aspect of the invention is based on the observation that only the early secondary response can cause a multipath tracking error because multipath signals are always delayed relative to the direct signal. Therefore, an asymmetric MMW, as shown in FIGS. 27B and 27D, can be used. For ease of comparison, the received code segments shown in FIGS. 26A and 26C are repeated in FIGS. 27A and 27C, respectively. It can be seen that the MMW error functions of FIGS. 26E and 27E are identical on the early side of the central region, but that they differ on the late side. The asymmetric MMW has an area which is 25% less than the symmetric MMW, for an improvement in signal-to-noise ratio of 1.2 dB, and the resultant late side error function response does no harm and will not cause multipath error.

There is another minor disadvantage to the asymmetric MMW. Because it is asymmetric, the average value at perfect code alignment is not precisely zero. This is because the asymmetric MMW signal product at non-transitions must balance the asymmetric MMW signal product at transitions, except that optimal codes have one more transition than non-transitions. Thus, a bias of $1/(2N)$ times the maximum amplitude of the central linear response of the code error function is created. This is negligible for typical codes with N greater than 1,000 chips, but it can be eliminated entirely by deleting one MMW at a code transition.

Therefore, in accordance with this aspect of the invention the inventors have discovered and defined a class of code tracking windows which create code error functions with a value of zero immediately preceding the central linear region. The objective is to eliminate the effect of multipath signals on the direct signal track point when the multipath delay is greater than one and a half times the width of the narrow central linear region.

Because multipath error is the single largest source of code tracking error for modern, high precision receivers, the benefit of this invention is to improve code tracking accuracy in general and GPS navigational accuracy in particular. An important objective in GPS receiver design is to achieve code tracking accuracy of better than nine centimeters with high reliability (e.g., three sigma). This will allow direct resolution of GPS L1 signal carrier phase ambiguities as well as direct resolution of the ionosphere free combination of GPS L1 and L2 carrier phase ambiguities. A number of significant benefits will flow from this capability, including:

(1) The ability to use less expensive single frequency (rather than dual frequency) GPS receivers for centimeter accuracy surveys and navigation over distances of 10 kilometers or more from the base station. (Dual frequency receivers are used today in order to resolve ambiguities in seconds rather than tens of minutes usually required with single frequency receivers.)

(2) The ability to perform centimeter accuracy surveys and navigation with only four satellites visible instead of the five or more now required to resolve ambiguities in an acceptably short time. This will make the use of GPS more practical in difficult environments where GPS signals are blocked by terrain and foliage.

(3) The ability to perform centimeter accuracy surveys and navigation over distances of 100 kilometers or more from the base station by directly resolving the ionosphere free combination of GPS L1 and L2 carrier phase ambiguities. Without this improvement, the L1 and L2 signals are used to form a difference frequency in order to achieve more rapid ambiguity resolution with the 86 centimeter wavelength of (L1–L2). By using code measurements to resolve ambiguities, the L1 and L2 signals can be combined to remove ionospheric refraction effects, thus greatly expanding the radius of coverage from a base station.

Phase Multipath Mitigation Invention:

(a) Effect of Multipath on Carrier Phase:

The multipath mitigation techniques described above significantly reduce the effect of multipath signals on code tracking accuracy. However, they do not address the effect of multipath signals on carrier phase measurements. Therefore, a second major aspect of the invention is to extend the multipath mitigation concept to minimize carrier phase tracking error due to multipath signals.

FIG. 28A shows a portion of a received code signal with a single transition and FIG. 28B depicts one example of a corresponding delayed and inverted multipath signal transition. FIG. 28C shows a phase MMW sampler, which has a short positive component before the direct signal code transition and a short negative component immediately after the direct signal transition but before the multipath signal transition. The polarity of each phase MMW sampler component is determined by the polarity of the local code at that time.

Figure 14:
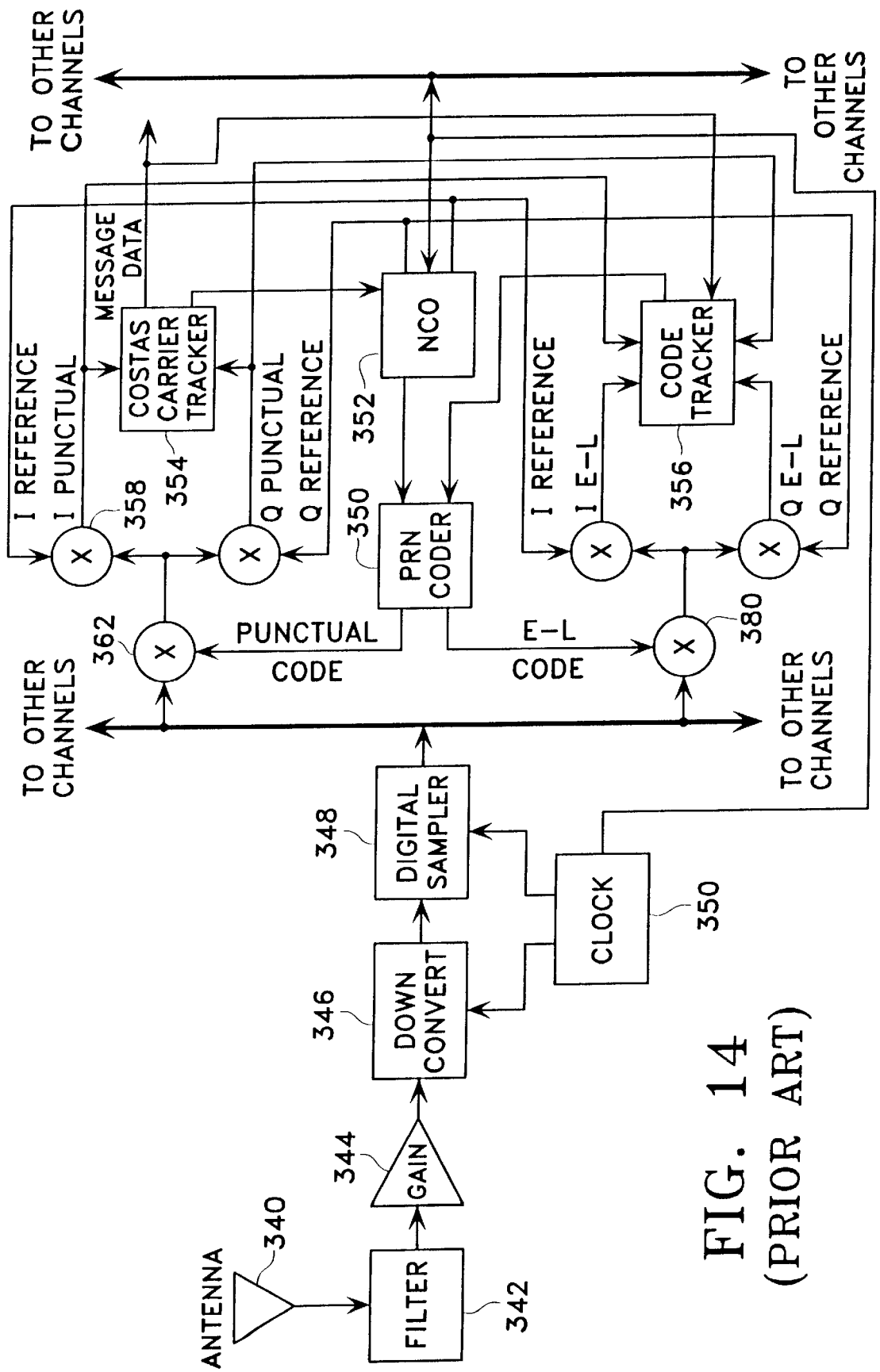
FIG. 14 is a block diagram of a PRN signal receiver of the prior art.
Figure 19:
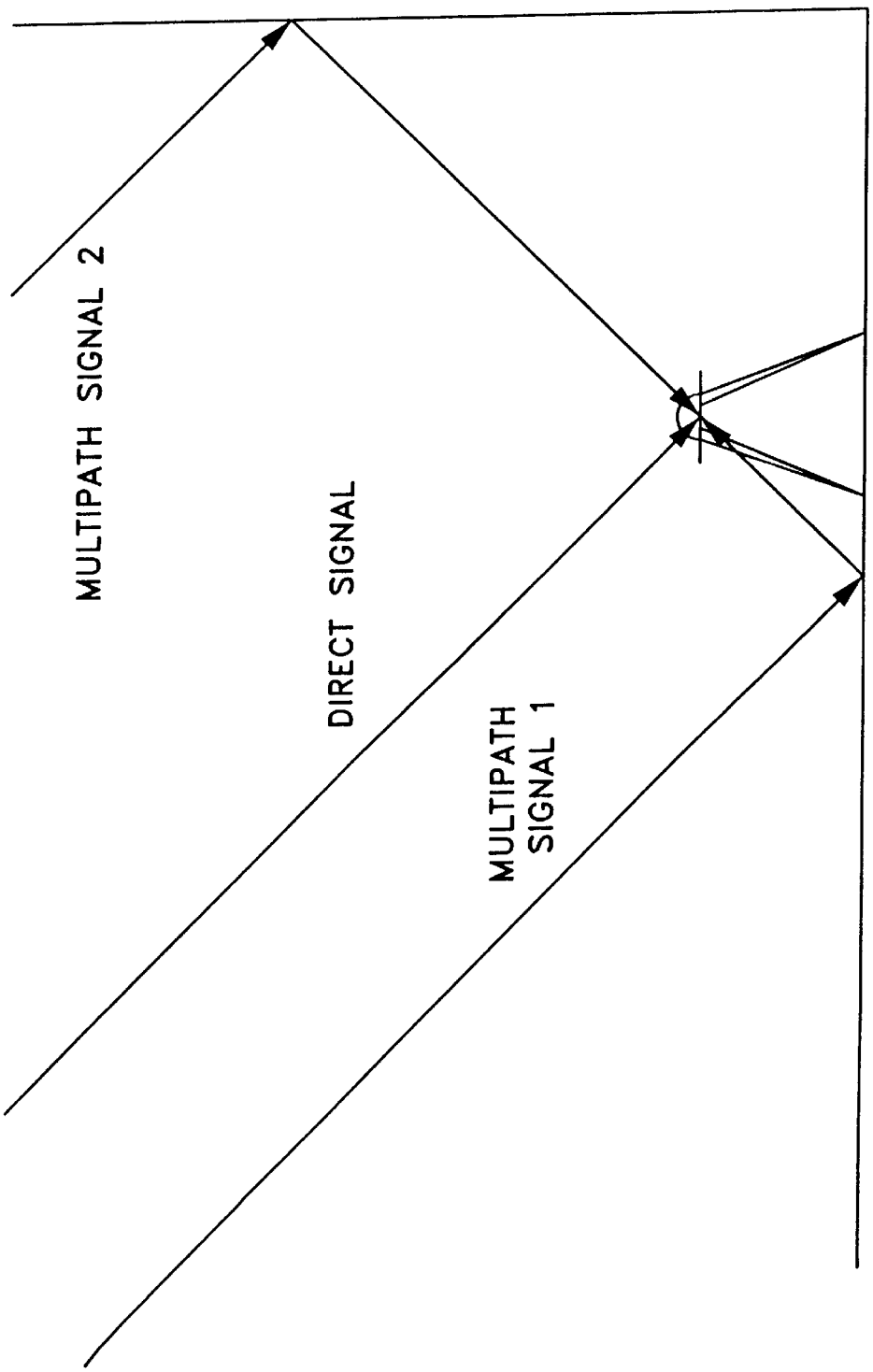
FIG. 19 is a diagrammatic illustration of the origin of multipath effects.

The phase vectors shown in FIG. 29A show the components of the carrier signals relative to the numerically controlled oscillator 352 (FIG. 14), at various times before and after the direct signal code transition. The vector sum of these vectors defines the I punctual and Q punctual components entering the Costas carrier tracker 354 (FIG. 14). For illustration convenience, the X axis of this figure represents the Q value and the Y axis the I value, so that line T represents the average signal phase tracked by the Costas loop over thousands of code chips.

It is important to understand the time scale of these vector diagrams. The Costas tracking loop of a typical GPS C/A code receiver has a bandwidth of 10 to 25 Hz. This means that the loop filter time constant is on the order of 40 to 100 milliseconds, which encompasses 40,000 to 100,000 C/A code chips. The phase vectors of FIG. 29A represent input signals that are being averaged over 40 to 100 millisecond periods, so they are essentially stationary over the duration of a few C/A code chips, which have a period of about one microsecond each. At this microscopic time scale, the vectors are affected only by the code phase modulation. Over longer periods of time, e.g., seconds, the vectors will rotate in phase and change in amplitude relative to each other.

As will be explained, the vector diagrams of FIGS. 29A and 29B make it plain that the Costas tracking loop does not measure the phase of the direct carrier signal. It measures the phase of the vector sum of the direct signal plus all of the received multipath signals. For GPS receivers used in centimeter accuracy survey and navigation applications, a few millimeters of error is significant. Because the GPS L1 carrier signal has a wavelength of about 19 centimeters, every two degrees of carrier phase error produces a millimeter of measurement error. This is why a reduction in phase error caused by multipath is an important objective.

With respect to the vector diagram of FIG. 29A, vector D represents the phase and amplitude of the direct received signal, prior to the code transition, relative to the average tracked phase of the Costas Loop, as represented by line T. Thus, the phase tracking error is the angular offset between vector D and line T. To simplify this analysis, we consider the effect of only one multipath signal, represented by vector M. Thus, vector A, which is the composite signal phase being tracked by the Costas Loop, is the vector sum of the direct signal, vector D, and the multipath signal, vector M. These three vectors represent the state of the input signals prior to the code transition, particularly during interval A of the phase MMW sampler.

This aspect of the invention may be understood by noting what happens to the signal vectors immediately after a direct signal code transition but before the multipath signal code transition, e.g., during period B of the phase MMW sampler. At the direct signal code transition, vector D changes phase by 180 degrees. In fact, this is the meaning of a code transition, i.e., the carrier phase is inverted. Thus, vector –D represents the phase and amplitude of the direct signal immediately after the code transition. Because the multipath signal is delayed by its extra path length, vector M does not invert at the direct signal transition, but retains its original pre-transition direction until the multipath code transition. Thus, during the interval between the direct signal code transition and the multipath signal transition, the composite signal is represented by vector –B, which is the vector sum of vector –D and vector M. As illustrated, this is the status during period B of the MMW. At the multipath signal code transition, vector M is inverted and becomes vector –M. The vector sum of vector –D and vector –M is vector –A, which, as expected, is the inverse of vector A.

It will be recalled from the discussion of FIG. 14 that the signals entering the Costas loop are multiplied by the local punctual code. When the local code changes state, all signal vectors entering the Costas loop are inverted. In other words, after the local code transition, vector –A is inverted to become vector A, and vector –B is inverted to become vector B. Thus, the signals actually entering the Costas loop are as illustrated by the solid line vectors in FIG. 29B. They also illustrate the vectors observed by the phase MMW sampler, because the polarity of each phase MMW component is defined by the polarity of the local code during that component. Most of the time, the signal (D) and multipath (M) vectors sum to vector A. However, during the brief interval just after the direct and local code transitions but before the multipath code transition, the vectors sum to vector B. When the multipath code transition occurs, the signals again sum to vector A. This diagram also explains why vectors A and line T are not better aligned. For the example shown, the Costas loop sees vector A 95% of the time and vector B 5% of the time. Therefore, the phase being tracked, as indicated by line T, is biased slightly away from vector A toward vector B. More importantly, the desired phase measurement is the multipath-free angle of vector D.

The key observation from FIGS. 29A and 29B, and the basis for the phase multipath mitigation aspect of the invention, is that the vector average of vector A and vector B is vector D, which is the direct signal phase vector without multipath distortion. This observation shows that it is possible to determine the direct signal phase by vector summing the composite phase vector before any transitions with the composite vector immediately after the direct transition but before the multipath signal transitions.

Although this observation is illustrated with only one multipath signal, the principal of superposition holds that the observation applies equally well to any number of multipath signals. Therefore, performance of this invention is not determined by the number, or relative amplitude, or relative phase of the multipath signals. The only performance limitation is the need to observe phase after a direct signal code transition but before the multipath signal code transition(s), such as during period B of the phase MMW sampler in FIG. 28C. Therefore, this invention cannot mitigate phase error caused by multipath signals with a delay so short that the phase vector between transitions cannot be observed. Other techniques must be used to combat such multipath signals. However, the effectiveness of the present invention can be enhanced by antenna placement strategy. For example, by placing the antenna on a tall mast, it can be removed sufficiently from reflecting objects that the present invention is more effective than it would be for an antenna placed near the reflecting objects.

(b) Implementation Issues:

There are two key implementation issues for the phase multipath mitigation aspect of the invention. The first is to establish where the samples should be taken. The second is to evaluate whether the measurements will have an adequate signal-to-noise ratio.

Although FIG. 28 suggests that phase sample points could be immediately before and after a code transition, these are not the optimum locations. The reason is that multipath signals with approximately a one chip delay will cause correlated transitions to occur between periods A and B, thus introducing an error. Therefore, for essentially the same reason that it is desirable in code tracking to place code MMWs at every code clock time, whether there is a transition or not, it is best to place a phase sampling window just after each code clock, as illustrated in FIGS. 30A–30D. In FIGS. 30B and 30D, phase MMW samplers are placed immediately after each code clock, and the polarity of each sample corresponds with the local code at that time. In FIG. 30B, the phase MMW sampler immediately follows the negative code transition shown in FIG. 30A. In FIG. 30D, the phase MMW sampler is in the same position relative to the code clock, but here it samples the signal shown in FIG. 30C where the code remains negative and does not transition. Each interval A occurs just after a code clock with no transition and is in the same location relative to the code clock as each interval B, which closely follows a code transition. Interval A measures the composite phase before a transition occurs, and interval B measures the composite phase immediately after a code transition. Because all interval A and interval B windows occur at the same position relative to a code clock, the effect of multipath transitions delayed into these windows is, on average, the same for each. However, the 50% probable preceding code transitions have opposite polarities, which cancels the effect.

The vector diagram of FIG. 31A represents the received signals during interval A of FIG. 30D, and the vector diagram of FIG. 31B represents the received signals during interval B of FIG. 30B. Because these figures happen to illustrate a negative code polarity at both times, the signal vectors are shown with negative polarity. If the code polarity were positive, the vectors would be inverted, as would the polarity of the phase MMW samplers. The vector diagram of FIG. 31C represents the signal during interval A multiplied by the polarity of the interval A phase MMW sampler and the signal during interval B multiplied by the polarity of the interval B phase MMW sampler.

It is evident that the vector sum of vector A with vector B provides the phase of vector D, i.e., the direct signal phase unaffected by multipath error. In practice, of course, the summation takes place over a large (and balanced) number of intervals A and B. The vector sum is formed by summing the I components of the signal sampled during intervals A with the I components of the signal sampled during the same number of intervals B and by summing the Q components in the same way. The summed I components and the summed Q components form the I and Q components of the vector sum. The number of intervals used for each summation is chosen to balance the need for a good signal-to-noise ratio and the need to track multipath phase dynamics, as discussed below. (To retain amplitude information, and depending on the particular implementation, it may be preferable to employ a vector average, i.e., the sum divided by the number of inputs, or, alternatively, a vector exponential filter.) The result, as illustrated in FIG. 31C, is a measure of the angular offset of Vector D from the tracking reference, Line T. This is the Costas loop phase tracking error due to multipath signals delayed past Interval B.

The second implementation issue is the signal-to-noise ratio of the measurements. For this purpose, interval B should occur as soon as possible after the code transition, with sufficient delay to account for code tracking error and the finite code transition time caused by signal bandpass filtering. After this delay, interval B should be as narrow as possible to minimize the number of multipath transitions which might occur before it ends. In practice, these limits are often determined by the maximum clock frequency used to drive the digital processing functions. For example, a practical GPS receiver might employ a 40.92 MHz digital clock, which creates 40 intervals of approximately 24.4 nanoseconds each within a C/A code chip and 4 within a P code chip. With this clock, the phase MMW samplers of FIGS. 30B and 30D could be as narrow as 0.025 ($\frac{1}{40}$) of a C/A code chip. Therefore, the signal energy processed during either interval A or interval B is 0.025 times the energy processed during an entire C/A code chip, which results in a signal-to-noise (S/N) power reduction of 16 dB.

Fortunately, this 16 dB S/N loss can be compensated by vector summing, averaging, or filtering the sum of interval A and interval B measurements over longer time periods. For example, assume that the Costas loop has a relatively narrow 10 Hz bandwidth, and thus an averaging time of about 100 milliseconds. By vector averaging the sum of interval A and B measurements for four seconds, i.e., 40 times as long, the S/N ratio of the multipath phase error measurement will be equivalent to the SIN ratio of the Costas loop.

Even more filtering is practical for two reasons. First, the most troublesome multipath signals have maximum phase rates, relative to the direct signal, of a few cycles per minute. Therefore, filtering with a time constant of many seconds is practical. Second, for static survey applications, high rate multipath signals are quickly averaged out by subsequent processing, so they cause no position offset. This example, using a 40.92 MHz clock to drive the signal processing functions, shows that it is practical to determine and thus to remove multipath phase error using a measurement interval of 25 nanoseconds located just after the filtered direct signal code transition is complete. The time delay from the code track point for the filtered transition to complete before starting the measurement is determined by the overall receiver filter bandwidth. For example, with a typical two-pole, 18 MHz bandpass filter, the delay should be about 25 nanoseconds.

In summary, this aspect of the invention pertains to the removal of much of the phase error caused by multipath signals. The technique is to sample the incoming composite signal at points far from code transitions and at points immediately after code transitions. The vector sum of these samples produces a vector representing the direct signal without interference from those multipath signals, which are delayed beyond the samples taken just after the code transitions. The optimum point to sample the signal far from code transitions is just after a code clock where no code transition occurs, in the same position relative to the code clock as the samples just after a code transition.

Because multipath error is the single largest source of phase tracking error for modern, high precision receivers, the benefit of this invention is to improve phase tracking accuracy in general and centimeter level GPS survey and navigation accuracy in particular. In addition, the reduction of phase measurement uncertainty will permit faster resolution of phase ambiguities, which is required before centimeter accuracy survey or navigation can begin. The reduction of phase measurement uncertainty further enhances the potential for more accurate code measurements to provide direct resolution of cycle ambiguities. The overall result will be better accuracy and higher productivity of survey and high precision navigation systems.

Figure 32:
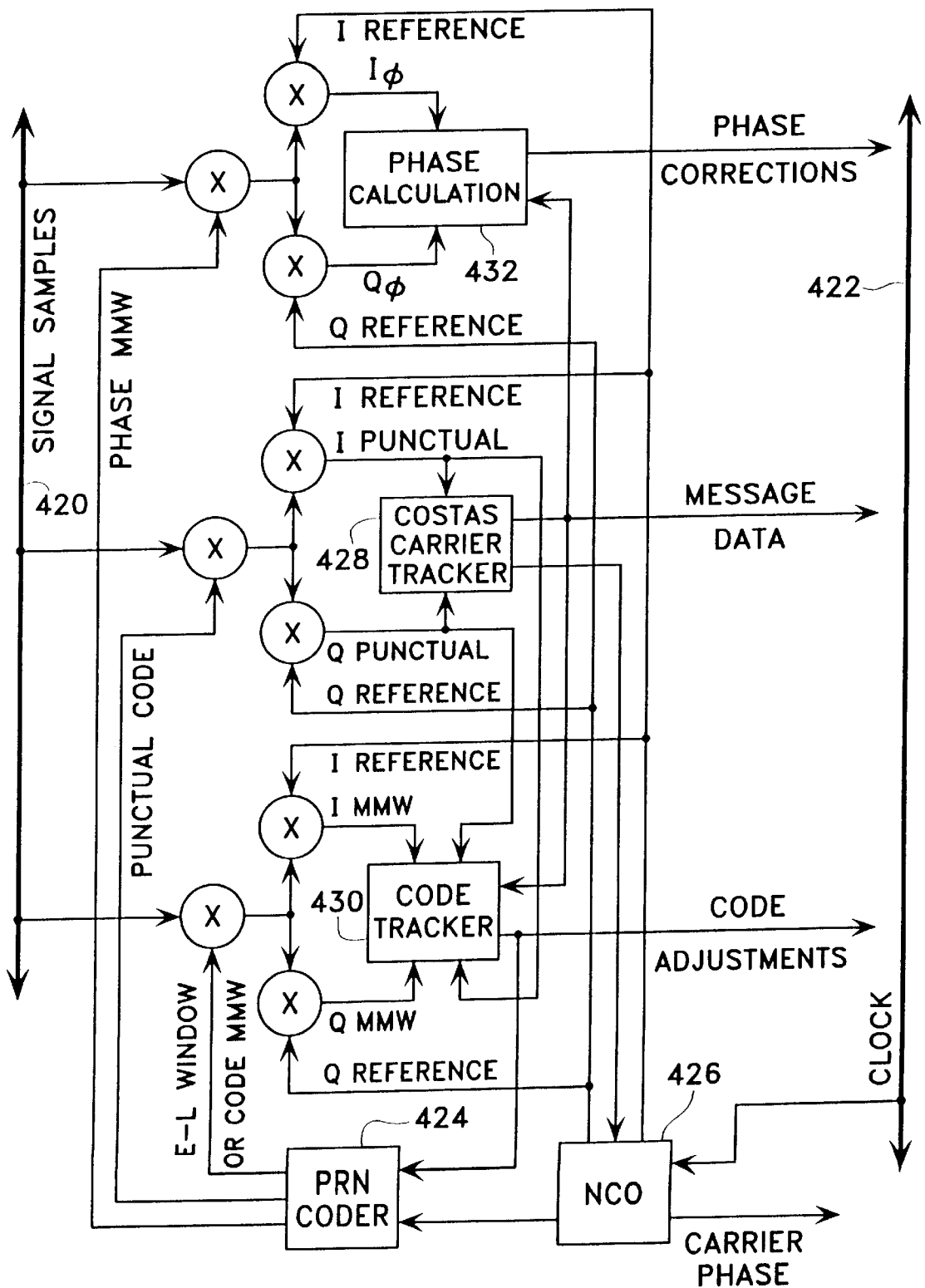
FIG. 32 is a block diagram of the code and phase tracking portions of PRN code receiver capable of employing code and phase multipath mitigation techniques.

Implementation Examples:

FIG. 32 provides more detail on the digital processing portion of FIG. 14, together with the additions required to implement both components of the multipath mitigation invention. Only one channel is shown. The heavy line 420 on the left of the figure represents the bus that provides common samples of the incoming signals to every channel. The heavy line 422 on the right represents the bus that distributes common clock signals to all channels.

Note that each receiver channel processes the signal samples in three different ways. The center section of the figure is used to track composite carrier phase. The signal samples are multiplied by (correlated with) a continuous punctual code supplied by a PRN coder 424 to remove the incoming code transitions. Next, these samples are multiplied by (correlated with) I and Q reference signals from the NCO 426 to produce baseband I and Q components called I Punctual and Q Punctual. These signals enter a Costas carrier phase tracker 428, which locks the frequency and the phase of the NCO 426 to the incoming signal. The Q Punctual signal is used as the tracking error signal, so it is minimized by the tracking process. As a result, the amplitude of the I Punctual signal is maximized.

Because of data modulation, I Punctual will switch between positive and negative values in response to the polarity of the data modulation. Well known techniques are used to track and align signal integrators with the data bits. Thus, the I Punctual signal is integrated over each bit interval to determine the polarity of each received data bit. This process provides the message data output of the Costas carrier tracker 430. Because of the cross multiplication within a Costas loop, the loop will lock and track successfully at either zero or 180 degrees of input phase, and each of these tracking points produces an opposite polarity of the I Punctual signal. Thus, a bit sequence of 101011 may be demodulated as 101011 or as 010100, depending on the phase tracking point of the Costas loop. Message content must be used to resolve the actual polarity of the demodulated data bits.

The lower section of FIG. 32 is used to acquire and track the pseudorandom code. Initial acquisition may be performed with a wide correlator early minus late window, such as that illustrated in FIG. 18. After initial acquisition, tracking will be performed with a multipath mitigation window (MMW) such as those illustrated in FIGS. 23, 26 and 27. The code MMW multiplies (correlates) the input signal samples, which are then multiplied by (correlated with) the I and Q Reference signals from the NCO 426. The results are the $I_{MMW}$ and $Q_{MMW}$ signal components.

When the Costas loop is phase locked to the signal, both the Q Punctual and the $Q_{MMW}$ signals are minimized. Under this condition, it is practical to employ only the $I_{MMW}$ signal to drive the Code Tracker function. The amplitude of the $I_{MMW}$ signal is a function of the offset between the received code and the local code, as illustrated by the code error functions of FIGS. 23 through 27. However, the polarity of the $I_{MMW}$ and $Q_{MMW}$ signals is affected not only by the direction of code error but also by the polarity of the current data bit. To eliminate this problem, the $I_{MMW}$ signal (and the $Q_{MMW}$ signal if desired) is integrated over each data bit interval, and the integration result is then multiplied by the corresponding demodulated message data bit from the Costas loop. Having been rectified by the data bit, the individual integration results may be coherently added to achieve filtering times as long as desired. The code tracking loop adjusts the time phase of the PRN Coder to null the error function, i.e., the amplitude of $I_{MMW}$.

By using one of the code multipath mitigation windows rather than a conventional early minus late window, either wide or narrow, the effect of any multipath signal which is delayed beyond the MMW is eliminated. As a result, code measurement error is significantly reduced.

Figure 7:
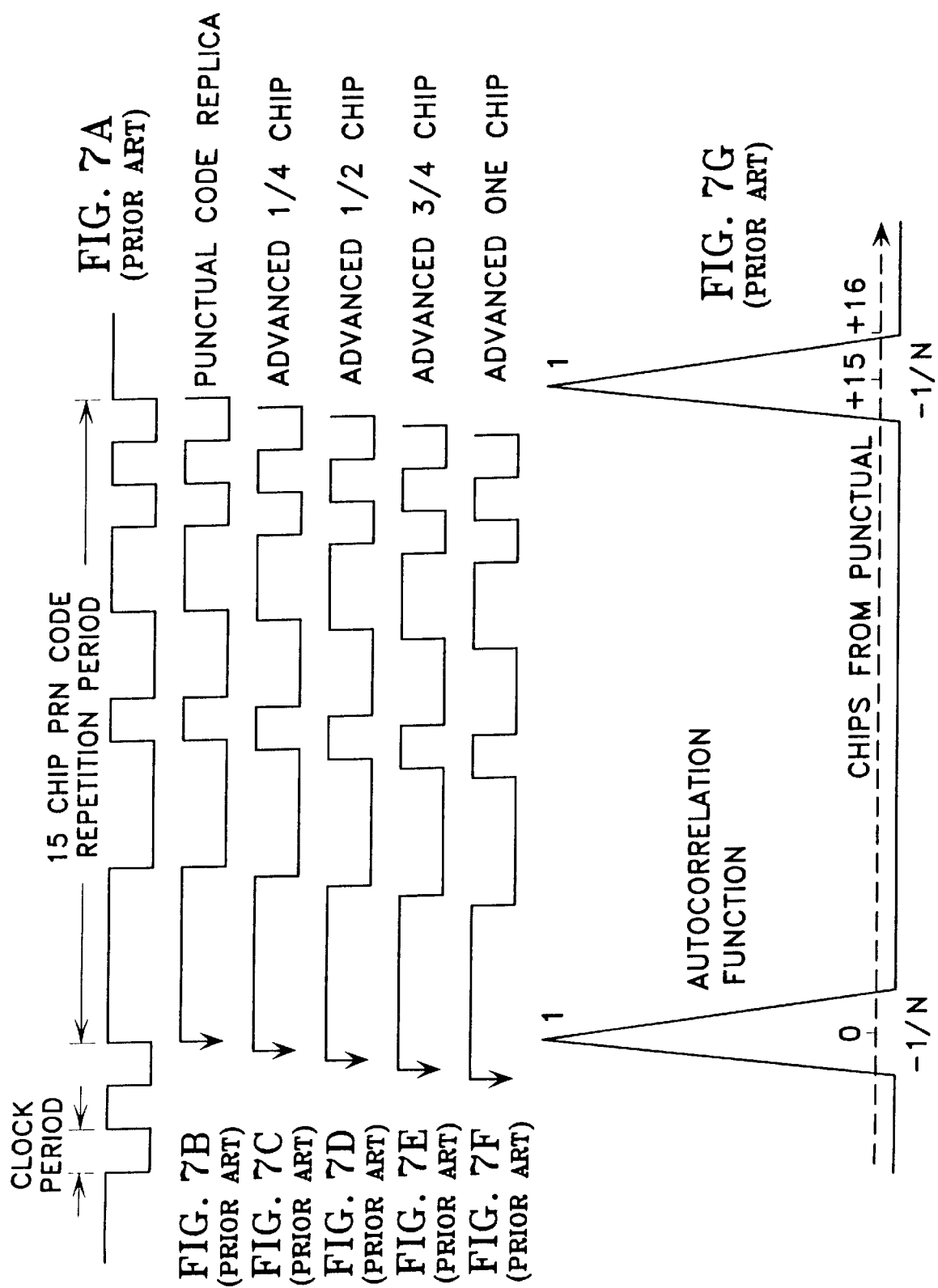
FIGS. 7A–7G together illustrate the concept of autocorrelation.
Figure 8:
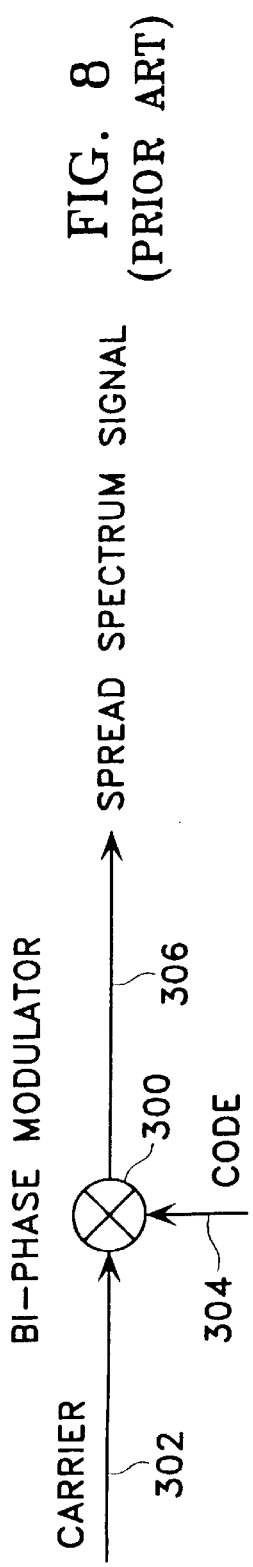
FIG. 8 is a simplified schematic diagram of a pseudorandom (PRN) modulator.
Figure 9A:
FIGS. 9A–9C show a carrier, a code signal and a modulated carrier signal consistent with the modulator shown in FIG. 8.
Figure 9B:
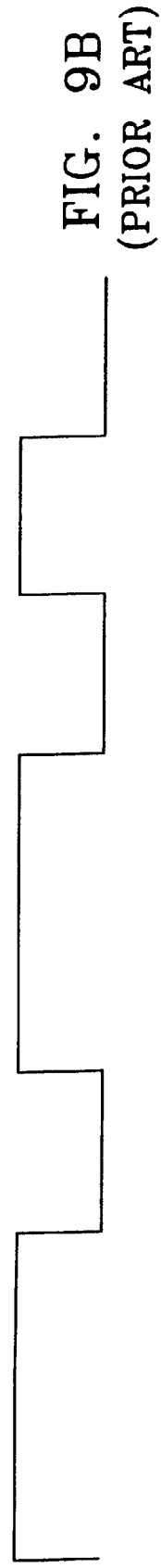
Figure 9C:
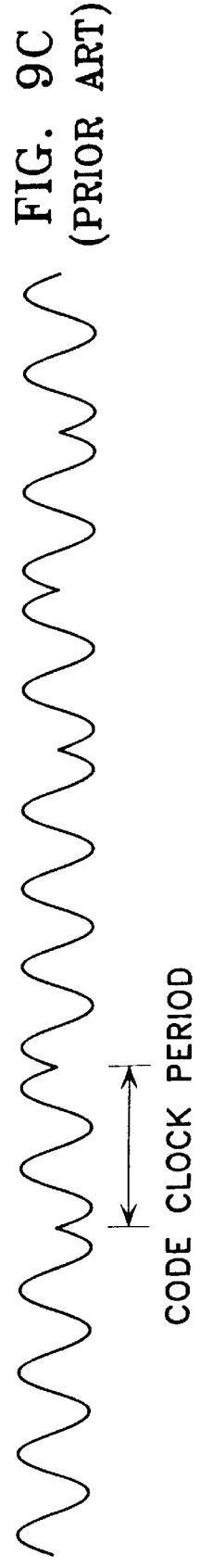
Figure 10:
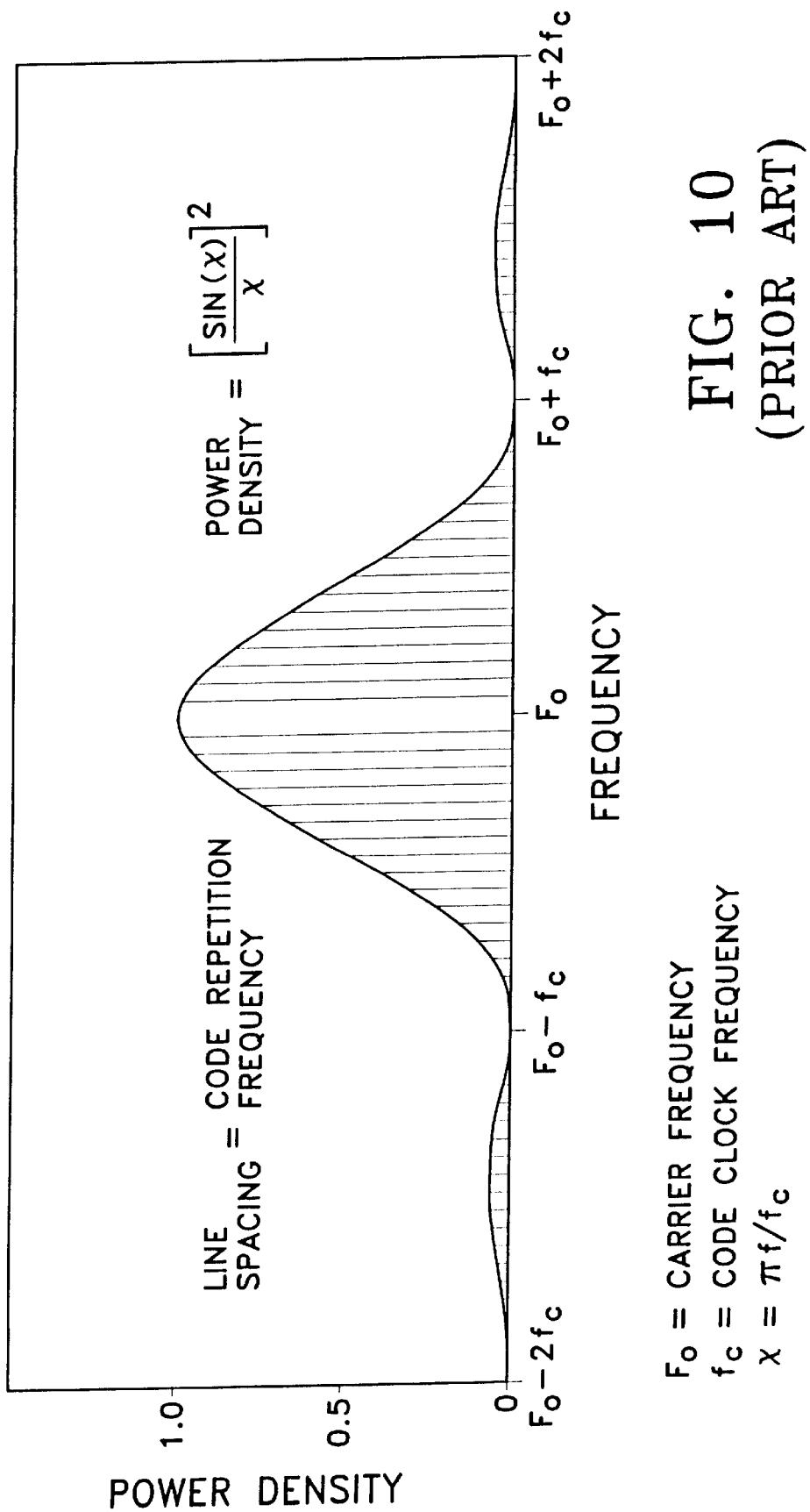
FIG. 10 shows the power density of a spread spectrum signal.
Figure 11:
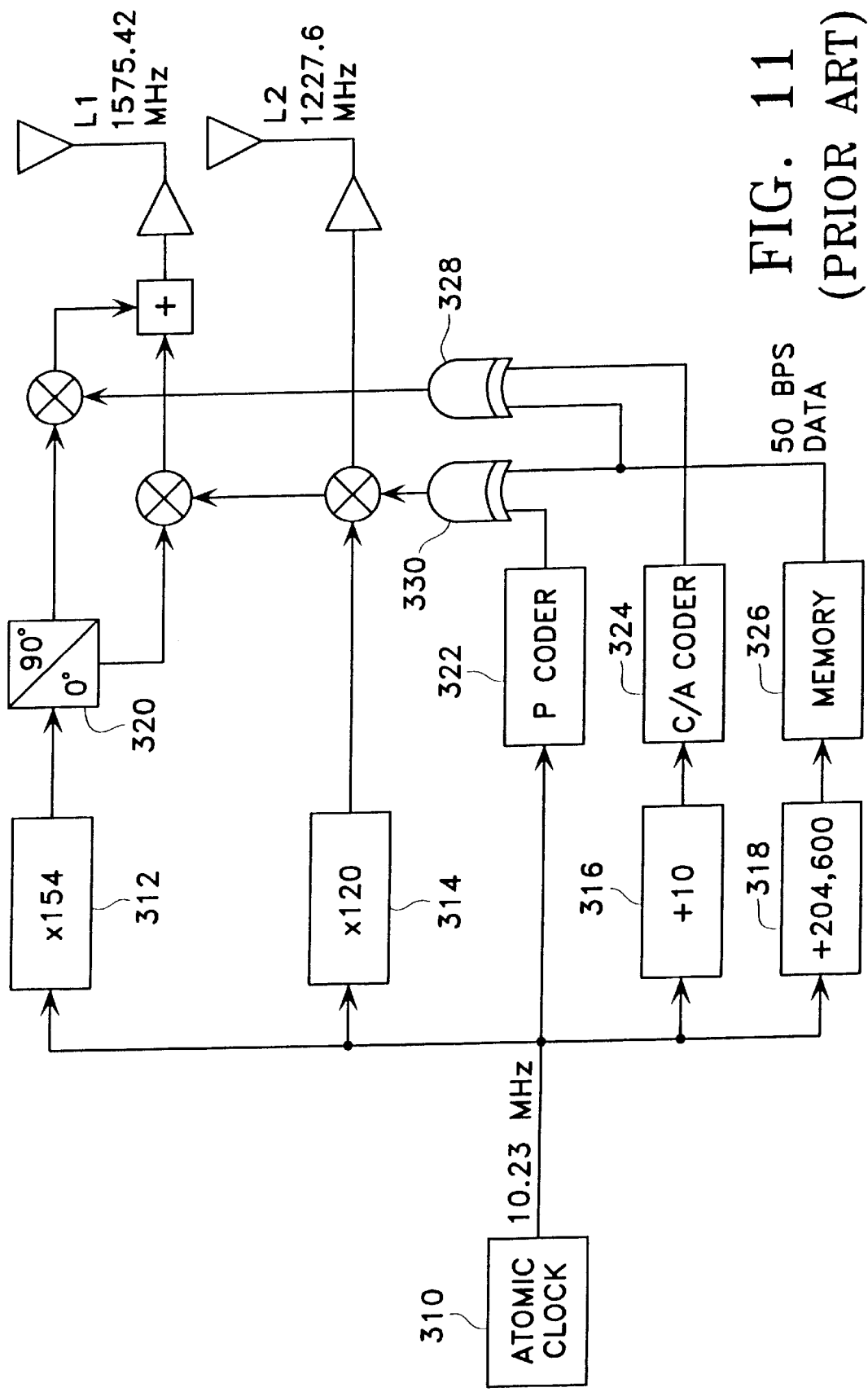
FIG. 11 is a simplified block diagram of a global positioning system (GPS) satellite transmitter.
Figures 12, 13A, 13B:
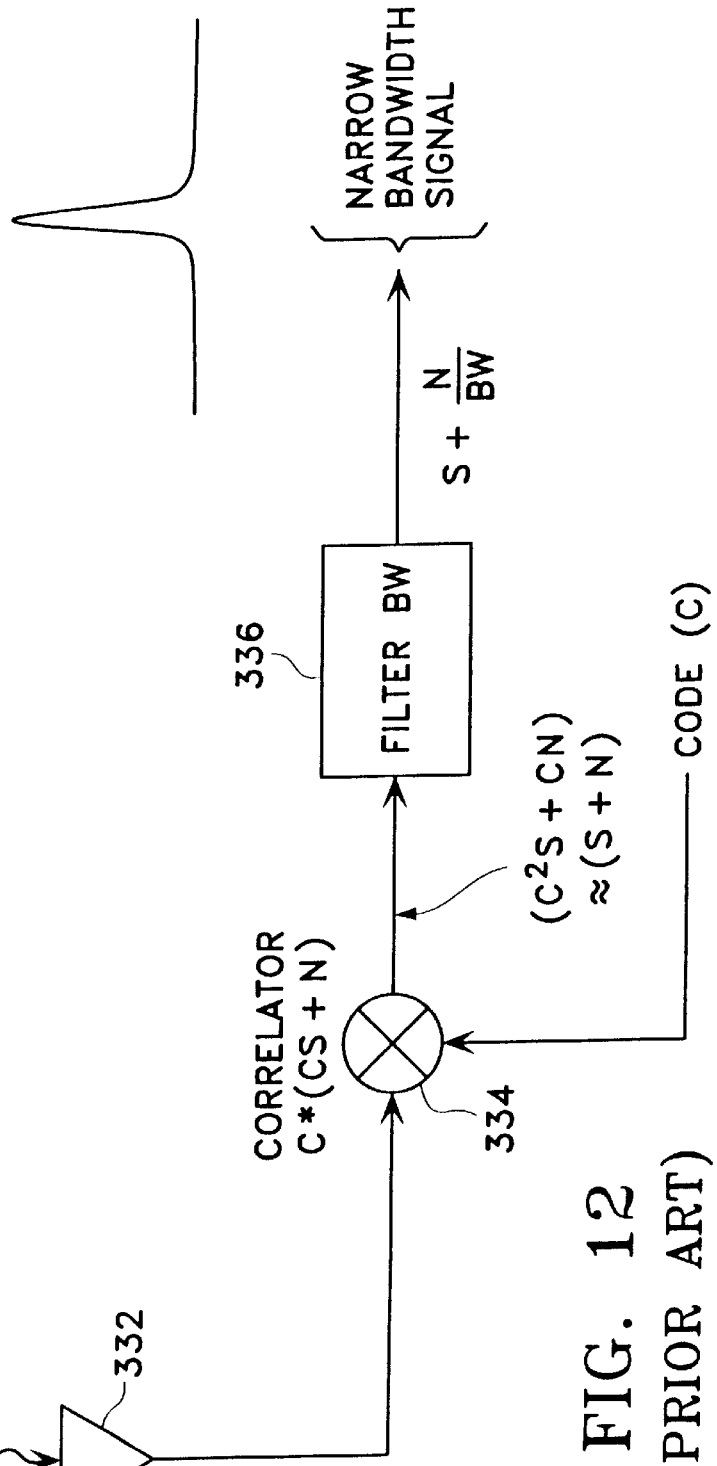
FIG. 12 is a block diagram illustrating a received PRN signal correlation process.
FIGS. 13A and 13B are waveforms of input and output signals for the block diagram of FIG. 12.

In addition to $I_{MMW}$, $Q_{MMW}$, and message data, the code tracker 430 of FIG. 32 also receives I Punctual and Q Punctual inputs. With these, the code loop can be enabled before the Costas loop is locked, i.e., while there is a frequency difference between the signal and the NCO. In this case, the code error function is formed by summing the product of the two I signals with the product of the two Q signals. The result is a scalar value with amplitude corresponding to the code error function multiplied by the code autocorrelation function. This is because code offset affects the amplitude of I and Q Punctual in accordance with the autocorrelation function of FIG. 7G. Also, because of the products, the amplitude of the code error function will change as the square of the input signal amplitude. Any form of analog, digital, or mathematical gain control can be used to compensate for this effect.

The top portion of FIG. 32 relates to the phase multipath mitigation part of this invention. The purpose of this section is to determine the phase offset of the direct signal relative to the phase being tracked by the Costas loop. For this purpose, the signal samples are multiplied by (correlated with) the phase MMWs defined by FIG. 30B and 30D as Intervals A and B. The result is then multiplied by (correlated with) the I and Q Reference signals from the NCO 426 to produce $I_{100}$ and $Q_\phi$ baseband components of the composite signal being received during each sample interval. With reference to FIG. 31, these $I_\phi$ and $Q_\phi$ baseband signals define Vector A during Intervals A and Vector B during Intervals B. The vector average of these measurements over many Intervals A and Intervals B requires only that the $I_\phi$ values and the $Q_\phi$ values be separately averaged.

The $I_\phi$ and $Q_\phi$ averaging intervals must be aligned with the message data bits, because the polarity of the $I_\phi$ and $Q_\phi$ signals are modulated by the current message data bit.

Therefore, the $I_\phi$ and $Q_\phi$ values are summed or averaged over each data bit interval, and the results are rectified by demodulated message data bits from the Costas loop. The rectified sums or averages then may be further summed, averaged, or filtered to achieve the desired signal-to-noise ratio. For a GPS C/A code receiver, there will be 20,460 $I_\phi$ and $Q_\phi$ measurements per data bit interval to be averaged. After rectification by the demodulated message data bit, these average values are available at a rate of 50 per second for further filtering.

To evaluate the filter requirements, begin with the assumption that the total signal strength is a moderately low 40 dB. Assuming that the signal processing functions are clocked at 40.96 MHz, there will be 40 signal samples per C/A code chip. Thus, the minimum width Phase MMW sample consists of one signal sample just following each C/A code clock. This represents a worst case S/N power reduction of $\frac{1}{40}$, or −16 dB. The equivalent phase error $C/N_O$ therefore will be (40−16)=24 dB. To achieve a phase measurement accuracy equivalent to one millimeter with the 19 centimeter L1 signal wavelength requires a S/N of 29 dB. Therefore, a filter time constant 5 dB longer than one second, or about 3 seconds, is adequate to achieve this accuracy and is entirely practical for the multipath phase rates of interest. In fact, the filter time constant may range from 4 to 20 seconds, depending on the application and the order of the filter. In any event, the filtered I and Q values are used to calculate the phase offset of the Costas Loop caused by multipath signals.

The phase correction process may be implemented in the phase calculation box 432 in a number of ways. One is simply to calculate the arctangent of the filtered phase correction I and Q values to determine the phase error and apply it mathematically as a correction to normal phase measurements from the Costas loop. Another is to add an appropriate function of the filtered phase correction Q value to the Q Punctual signal entering the Costas carrier tracker 428 so that the Costas loop drives the filtered phase correction Q value to zero. In this way the normal Costas loop phase measurements will be free of most multipath error. Undoubtedly there are many other implementation techniques, but the underlying concepts of measuring and compensating for the phase error effects of multipath signals are the same.

Multipath Mitigation in the Presence of GPS Anti-Spoofing:

As explained in the aforementioned patent to Keegan (U.S. Pat. No. 4,972,431), it is more difficult to obtain measurements from GPS satellites when the satellite P code is encrypted into a Y code to prevent spoofing of GPS signals. However, Keegan has shown that because the Anti-Spoofing (AS) encryption rate is approximately five percent of the P code clock rate, i.e., nominally 500 kHz, processing of the encrypted signals can be enhanced by first correlating with the P code to reduce signal bandwidth from approximately ±10 MHz to approximately ±500 kHz. This 20-to-1 bandwidth reduction before further processing results in a 13 dB improvement in signal-to-noise ratio. Two United States patents, Keegan (U.S. Pat. No. 4,972,431) and Lorenz et al. (U.S. Pat. No. 5,134,407), describe several methods for achieving these benefits.

Figure 33:
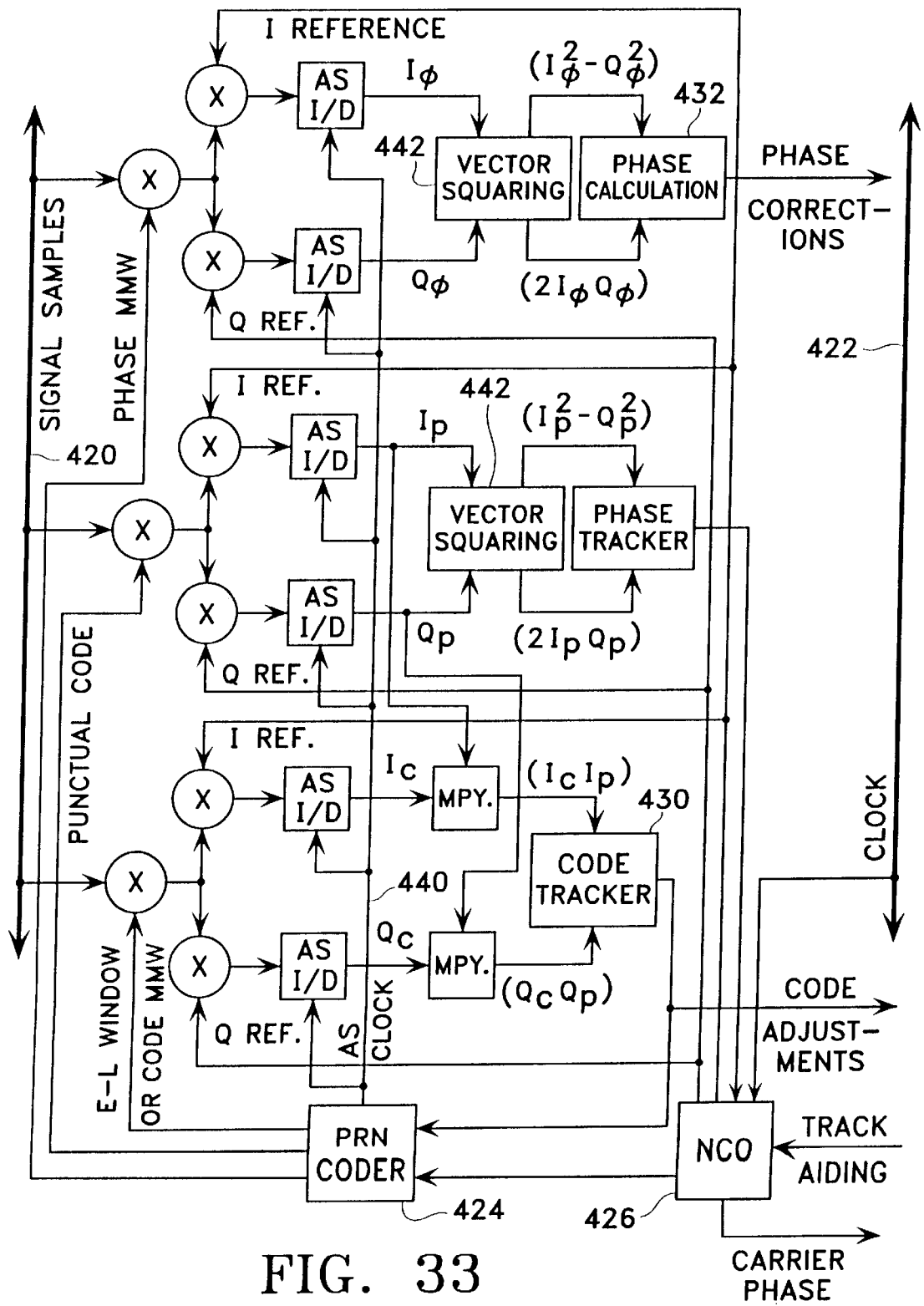
FIGS. 33 and 34 are block diagrams similar to FIG. 32, but applying the same principles to a GPS receiver in which the received signals have been subject to anti-spoofing encryption.

FIG. 33 illustrates one of several ways to achieve the mitigation of multipath effects for both code and phase measurements in the presence of Anti-Spoofing. This implementation also can be used when AS is not present. As in FIG. 32, there are three signal processing sections. The first correlation step for each is the same as in FIG. 32, namely correlation with the punctual code for carrier tracking and data demodulation, correlation first with an E−L code for initial code acquisition and then with the code MMW for code tracking, and correlation with the phase MMW sampler in order to determine the phase error due to multipath signals. In FIG. 33, the second step of correlating with the I and Q Reference signals from the NCO 426 also is the same for all three sections. Note that the sequence of these functions can be changed, e.g., I and Q correlation prior to code correlation, or the functions can be combined, without affecting receiver performance.

The first major difference between the method of FIG. 32 and of FIG. 33 is the addition of a signal Integrate and Dump (I/D) function following correlation with each I and Q Reference signal. As shown, all of the I/D functions are controlled by an AS clock signal on line 440 from the PRN coder 424. As described in Lorenz et al. (U.S. Pat. No. 5,134,407), the exact encryption code clock function has been determined from analysis of received GPS satellite signals, and it is easily recreated as part of the P code PRN coder 424 logic design. (Note that this information does not reveal the encryption code nor allow its prediction. It only defines the location of encryption code clocks with respect to the known P code.) Therefore, the AS clock signal on line 440 in FIG. 33 causes each input signal to be integrated during each chip interval of the encryption code, which is nominally two microseconds. At the end of each encryption chip interval, the previous integration result is output, the integrator is set to zero (dumped), and integration for the next encryption chip interval begins. This process is necessary because the encryption code is unknown. Therefore, the longest possible coherent integration time is the encryption chip period. The bandwidth of the signal samples after the I/D function is nominally 500 kHz, and the S/N ratio of the samples correlated with the punctual code is typically negative by 6 to 26 dB.

There are three ways to track the frequency and phase of an AS encrypted signal: squaring, cross-correlation, and squaring with cross-correlation to resolve half-cycle ambiguities. FIG. 33 shows the squaring approach in the central section, which includes a vector squaring logic 442. The $I_P$ and $Q_P$ signals represent a phase vector ($I_P+jQ_P$), where j defines the imaginary or quadrature axis with a value of $$\sqrt{-1}.$$

Because the polarity of $I_P$ and $Q_P$ depend on the unknown encryption code, something must be done to rectify these signals in order to produce a coherent signal which can be measured. The vector squaring approach multiplies each vector obtained from the I/D circuits by itself, i.e., $$(I_P+jQ_P)^2=(I_P^2+Q_P^2)+j(2I_PQ_P)$$

as indicated in FIG. 33. Because I and Q are the cosine and sine components, respectively, of the same input signal, we can write:

$$I_P=A\cos\phi \text{ and } Q_P=A\sin\phi,$$

where $\phi$ is the phase difference between the input signal and the NCO reference signal and A is the vector amplitude. Substituting these into the preceding equation and making use of trigonometric identities yields:

$$(\pm A\cos\phi\pm jA\sin\phi)^2=A^2\cos2\phi+jA^2\sin 2\phi.$$

There are three key characteristics to observe, one is amplitude, the second is data modulation, and the third is phase. Regarding amplitude, the vector squaring produces an output vector amplitude which is the square of the input vector amplitude. This means that the output signal-to-noise ratio is approximately the square of the input signal-to-noise ratio. For example, if the input S/N were 0.5 or −3 dB, the output SIN would be no better than 0.25 or −6 dB. Similarly, if the input SIN were 0.25 or −6 dB, the output S/N would be 0.0625 or −12 dB. Not only is the output SIN made worse, it drops by 2 dB for every 1 dB decrease in input SIN. The only way to compensate for such losses is to employ extended filtering times.

The second characteristic to note is that the squaring process not only eliminates the biphase modulation caused by the encryption code, but it also eliminates the data message biphase modulation. Therefore, it is not possible to obtain the data message from this channel.

The third characteristic is an output phase rotation rate which is twice that of the input vector. This means that a phase tracking loop can lock the NCO 426 to the input signal at nominally zero degrees of phase difference or at 180 degrees of phase difference. This characteristic introduces a half cycle ambiguity in the NCO phase, which can be resolved in several ways, as described, for example, by Lorenz et al. (U.S. Pat. No. 5,134,407).

The poor S/N ratio of the resulting measurements makes it difficult to implement a phase locked loop capable of tracking signal dynamics when the received signal is weak. Such a loop requires a double sided bandwidth of at least 20 Hz, and the SIN into the loop should be +10 dB or better for reliable and low noise tracking. Fortunately, AS encryption is applied only to the GPS P codes. Therefore, an L1 C/A code signal is available from every GPS satellite. This permits the receiver to gather the message data and to track signal dynamics with the L1 CIA code signal. Because all GPS signals are derived from a single satellite clock, the only phase and frequency difference between the received L2 carrier signal and 60/77 times the L1 carrier phase and frequency (60/77 is the L2/L1 frequency ratio) is due to ionospheric refraction and multipath, both of which change slowly. For example, typical ionospheric refraction rates are on the order of a cycle per minute. Therefore, as indicated in FIG. 33 and explained by Keegan (U.S. Pat. No. 4,972,431), the NCO 426 on an L2 channel can be driven (track-aided) by signals from the corresponding L1 C/A code channel. This will remove all but the slowly varying ionospheric and multipath phase differences between the L1 and L2 carrier signals, as also described by Keegan (U.S. Pat. No. 4,972,431).

With most of the signal dynamics removed by track aiding, the L2 carrier phase tracker can employ a very narrow filter bandwidth to achieve an adequate SIN. For example, if the L2 GPS $C/N_O$ were a very weak 30 dB ($C/N_O$ is the S/N in a one Hertz bandwidth), the S/N from the AS I/D, which has an equivalent bandwidth of 500 kHz, would be (+30−57) or −27 dB. (Other implementation losses occur, which will be ignored in this analysis.) After vector squaring, the S/N ratio will be −54 dB. To achieve a +10 dB S/N ratio from such samples requires a bandwidth reduction of 64 dB, or $2.5 \times 10^6$, which yields a required double-sided tracking bandwidth of 0.2 Hz, or 0.1 Hz single-sided. Experience shows that filter time constants of more than 10 seconds are practical when tracking ionospheric and multipath effects. Thus, the phase tracker in the central section of FIG. 33 is able to drive the track-aided NCO 426 to close the loop and track the incoming L2 carrier signal with low phase error. Note that the preceding analysis began with a very weak $C/N_O$ of 30 dB. In general, GPS signal $C/N_O$ values range between 40 and 50 dB, so the very narrow bandwidth is needed only to track the weakest of signals.

The lower portion of FIG. 33 shows that after initial code acquisition with a wide correlator E−L window, the code can be tracked with a code MMW to minimize the effect of multipath signals on code tracking accuracy. Assuming that the signal processing functions are clocked at 40.96 MHz, there will be four signal samples per P code chip. Each asymmetric MMW will employ two signal samples per chip, the first one nearest each code clock and the second one immediately after the first. Recall that these are of opposite polarity and that the first has double the weight of the second, in accordance with the definition of FIG. 27B. Only these two signal samples will be allowed through the MMW to correlate with I Reference and Q Reference. The result of these correlations are summed over the Anti Spoofing interval to produce $I_C$ and $Q_C$ measurements. To rectify the unknown polarity of these measurements, caused by the encryption process, they are multiplied, respectively, by the corresponding $I_P$ and $Q_P$ signals from the carrier tracking section. When the Costas loop is locked, the value of $Q_P$ and of $Q_C$ will be minimized. Therefore, the product $I_C I_P$ can be used alone as the code error function. Because of the product, it has a squared signal amplitude and the shape of the code error function of FIG. 27E multiplied by the autocorrelation function of FIG. 7G.

The top portion of FIG. 33 shows how the phase error due to multipath signals is determined. Assuming that the signal processing functions are clocked at 40.96 MHz with four samples per P code chip, the Phase MMW consists of one sample immediately following each P code clock, the polarity of which is determined by the P code state at that time. Using one sample out of four reduces the SIN ratio by 6 dB. Because anti-spoofing limits the maximum coherent signal integration time to the AS encryption chip period of about 2 microseconds, and because the polarity of the result is unpredictable, the $I_\phi$ and $Q_\phi$ values must be vector squared to produce I and Q terms:

$$I_\phi^2 - Q_\phi^2 \text{ and } 2I_\phi Q_\phi,$$

which represent the second harmonic of the phase error. If the input $C/N_O$ were a moderately low 40 dB, the SIN ratio of $I_\phi$ and $Q_\phi$ would be (+40−57−6)=−23 dB. After squaring, the SIN would be −46 dB. Therefore, the squared vector components must be filtered with a time constant of 63 seconds to achieve the 29 dB SIN ratio required for one millimeter measurement accuracy. In this case it is evident that some compromise is necessary between measurement accuracy and response to rapidly changing multipath. Depending on the application requirements, practical compromise values are possible. As with FIG. 32, the I and Q phase error terms may be processed in a number of ways, including calculation of the arctangent to measure the error and mathematically apply it as a correction, or injecting an appropriate function of the Q term into the phase tracker to cause the NCO 426 phase reference to align with the direct signal by driving the $2I_\phi Q_\phi$ term to zero on average.

Figure 34:
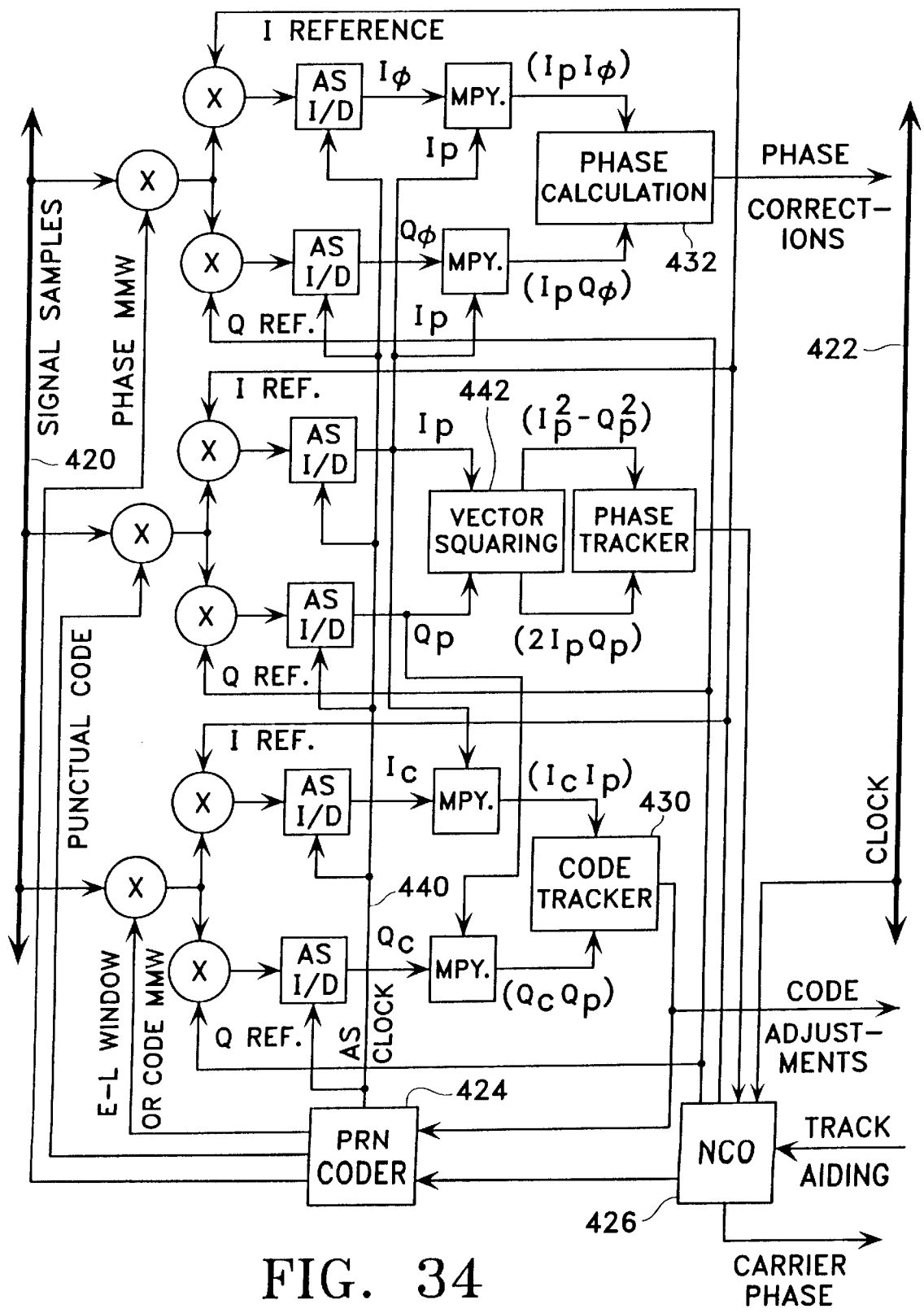

FIG. 34 shows an alternate way to measure the multipath phase error. Instead of vector squaring the outputs of the AS I/D to rectify the unknown encryption code, as in FIG. 33, the outputs are each multiplied by the equivalent $I_p$ value from the carrier phase tracking section, which also rectifies the measurements. However, as will be discussed in the following section, the $I_p$ values are based on at least two signal samples per P code chip, so they have a better SIN ratio than the $I_\phi$ and $Q_\phi$ values, which have only one sample per chip. Because squaring is avoided, the measurements represent the fundamental rather than the second harmonic of the phase error. Comparative tests of the two methods will determine which is better for a particular application.

Special Signal Processing Considerations:

Certain special considerations are required for receivers which process encrypted GPS signals, such as those illustrated by FIGS. 33 and 34. Whenever the product of two signals is required, it is important to avoid the introduction of bias terms by multiplying identical noise samples. For example, in FIGS. 33 and 34 consider the product (Ic Ip) which is one input to the code tracker 430. Assuming a signal sampling rate of about 40 MHz and an AS integrate period in the AS I/D of about two microseconds, there will be up to 80 signal samples contained in the term $I_p$. Assume also that the MMW consists of two signal samples per bit, the first with unit weight and the second with opposite polarity and 50% weight. Therefore, the term $I_c$ will contain about 40 samples, half of which will have an inverted polarity and a 50% weight. Each of these $I_c$ samples has a corresponding sample in $I_p$. Because each signal sample quantifies both signal and noise, half of the sampled noise in $I_c$ corresponds exactly with the corresponding samples in $I_p$. The result is a squared noise term which results in a significant bias. The other half of the samples in $I_c$ also correspond exactly with samples in $I_p$, but the product produces a negative bias of half the magnitude. There are two ways to eliminate the bias. One is to delete all samples in $I_p$ which correspond with samples in $I_c$. In this example, $I_p$ would then receive only two of every four signal samples, presumably reducing its SIN ratio by 3 dB. The other way is to weight the I signal samples which correspond with the unity weighted MMW samples by 50%. In this way the positive and negative bias values will exactly cancel each other, and the SIN ratio of $I_p$ presumably will be reduced by only 0.6 dB.

Although the second approach would appear to be preferable, other subtleties of the process affect the result. The signal sample corresponding with the first section of the MMW is centered on a code transition. Therefore, the average signal component at that point is zero, and removing that signal sample from $I_p$ removes only noise and no signal. As a result, removing both samples from $I_p$ only reduces its S/N by 0.51 dB. (3.51 dB of actual signal reduction but 3.0 dB of noise reduction.) Keeping all four samples but weighting one by 50% actually further reduces the SIN ratio by an additional 0.49 dB. Optimum performance always requires very careful system design.

Note from FIGS. 33 and 34 that signal products occur in many places. For each one, a strategy must be implemented to eliminate bias terms. Fortunately, the vector squaring process does not have this problem even though, for example, the component:

$$(I_p^2 Q_p^2)$$

contains two squared terms in which every included signal sample is multiplied by itself. In this case, the bias in one squared term is canceled by an identical bias in the other.

Although these subtleties are not part of the subject invention, they serve to show the complexity of the actual design. Fortunately, the basic principles of this invention are clear and are not obscured by the implementation details.

Figure 35:
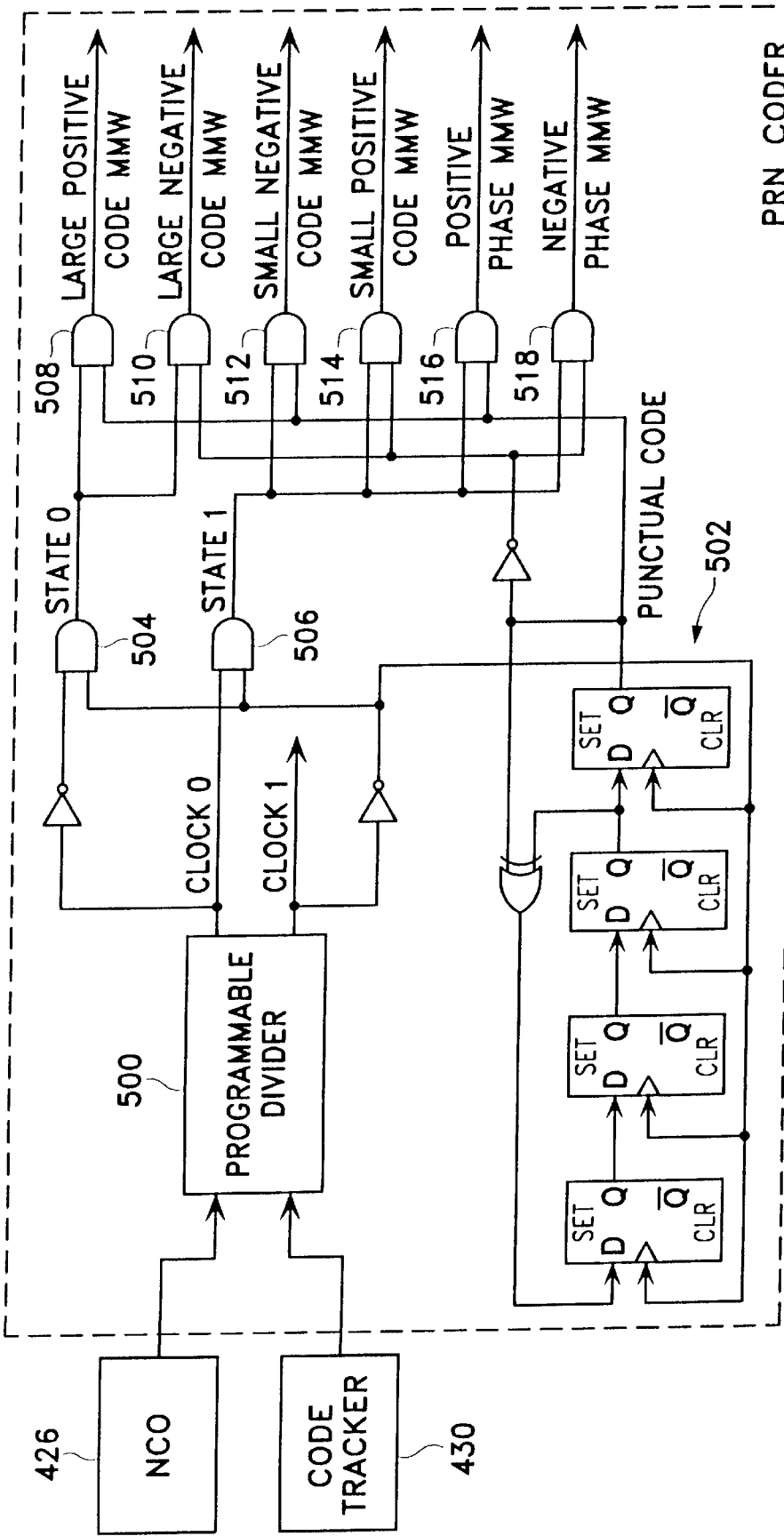
FIG. 35 is a logic diagram of an illustrative PRN coder.

Illustrative PRN Coder:

FIGS. 32, 33, and 34 illustrate receivers designed to minimize multipath interference in measuring code and carrier phase. In each of these figures, the code MMW, the phase MMW, and the punctual code signals are shown to be generated by a PRN coder 424. FIG. 35 is a logic diagram of one such PRN coder. For purposes of illustration, three key simplifications have been made. First, a very simple 15-chip code generator is shown. Second, the timing is based on four signal processing clocks per code chip, which may be typical when tracking the GPS P Code but not the C/A code. Finally, generation of only the code MMW waveform illustrated by FIG. 37D is illustrated.

FIGS. 36A–36I show the timing relationship of the signals generated by the logic of FIG. 35. The receiver clock is the clock signal distributed to all receiver channels by the vertical bus 422 in FIGS. 32, 33, and 34. As shown, this signal establishes the nominal clock rate of each NCO 426. These figures also show that the PRN coder 424 is driven by the output of the NCO 426 and by the output of the code tracker 430. In FIG. 35, the NCO 426 and the code tracker 430 are shown providing inputs to a programmable divider 500 in the PRN coder 424. The programmable divider nominally divides the receiver clock by four. However, by controlling the divider 500 to divide by three or by five, the NCO 426 and the code tracker 430 cause the outputs of the divider to shift earlier or later in time, in increments of one receiver clock cycle. This is how the NCO 426 and the code tracker 430 control the time phase of the PRN coder 424.

FIG. 35 shows that the programmable divider provides two outputs referred to as Clock 0 and Clock 1, the waveforms of which are depicted in FIGS. 36C and 36D, respectively. The frequencies of the Clock 0 and Clock 1 signals are one half and one fourth of the receiver clock frequency, respectively. The inverted Clock 1 output clocks a four stage shift register 502, which is a conventional PRN code generator. As shown in FIG. 35, the shift register input is the EXCLUSIVE OR of the last two shift register stages. The resulting 15-chip code is shown in FIG. 36G. Below the PRN code, in FIGS. 36H and 36I, are shown the desired code MMW and phase MMW waveforms. Based on the simplifying assumptions, it can be seen that each active segment of these MMW waveforms occurs in the first half of each PRN code chip. The first of these two time segments, called State 0, is formed as the logical AND of the inverse of both Clock 0 and Clock 1, in AND gate 504. The second segment, called State 1, is formed as the logical AND of Clock 0 and the inverse of Clock 1, in AND gate 506. Waveforms for the State 0 and State 1 signals are shown in FIGS. 36E and 36F, respectively.

By logically combining State 0 and State 1 with the punctual code generated by the shift register 502, and its inverse, six control signals are generated. The logical combinations are effected by six AND gates 508, 510, 512, 514, 516 and 518. FIG. 35 labels each control signal to correspond with a particular segment of the code MMW or the phase MMW waveforms. Specifically, for the code MMW there is a large positive segment, a large negative segment, a small positive segment and a small negative segment. Similarly, for the phase MMW there is a positive segment and a negative segment. It can be seen how these code components could be logically combined to obtain the required waveforms of FIGS. 36H and 36I, but a practical implementation would probably not combine the MMW components in this way.

FIGS. 32, 33, and 34 indicate that the code and phase MMW waveforms multiply the incoming signal samples in a first correlation step. Although this accurately represents the signal processing concept, the actual digital implementation is somewhat different. The I Reference and Q Reference signals which multiply the incoming signals in the second correlation step are numbers obtained from cosine and sine lookup tables, respectively. In fact, there are two cosine and two sine tables, one with a scale factor twice the other. Thus, when the large positive code MMW control signal from the PRN coder 424 is true, the input signal sample is multiplied by the larger cosine and sine values. When the large negative code MMW control signal is true, the input signal sample is multiplied by the inverse of the larger cosine and sine values. When the small negative code MMW is true, the input signal sample is multiplied by the inverse of the smaller cosine and sine values, and so forth. Thus, the six control signals define the polarity and the amplitude of the cosine and sine values used for each signal sample. When none of the control signals are true, the corresponding signal samples are discarded and not processed. This is the same as multiplying them by zero.

Unlike all previous timing diagrams, FIGS. 36A–36I show the leading edge of each PRN code chip (FIG. 36G) aligned with the leading edge of the code MMW (FIG. 36H). This intentional advance of the code phase is not harmful, and it simplifies the logic. To clarify the effective timing, note that the signal samples shown in FIG. 36A are aligned with the center of the first segment of the code MMW in FIG. 36H.

Summary:

There are many ways to track PRN modulated signals. This section has illustrated a few of the methods. The current invention is not restricted to a particular receiver configuration. The essence of the code tracking portion of the current invention is a family of novel code tracking windows which cause the code error function to have a value of zero just before, and much closer to, the central tracking region than is possible with a conventional narrow correlator window. (Note that although a value of zero is optimum, this invention covers any waveform which reduces the amplitude of the early portion of the code error function relative to what would be possible with a narrow correlator using equivalent signal processing clock rates.) This characteristic eliminates code tracking error from multipath signals with sufficient delay that the zero, or reduced amplitude portion, of their code error function falls on the central tracking region of the direct signal code error function. Note that by reducing the width of a narrow correlator window, the effect of these multipath signals can be reduced. However, the current invention permits the effect of these multipath signals to be eliminated entirely.

Figures 20A, 20B, 20C:
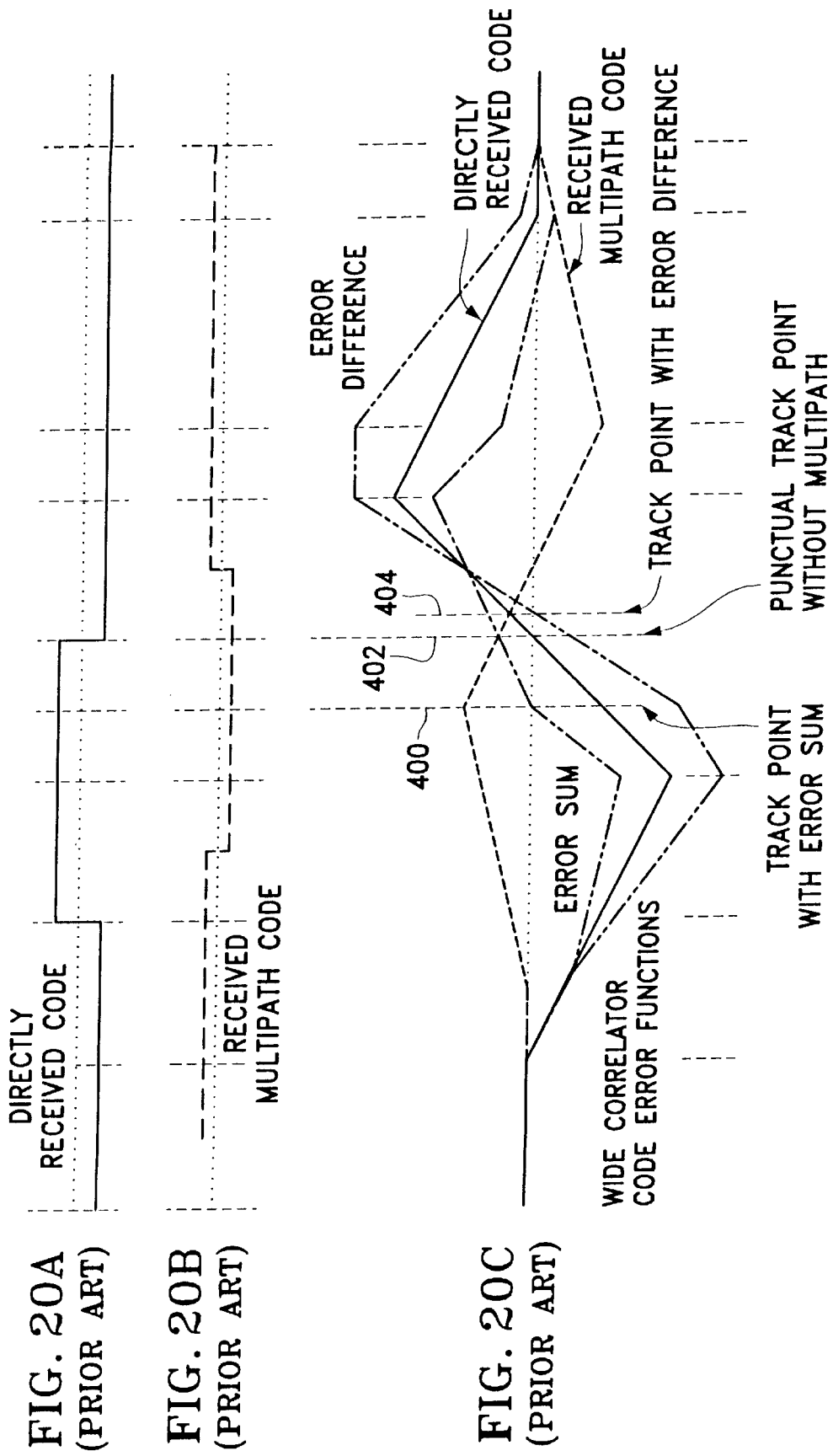
FIGS. 20A and 20B show a directly received code and a received multipath code.
FIG. 20C is a graphical representation of a code error function for the directly received code, for the received multipath code, and for the sum and difference of these code error functions.

FIGS. 37A–37E illustrate some of the wide variety of code multipath mitigation windows which achieve the desired result. FIG. 37A represents four segments of a PRN code, each centered on a code clock, which, from left to right, shows a positive non-transition, a negative code transition, a negative non-transition, and a positive transition. FIG. 37B shows a symmetric code MMW occurring only on code transitions, as first shown in FIG. 23B. (The specific polarity relative to the transition direction is the designer's choice, as long as the polarity is different at positive and at negative transitions.) FIG. 37C shows a symmetric code MMW occurring at every code clock, as first shown in FIG. 20D. This eliminates the half-amplitude code error function response at plus and minus one chip from the central region. FIG. 37D shows the asymmetric code MMW first shown in FIG. 27D, which, by reducing the MMW area, improves the tracking loop signal-to-noise ratio. FIG. 37E shows another version of a code MMW waveform where the weight of the second segment is established by its pulse width rather than its amplitude or scale factor, as with the preceding MMWs. From these examples it is evident that a wide variety of code MMWs are possible.

Some of the key characteristics which distinguish code MMWs from conventional code tracking windows, e.g., windows formed by early minus late detectors, include having multiple segments, having segments of different polarity, and having segments of different weight (amplitude, scale factor, and/or width). The purpose of these differences, as illustrated by FIGS. 23F, 24C, 25F, 26E and 27E, is to achieve a code error function with a value of zero just before, and much closer to, the central tracking region than is possible with a narrow correlator window.

The multipath phase correction portion of this invention also is not restricted to a particular receiver configuration. The essence of the phase correction invention is to sample the input signal vector immediately after each PRN code transition and to vector sum these samples with an equivalent number of identically weighted samples taken where there is no code transition. The vector sum of these samples is shown to produce a vector which represents the phase of the direct signal, unaffected by multipath signals whose code transitions occur after the transition samples are taken. Because received signals are filtered, the measured signal requires a finite time to complete a code transition. Therefore, the samples taken after a direct signal code transition must be delayed until it will not be affected by the filtered transition response time. However, the sample should be concluded quickly to avoid as many multipath signal transitions as possible. As a result, design constraints force the sample after the direct code transition to be as narrow as practically possible. The samples where there is no transition are not as highly constrained. Location is not as critical, and width can be greater, as long as the sampled signal result is scaled to match the after-transition samples. However, to minimize the effect of those multipath signals with nearly a one chip delay, best practice is to employ samples of equal width placed at the same relative location just after each code clock.

It will be appreciated from the foregoing that various modifications to the embodiments disclosed may occur to those skilled in the art without departing from the true spirit and scope of the invention, which should not be limited except as defined by the appended claims.

What is claimed is:

1. In a receiver for decoding received pseudorandom noise (PRN) encoded signals, apparatus for mitigating effects of multipath signals on code tracking of the received PRN signals, the apparatus comprising:

a PRN code generator for generating a replica of the PRN code and for generating related code multipath mitigation windows (MMWs);

a controllable oscillator, for generating timing signals for the PRN code generator;

a first correlator, for correlating the received PRN signals with the replica of the PRN code, to derive phase error signals used for controlling the oscillator; and a second correlator, for correlating the received PRN signals with the code MMWs, and thereby generating code error signals, in accordance with a code error function, used to control the PRN code generator to synchronize the generated PRN code with the received PRN code signals;

wherein the code error function effectively has a zero value at a desired rack point when the generated PRN code is synchronized with the received PRN signals and, immediately on each side of the tracking point, has a polarity that depends on whether the generated PRN code is early or late with respect to the received PRN code;

and wherein the shape of the code MMWs generated by the PRN code generator is selected to provide a code error function that mitigates the effect of received multipath signals by providing an error value that increases rapidly in opposite directions from the track point, but assumes a practically zero value when the code MMWs are advanced only a fraction of a PRN code chip from the track point, whereby a code error function associated with delayed multipath code signals will have a practically zero value near the desired track point and will have little or no effect on tracking the received code signals;

and wherein the code MMWs are narrow with respect to a PRN code chip and are timed to occur only at PRN code transitions.

2. In a receiver for decoding received pseudorandom noise (PRN) encoded signals, apparatus for mitigating effects of multipath signals on code tracking of the received PRN signals, the apparatus comprising:

a PRN code generator for generating a replica of the PRN code and for generating related code multipath mitigation windows (MMWs);

a controllable oscillator, for generating timing signals for the PRN code generator;

a first correlator, for correlating the received PRN signals with the replica of the PRN code, to derive phase error signals used for controlling the oscillator; and a second correlator, for correlating the received PRN signals with the code MMWs, and thereby generating code error signals, in accordance with a code error function, used to control the PRN code generator to synchronize the generated PRN code with the received PRN code signals;

wherein the code error function effectively has a zero value at a desired track point when the generated PRN code is synchronized with the received PRN signals and, immediately on each side of the tracking point, has a polarity that depends on whether the generated PRN code is early or late with respect to the received PRN code;

and wherein the shape of the code MMWs generated by the PRN code generator is selected to provide a code error function that mitigates the effect of received multipath signals by providing an error value that increases rapidly in opposite directions from the track point, but assumes a practically zero value when the code MMWs are advanced only a fraction of a PRN code chip from the track point, whereby a code error function associated with delayed multipath code signals will have a practically zero value near the desired track point and will have little or no effect on tracking the received code signals;

and wherein the code MMWs are narrow with respect to a PRN code chip and are timed to occur only at PRN code transitions;

and wherein the code MMW includes a central segment of one polarity and two adjacent side segments of the opposite polarity, wherein each instance of the code MMW is symmetric about the desired track point and has an individual average value of zero.

3. In a receiver for decoding received pseudorandom noise (PRN) encoded signals, apparatus for mitigating effects of multipath signals on code tracking of the received PRN signals, the apparatus comprising:

a PRN code generator for generating a replica of the PRN code and for generating related code multipath mitigation windows (MMWs);

a controllable oscillator, for generating timing signals for the PRN code generator;

a first correlator, for correlating the received PRN signals with the replica of the PRN code, to derive phase error signals used for controlling the oscillator; and a second correlator, for correlating the received PRN signals with the code MMWs, and thereby generating code error signals, in accordance with a code error function, used to control the PRN code generator to synchronize the generated PRN code with the received PRN code signals;

wherein the code error function effectively has a zero value at a desired track point when the generated PRN code is synchronized with the received PRN signals and, immediately on each side of the tracking point, has a polarity that depends on whether the generated PRN code is early or late with respect to the received PRN code;

and wherein the shape of the code MMWs generated by the PRN code generator is selected to provide a code error function that mitigates the effect of received multipath signals by providing an error value that increases rapidly in opposite directions from the track point, but assumes a practically zero value when the code MMWs are advanced only a fraction of a PRN code chip from the track point, whereby a code error function associated with delayed multipath code signals will have a practically zero value near the desired track point and will have little or no effect on tracking the received code signals;

and wherein the code MMWs are narrow with respect to a PRN code chip and are timed to occur at code clock positions;

and wherein the code MMW includes a central segment of one polarity and two adjacent side segments of the opposite polarity, wherein each instance of the code MMW is symmetric about the desired track point and has an individual average value of zero.

4. For use in a receiver for decoding received pseudorandom noise (PRN) encoded signals, a method for mitigating effects of multipath signals on code tracking of the received PRN signals, the method comprising the steps of:

generating a replica of the PRN code;

generating related code multipath mitigation windows (MMWs);

generating timing signals, in a controllable oscillator, to control the steps of generating the replica of the PRN code and the code MMWs;

correlating the received PRN signals with the replica of the PRN code, to derive phase error signals used for controlling the oscillator;

correlating the received PRN signals with the code MMWs, and thereby generating code error signals, in accordance with a code error function; and controlling the step of generating the PRN code, to synchronize the generated PRN code with the received PRN code signals;

wherein the code error function effectively has a zero value at a desired track point when the generated PRN code is synchronized with the received PRN signals and, immediately on each side of the tracking point, has a polarity that depends on whether the generated PRN code is early or late with respect to the received PRN code;

and wherein the shape of the code MMWs generated by the PRN code generator is selected to provide a code error function that mitigates the effect of received multipath signals by providing an error value that increases rapidly in opposite directions from the track point, but assumes a practically zero value when the code MMWs are advanced only a fraction of a PRN code chip from the track point, whereby a code error function associated with delayed multipath code signals will have a practically zero value near the desired track point and will have little or no effect on tracking the received code signals;

and wherein the code MMWs are narrow with respect to a PRN code chip and are timed to occur only at PRN code transitions.

5. For use in a receiver for decoding received pseudorandom noise (PRN) encoded signals, a method for mitigating effects of multipath signals on code tracking of the received PRN signals, the method comprising the steps of:

generating a replica of the PRN code;

generating related code multipath mitigation windows (MMWs);

generating timing signals, in a controllable oscillator, to control the steps of generating the replica of the PRN code and the code MMWs;

correlating the received PRN signals with the replica of the PRN code, to derive phase error signals used for controlling the oscillator;

correlating the received PRN signals with the code MMWs, and thereby generating code error signals, in accordance with a code error function; and controlling the step of generating the PRN code, to synchronize the generated PRN code with the received PRN code signals;

wherein the code error function effectively has a zero value at a desired track point when the generated PRN code is synchronized with the received PRN signals and, immediately on each side of the tracking point, has a polarity that depends on whether the generated PRN code is early or late with respect to the received PRN code;

and wherein the shape of the code MMWs generated by the PRN code generator is selected to provide a code error function that mitigates the effect of received multipath signals by providing an error value that increases rapidly in opposite directions from the track point, but assumes a practically zero value when the code MMWs are advanced only a fraction of a PRN code chip from the track point, whereby a code error function associated with delayed multipath code signals will have a practically zero value near the desired track point and will have little or no effect on tracking the received code signals;

and wherein the code MMWs are narrow with respect to a PRN code chip and are timed to occur only at PRN code transitions;

and wherein the code MMW includes a central segment of one polarity and two adjacent side segments of the opposite polarity, wherein each instance of the code MMW is symmetric about the desired track point and has an individual average value of zero.

6. For use in a receiver for decoding received pseudorandom noise (PRN) encoded signals, a method for mitigating effects of multipath signals on code tracking of the received PRN signals, the method comprising the steps of:

generating a replica of the PRN code;

generating related code multipath mitigation windows (MMWs);

generating timing signals, in a controllable oscillator, to control the steps of generating the replica of the PRN code and the code MMWs;

correlating the received PRN signals with the replica of the PRN code, to derive phase error signals used for controlling the oscillator;

correlating the received PRN signals with the code MMWs, and thereby generating code error signals, in accordance with a code error function; and controlling the step of generating the PRN code, to synchronize the generated PRN code with the received PRN code signals;

wherein the code error function effectively has a zero value at a desired track point when the generated PRN code is synchronized with the received PRN signals and, immediately on each side of the tracking point, has a polarity that depends on whether the generated PRN code is early or late with respect to the received PRN code;

and wherein the shape of the code MMWs generated by the PRN code generator is selected to provide a code error function that mitigates the effect of received multipath signals by providing an error value that increases rapidly in opposite directions from the track point, but assumes a practically zero value when the code MMWs are advanced only a fraction of a PRN code chip from the track point, whereby a code error function associated with delayed multipath code signals will have a practically zero value near the desired track point and will have little or no effect on tracking the received code signals;

and wherein the code MMWs are narrow with respect to a PRN code chip and are timed to occur at code clock positions;

and wherein the code MMW includes a central segment of one polarity and two adjacent side segments of the opposite polarity, wherein each instance of the code MMW is symmetric about the desired track point and has an individual average value of zero.

* * * * *

UNITED STATES PATENT AND TRADEMARK OFFICE
CERTIFICATE OF CORRECTION

PATENT NO. : 5,963,582
DATED : October 5, 1999
INVENTOR(S) : Thomas Atlee Stansell, Jr.

It is certified that error appears in the above-identified patent and that said Letters Patent is hereby corrected as shown below:

Column 2,
Line 7, change "CIA" to -- C/A --.

Column 5,
Line 13, change "CIA" to -- C/A --.

Column 8,
Line 18, replace the equation with

-- $\sin(\bar{\omega}t + \omega)\sin(\bar{\omega}t) = 1/2[\cos(\omega) - \cos(2\bar{\omega}t + \omega)]$ --

Line 19, replace the equation with --

-- $\sin(\bar{\omega}t + \omega)\cos(\bar{\omega}t) = 1/2[\sin(2\bar{\omega}t + \omega) + \sin(\omega)]$ --

Line 21, change "where ω" to -- where $\bar{\omega}$ --

Column 20,
Line 10, change "CIA" to -- C/A --.

Column 21,
Lines 52 and 66, change "CIA" to -- C/A --.

Column 24,
Line 3, change "CIA" to -- C/A --.

Column 25,
Line 25, change "PIG." to -- -FIG --.

Column 36,
Line 58, change "$I_{100}$." to -- $I_\phi$. --.

Column 38,
Line 58, change "cos φand" to -- cos φ and --.

Column 39,
Lines 29 and 51, change "SIN" to -- S/N --.
Line 34, change "CIA" to -- C/A --.

UNITED STATES PATENT AND TRADEMARK OFFICE
CERTIFICATE OF CORRECTION

PATENT NO. : 5,963,582
DATED : October 5, 1999
INVENTOR(S) : Thomas Atlee Stansell, Jr.

It is certified that error appears in the above-identified patent and that said Letters Patent is hereby corrected as shown below:

Column 40,
Lines 33, 42, 44, 46 and 65, change "SIN" to -- S/N --.

Column 41,
Lines 34 and 45, change "SIN" to -- S/N --.

Column 44,
Line 62, change "rack" to -- track --.

Signed and Sealed this

Nineteenth Day of August, 2003

JAMES E. ROGAN
*Director of the United States Patent and Trademark Office*